US012701434B2

(12) United States Patent
Zorgui et al.

(10) Patent No.: US 12,701,434 B2
(45) Date of Patent: Aug. 4, 2026

(54) METHOD AND APPARATUS FOR MULTI-HYPOTHESIS MEASUREMENT VIA CONFIGURATION IN RF SENSING

(71) Applicant: QUALCOMM Incorporated, San Diego, CA (US)

(72) Inventors: Marwen Zorgui, San Diego, CA (US); Mohammed Ali Mohammed Hirzallah, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 556 days.

(21) Appl. No.: 18/186,692

(22) Filed: Mar. 20, 2023

(65) Prior Publication Data

US 2024/0323709 A1 Sep. 26, 2024

(51) Int. Cl.
*H04L 67/12* (2022.01)
*H04W 4/38* (2018.01)
(Continued)

(52) U.S. Cl.
CPC ............. *H04W 24/02* (2013.01); *H04L 67/12* (2013.01); *H04W 4/38* (2018.02); *H04W 12/009* (2019.01);
(Continued)

(58) Field of Classification Search
CPC ........ G08C 17/02; G08C 19/00; G08C 17/00; G01C 21/20; G01C 21/3848;
(Continued)

(56) References Cited

U.S. PATENT DOCUMENTS

2019/0049580 A1* 2/2019 Natroshvili ............ G01C 21/28
2020/0120160 A1* 4/2020 Estes ......................... G06F 9/30
(Continued)

FOREIGN PATENT DOCUMENTS

CN 110266432 B 11/2021
WO 2022075483 A1 4/2022
(Continued)

OTHER PUBLICATIONS

H. A. Abdelali, H. Derrouz, Y. Zennayi, R. O. H. Thami and F. Bourzeix, "Multiple Hypothesis Detection and Tracking Using Deep Learning for Video Traffic Surveillance," in IEEE Access, vol. 9, pp. 164282-164291, 2021, doi: 10.1109/ACCESS.2021.3133529. (Year: 2021).*
International Search Report and Written Opinion—PCT/US2024/015640—ISA/EPO—May 28, 2024.

*Primary Examiner* — Salvador E Rivas
(74) *Attorney, Agent, or Firm* — QUALCOMM Incorporated

(57) ABSTRACT

Apparatuses and methods for multi-hypothesis measurement configuration in RF sensing are described. An apparatus is configured to receive, from a sensing entity, a sensing configuration, wherein the sensing configuration indicates a total number of sensing hypotheses and at least a first sensing hypothesis and a second sensing hypothesis that is different from the first sensing hypothesis; The apparatus is also configured to measure a first set of sensing measurement data associated with the first sensing hypothesis and a second set of sensing measurement data associated with the second sensing hypothesis. The apparatus is further configured to transmit, for the sensing entity, at least one of: (1) the first set of sensing measurement data and the second set of sensing measurement data, or (2) an indication of the first sensing hypothesis and the second sensing hypothesis.

16 Claims, 16 Drawing Sheets

(51) Int. Cl.

| | | |
|---|---|---|
| *H04W 12/00* | (2021.01) | |
| *H04W 24/02* | (2009.01) | |
| *H04W 24/10* | (2009.01) | |
| *H04W 84/18* | (2009.01) | |
| *H04L 51/222* | (2022.01) | |

(52) U.S. Cl.
CPC ........... *H04W 24/10* (2013.01); *H04W 84/18* (2013.01); *H04L 51/222* (2022.05)

(58) Field of Classification Search
CPC ..... H04L 51/222; H04L 5/0048; H04L 67/12; H04L 29/08558; H04W 24/02; H04W 24/10; H04W 4/50; H04W 8/24; H04W 24/08; H04W 4/38; H04W 84/18; H04W 12/009

See application file for complete search history.

(56) References Cited

U.S. PATENT DOCUMENTS

| | | | | |
|---|---|---|---|---|
| 2020/0364883 A1* | 11/2020 | Hoffmann | ................. | G06T 7/74 |
| 2022/0303331 A1* | 9/2022 | Svennebring | .... | H04N 21/44209 |
| 2023/0234580 A1* | 7/2023 | Reichardt | ......... | B60W 60/0027 |
| | | | | 701/27 |
| 2024/0310556 A1* | 9/2024 | Ding | ........................ | G01W 1/18 |
| 2025/0056282 A1* | 2/2025 | Tao | ........................ | H04W 24/10 |
| 2025/0102626 A1* | 3/2025 | Monninger | ............. | G01S 7/417 |

FOREIGN PATENT DOCUMENTS

| | | | |
|---|---|---|---|
| WO | 2022086888 A1 | 4/2022 | |
| WO | 2023019392 A1 | 2/2023 | |

* cited by examiner $\Phi$ = Azimuth angle of departure (A-AoD)
$\theta$ = Zenith angle of departure (Z-AoD)
$\rho$ = Distance
$\Phi'$ = Azimuth angle of arrival (A-AoA)
$\theta'$ = Zenith angle of arrival (Z-AoA)

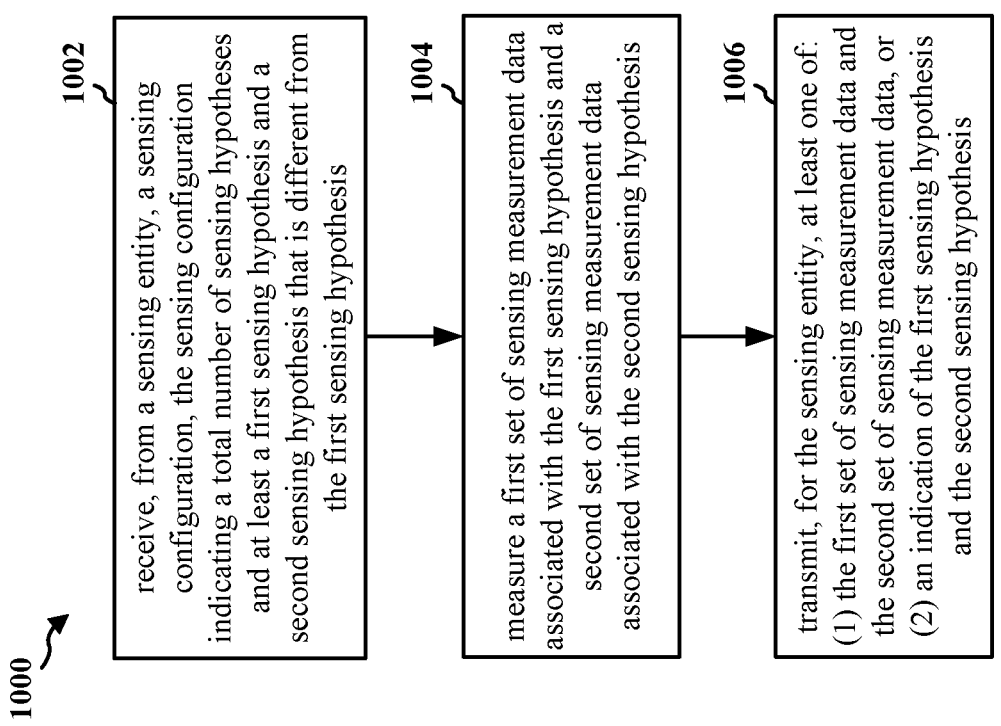

1002 receive, from a sensing entity, a sensing configuration, the sensing configuration indicating a total number of sensing hypotheses and at least a first sensing hypothesis and a second sensing hypothesis that is different from the first sensing hypothesis 1004 measure a first set of sensing measurement data associated with the first sensing hypothesis and a second set of sensing measurement data associated with the second sensing hypothesis 1006 transmit, for the sensing entity, at least one of: (1) the first set of sensing measurement data and the second set of sensing measurement data, or (2) an indication of the first sensing hypothesis and the second sensing hypothesis

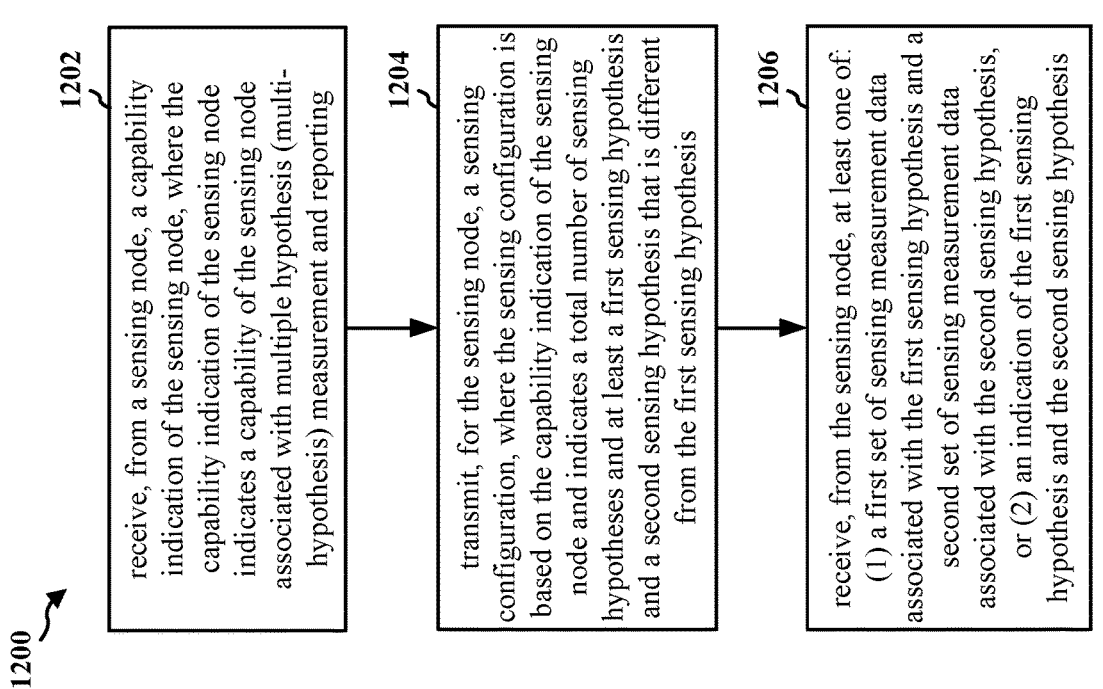

1200

1202 receive, from a sensing node, a capability indication of the sensing node, where the capability indication of the sensing node indicates a capability of the sensing node associated with multiple hypothesis (multi-hypothesis) measurement and reporting

1204 transmit, for the sensing node, a sensing configuration, where the sensing configuration is based on the capability indication of the sensing node and indicates a total number of sensing hypotheses and at least a first sensing hypothesis and a second sensing hypothesis that is different from the first sensing hypothesis

1206 receive, from the sensing node, at least one of: (1) a first set of sensing measurement data associated with the first sensing hypothesis and a second set of sensing measurement data associated with the second sensing hypothesis, or (2) an indication of the first sensing hypothesis and the second sensing hypothesis

FIG. 12

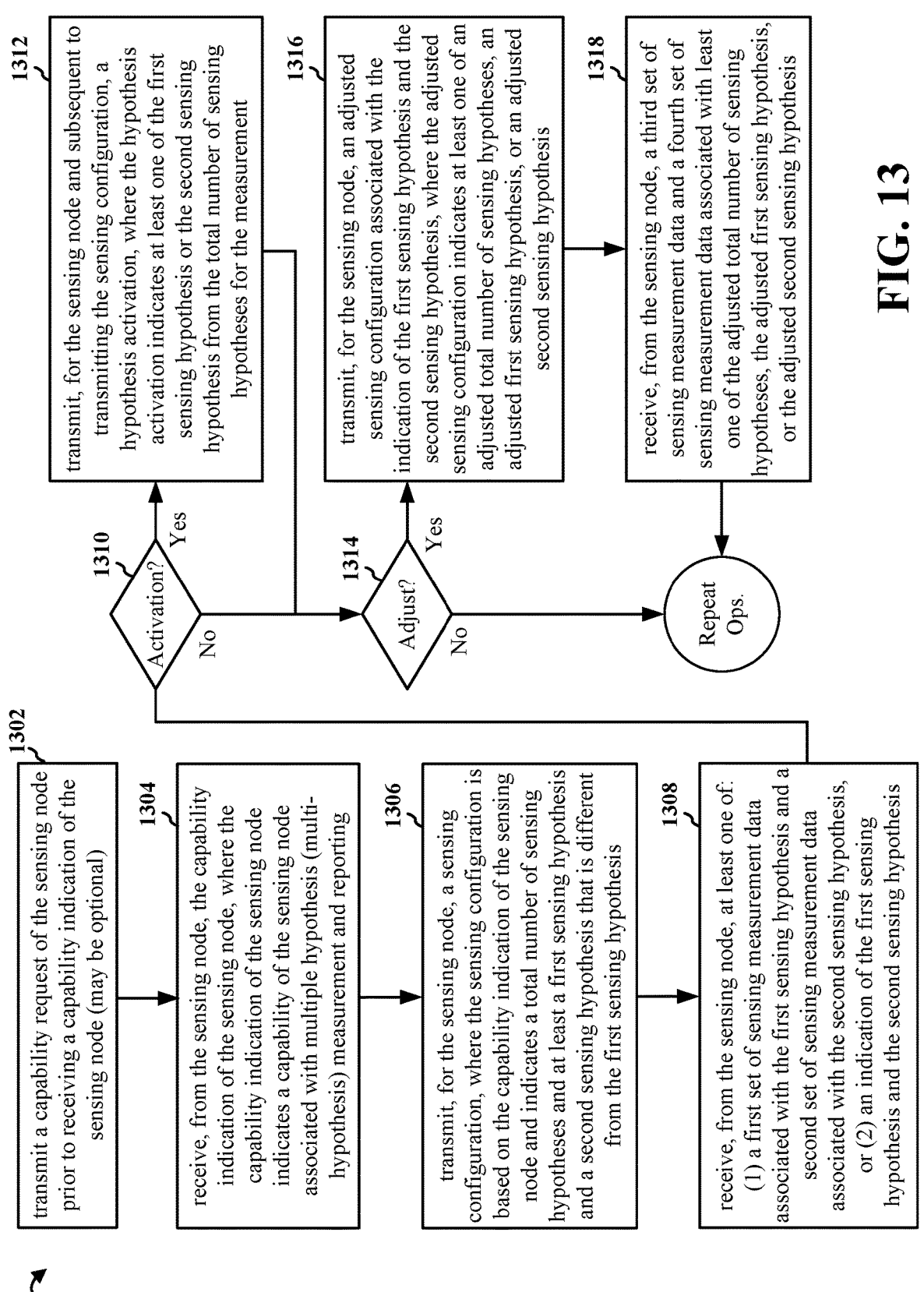

1302 transmit a capability request of the sensing node prior to receiving a capability indication of the sensing node (may be optional)

1304 receive, from the sensing node, the capability indication of the sensing node, where the capability indication of the sensing node indicates a capability of the sensing node associated with multiple hypothesis (multi-hypothesis) measurement and reporting 1306 transmit, for the sensing node, a sensing configuration, where the sensing configuration is based on the capability indication of the sensing node and indicates a total number of sensing hypotheses and at least a first sensing hypothesis and a second sensing hypothesis that is different from the first sensing hypothesis 1308 receive, from the sensing node, at least one of: (1) a first set of sensing measurement data associated with the first sensing hypothesis and a second set of sensing measurement data associated with the second sensing hypothesis, or (2) an indication of the first sensing hypothesis and the second sensing hypothesis 1310 Activation?

Yes

No 1312 transmit, for the sensing node and subsequent to transmitting the sensing configuration, a hypothesis activation, where the hypothesis activation indicates at least one of the first sensing hypothesis or the second sensing hypothesis from the total number of sensing hypotheses for the measurement 1314 Adjust?

Yes

No 1316 transmit, for the sensing node, an adjusted sensing configuration associated with the indication of the first sensing hypothesis and the second sensing hypothesis, where the adjusted sensing configuration indicates at least one of an adjusted total number of sensing hypotheses, an adjusted first sensing hypothesis, or an adjusted second sensing hypothesis 1318 receive, from the sensing node, a third set of sensing measurement data and a fourth set of sensing measurement data associated with least one of the adjusted total number of sensing hypotheses, the adjusted first sensing hypothesis, or the adjusted second sensing hypothesis Repeat Ops.

METHOD AND APPARATUS FOR MULTI-HYPOTHESIS MEASUREMENT VIA CONFIGURATION IN RF SENSING

TECHNICAL FIELD

The present disclosure relates generally to communication systems, and more particularly, to wireless communications utilizing sensing.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus is configured to receive, from a sensing entity, a sensing configuration, the sensing configuration indicating a total number of sensing hypotheses and at least a first sensing hypothesis and a second sensing hypothesis that is different from the first sensing hypothesis. The apparatus is also configured to measure a first set of sensing measurement data associated with the first sensing hypothesis and a second set of sensing measurement data associated with the second sensing hypothesis. The apparatus is further configured to transmit, for the sensing entity, at least one of: (1) the first set of sensing measurement data and the second set of sensing measurement data, or (2) an indication of the first sensing hypothesis and the second sensing hypothesis.

In the aspect, the method includes receiving, from a sensing entity, a sensing configuration, the sensing configuration indicating a total number of sensing hypotheses and at least a first sensing hypothesis and a second sensing hypothesis that is different from the first sensing hypothesis. The method also includes measuring a first set of sensing measurement data associated with the first sensing hypothesis and a second set of sensing measurement data associated with the second sensing hypothesis. The method further includes transmitting, for the sensing entity, at least one of: (1) the first set of sensing measurement data and the second set of sensing measurement data, or (2) an indication of the first sensing hypothesis and the second sensing hypothesis.

In another aspect of the disclosure, a method, a computer-readable medium, and an apparatus are provided. The apparatus is configured to receive, from a sensing node, a capability indication of the sensing node, where the capability indication of the sensing node indicates a capability of the sensing node associated with multiple hypothesis (multi-hypothesis) measurement and reporting. The apparatus is also configured to transmit, for the sensing node, a sensing configuration, where the sensing configuration is based on the capability indication of the sensing node and indicates a total number of sensing hypotheses and at least a first sensing hypothesis and a second sensing hypothesis that is different from the first sensing hypothesis. The apparatus is further configured to receive, from the sensing node, at least one of: (1) a first set of sensing measurement data associated with the first sensing hypothesis and a second set of sensing measurement data associated with the second sensing hypothesis, or (2) an indication of the first sensing hypothesis and the second sensing hypothesis.

In the aspect, the method includes receiving, from a sensing node, a capability indication of the sensing node, where the capability indication of the sensing node indicates a capability of the sensing node associated with multiple hypothesis (multi-hypothesis) measurement and reporting. The method also includes transmitting, for the sensing node, a sensing configuration, where the sensing configuration is based on the capability indication of the sensing node and indicates a total number of sensing hypotheses and at least a first sensing hypothesis and a second sensing hypothesis that is different from the first sensing hypothesis. The method further includes receiving, from the sensing node, at least one of: (1) a first set of sensing measurement data associated with the first sensing hypothesis and a second set of sensing measurement data associated with the second sensing hypothesis, or (2) an indication of the first sensing hypothesis and the second sensing hypothesis.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 10 is a flowchart of a method of wireless communication, in accordance with various aspects of the present disclosure.

FIG. 12 is a flowchart of a method of wireless communication, in accordance with various aspects of the present disclosure.

FIG. 13 is a flowchart of a method of wireless communication, in accordance with various aspects of the present disclosure.

DETAILED DESCRIPTION

Figure 1:
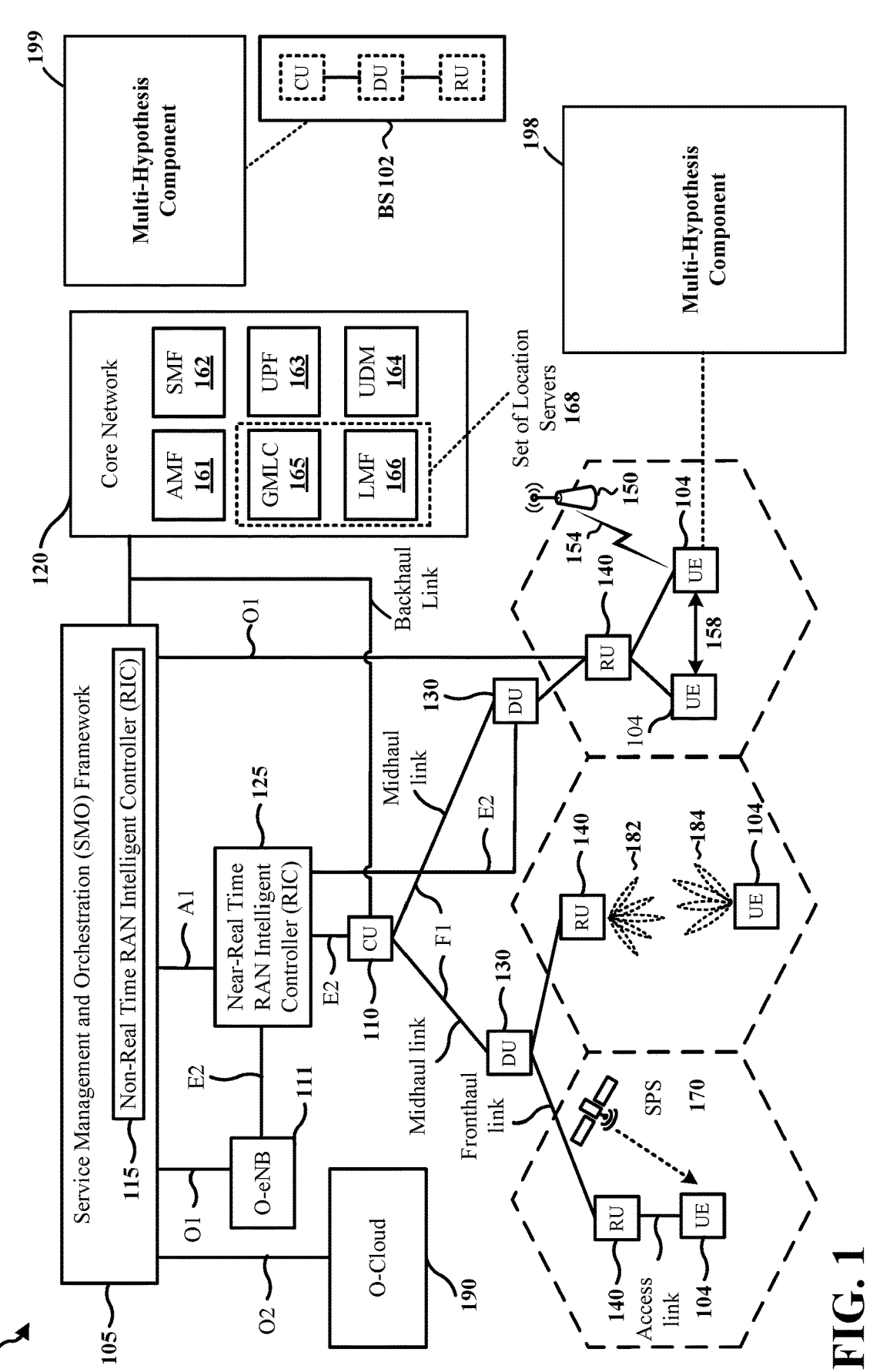
FIG. 1 is a diagram illustrating an example of a wireless communications system and an access network.

Wireless communication networks, such as a 5G NR network, may enable sensing measurements and operations for wireless devices. For example, a wireless communication network and/or a wireless device may utilize specific sensing waveforms, e.g., radio detection and ranging (RADAR) waveforms, for communications and/or radio frequency (RF) sensing. For instance, a RF sensing operation against a sensing target may be performed by a wireless device, e.g., a sensing node, utilizing a sensing waveform, and sensing measurement results may be provided to a sensing entity via at least one reference signal (RS). In some scenarios, such as Doppler measurements and virtual multiple-input and multiple-output (MIMO) array processing, phase-coherent RSs may improve, or even enable, RF sensing operations.

However, maintaining phase coherency for RS transmissions such as in a positioning reference signal (PRS) or a sounding reference signal (SRS) may be affected by hardware configurations/capabilities, beam switching operations, data servicing in cellular systems, and/or the like, which in turn may impact sensing operation performance. As an example, sensing environments with sensing targets that move at relatively low speeds (e.g., no more than 2-3 m/s) may utilize larger windows of time (e.g., 10-20 ms, 2 frames, etc.) for sensing operations to achieve a desired sensing performance. Yet, maintaining coherent transmission over larger windows of time for sensing operations may be difficult or unachievable, which may result in impacted sensing performance.

Various aspects relate generally to wireless communications systems and sensing operations for wireless devices. Some aspects more specifically relate to multi-hypothesis measurement configuration in RF sensing. In one example, a sensing node may receive, from a sensing entity, a sensing configuration. The sensing configuration may indicate a total number of sensing hypotheses and at least a first sensing hypothesis and a second sensing hypothesis that is different from the first sensing hypothesis. The sensing node may measure a first set of sensing measurement data associated with the first sensing hypothesis and a second set of sensing measurement data associated with the second sensing hypothesis. The sensing node may also transmit, for the sensing entity, at least one of: (1) the first set of sensing measurement data and the second set of sensing measurement data, or (2) an indication of the first sensing hypothesis and the second sensing hypothesis. In another example, a sensing entity may receive, from a sensing node, a capability indication of the sensing node. The capability indication of the sensing node may indicate a capability of the sensing node associated with multiple hypothesis measurement and reporting. The sensing entity may transmit, for the sensing node, a sensing configuration. The sensing configuration may be based on the capability indication of the sensing node and may indicate a total number of sensing hypotheses and at least a first sensing hypothesis and a second sensing hypothesis that is different from the first sensing hypothesis. The sensing entity may also receive, from the sensing node, at least one of: (1) a first set of sensing measurement data associated with the first sensing hypothesis and a second set of sensing measurement data associated with the second sensing hypothesis, or (2) an indication of the first sensing hypothesis and the second sensing hypothesis.

Particular aspects of the subject matter described in this disclosure can be implemented to realize one or more of the following potential advantages. In some examples, by utilizing configurations for multi-hypothesis sensing measurements and reporting, the described techniques can be used to track the most optimal operating scenarios for sensing operations to improve sensing operation performance and efficiency. In some examples, by utilizing configurations for multi-hypothesis sensing measurements and reporting, the described techniques can be used to implement adapted sensing measurements for a sensing node, based on prior sensing prior sensing performance, events, conditions, and/or the like, such as implementing any number of range, angle, and/or Doppler sensing measurements for a sensing node with respect to a first TRP, while restricting the sensing node to a single type of sensing measurement for a second TRP. In some examples, by utilizing multiple hypotheses for sensing measurements, the described techniques can be used to provide flexibility to a sensing entity for selecting sensing measurements in performing its sensing computations.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a multi-hypothesis component 198 ("component 198") that may be configured to receive, from a sensing entity, a sensing configuration, the sensing configuration indicating a total number of sensing hypotheses and at least a first sensing hypothesis and a second sensing hypothesis that is different from the first sensing hypothesis. The component 198 may also be configured to measure a first set of sensing measurement data associated with the first sensing hypothesis and a second set of sensing measurement data associated with the second sensing hypothesis. The component 198 may also be configured to transmit, for the sensing entity, at least one of: (1) the first set of sensing measurement data and the second set of sensing measurement data, or (2) an indication of the first sensing hypothesis and the second sensing hypothesis. The component 198 may be configured to receive, from the sensing entity, an adjusted sensing configuration associated with the indication of the first sensing hypothesis and the second sensing hypothesis, where the adjusted sensing configuration indicates at least one of an adjusted total number of sensing hypotheses, an adjusted first sensing hypothesis, or an adjusted second sensing hypothesis. The component 198 may be configured to measure a third set of sensing measurement data and a fourth set of sensing measurement data associated with least one of the adjusted total number of sensing hypotheses, the adjusted first sensing hypothesis, or the adjusted second sensing hypothesis. The component 198 may be configured to transmit, for the sensing entity, the third set of sensing measurement data and the fourth set of sensing measurement data. The component 198 may be configured to receive, from the sensing entity or from a network node and subsequent to the sensing configuration, a hypothesis activation, where the hypothesis activation indicates at least one of the first sensing hypothesis or the second sensing hypothesis from the total number of sensing hypotheses for the measurement. The component 198 may be configured to provide, to the sensing entity, a capability indication of the sensing node, where the capability indication of the sensing node indicates a capability of the sensing node associated with multiple hypothesis (multi-hypothesis) measurement and reporting including at least one of a number of sensing hypotheses supported by the sensing node, a buffer capability of the sensing node, a processing capability of the sensing node, or a related sensing capability of the sensing node. The component 198 may be configured to receive a capability request of the sensing node prior to transmission of the capability indication of the sensing node. In certain aspects, the base station 102 may have a multi-hypothesis component 199 ("component 199") that may be configured to receive, from a sensing node, a capability indication of the sensing node, where the capability indication of the sensing node indicates a capability of the sensing node associated with multiple hypothesis (multi-hypothesis) measurement and reporting. The component 199 may also be configured to transmit, for the sensing node, a sensing configuration, where the sensing configuration is based on the capability indication of the sensing node and indicates a total number of sensing hypotheses and at least a first sensing hypothesis and a second sensing hypothesis that is different from the first sensing hypothesis. The component 199 may also be configured to receive, from the sensing node, at least one of: (1) a first set of sensing measurement data associated with the first sensing hypothesis and a second set of sensing measurement data associated with the second sensing hypothesis, or (2) an indication of the first sensing hypothesis and the second sensing hypothesis. The component 199 may be configured to transmit, for the sensing node, an adjusted sensing configuration associated with the indication of the first sensing hypothesis and the second sensing hypothesis, where the adjusted sensing configuration indicates at least one of an adjusted total number of sensing hypotheses, an adjusted first sensing hypothesis, or an adjusted second sensing hypothesis. The component 199 may be configured to receive, from the sensing node, a third set of sensing measurement data and a fourth set of sensing measurement data associated with least one of the adjusted total number of sensing hypotheses, the adjusted first sensing hypothesis, or the adjusted second sensing hypothesis. The component 199 may be configured to transmit, for the sensing node and subsequent to transmission of the sensing configuration, a hypothesis activation, where the hypothesis activation indicates at least one of the first sensing hypothesis or the second sensing hypothesis from the total number of sensing hypotheses for the measurement. The component 199 may be configured to transmit a capability request of the sensing node prior to reception of the capability indication of the sensing node. That is, aspects provide for multi-hypothesis measurement configuration in RF sensing that enable configuring sensing nodes with multiple hypotheses for performing and reporting sensing operations. A sensing entity is thus enabled to track the performance of hypotheses for updating and/or adaptation for sensing nodes and/or associated TRPs. A sensing node is also enabled, via multiple hypotheses, to perform multiple sensing measurements, respectively, which may improve and/or maintain sensing measurement performance and efficiency, as well as provide flexibility for a sensing entity to select sensing measurements in performing sensing computations.

Figures 2A, 2B, 2C, 2D:
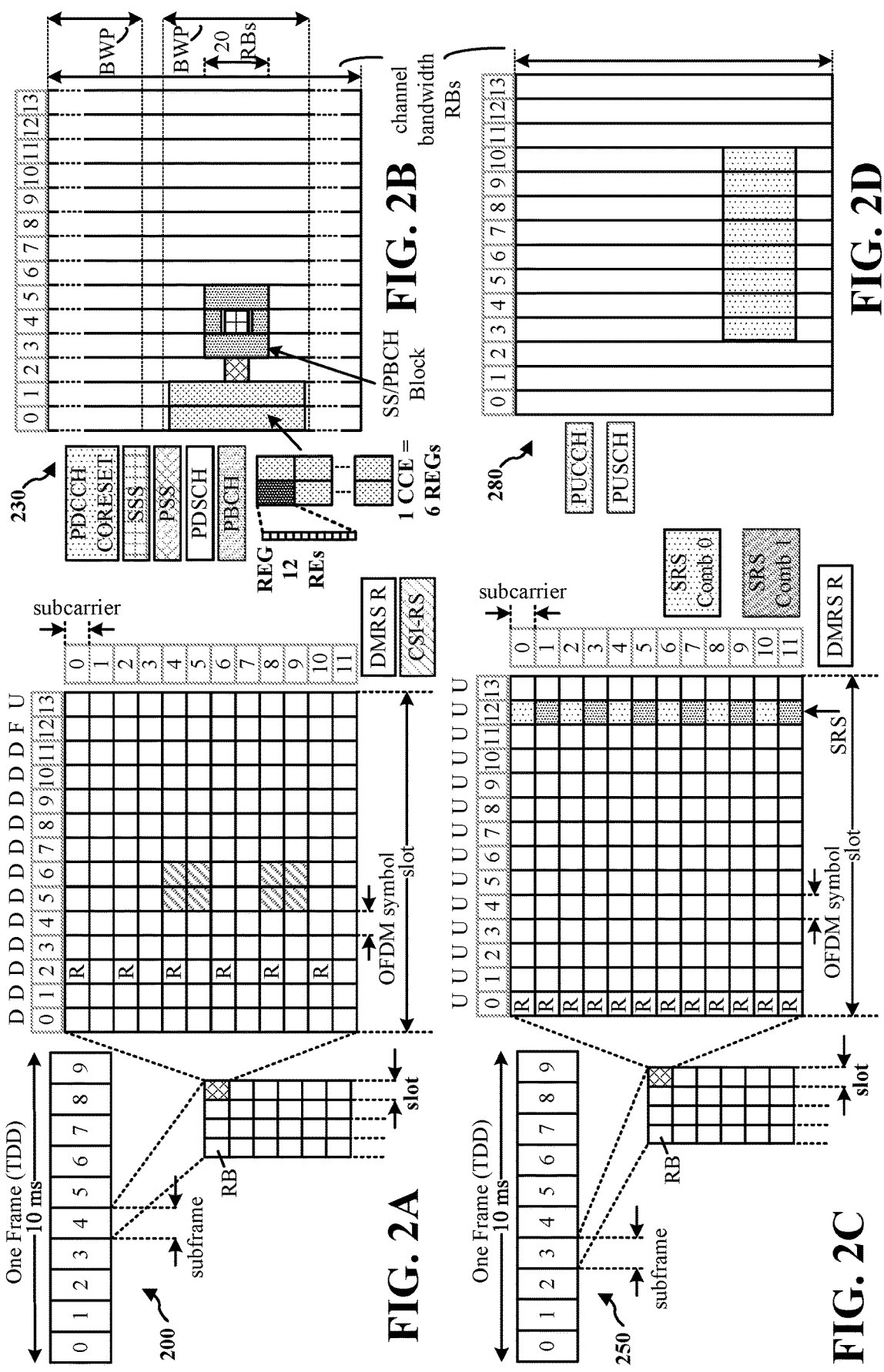
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| μ | SCS<br>$\Delta f = 2^{\mu} \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 2 slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
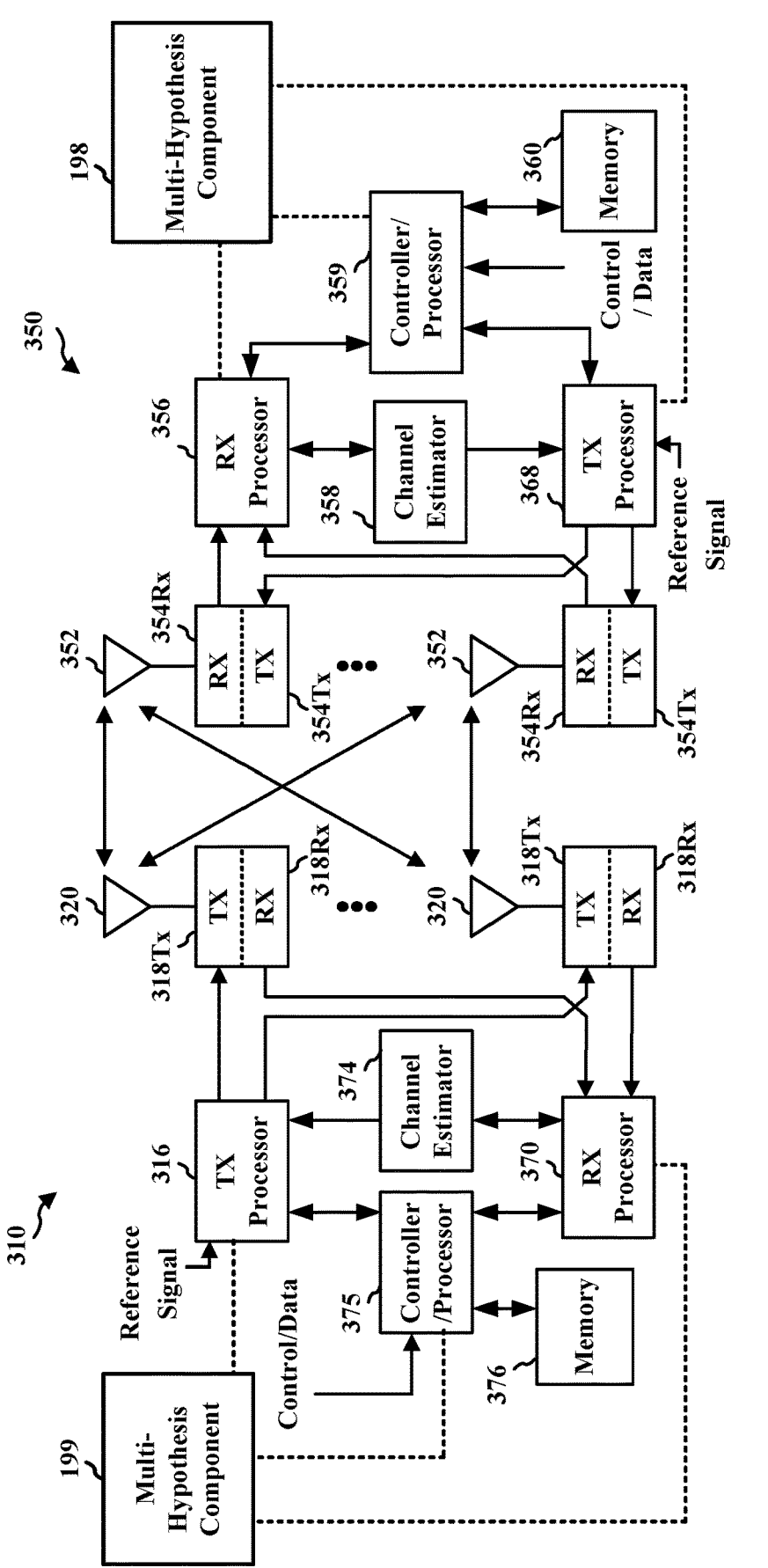
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the component 198 of FIG. 1. At least one of the TX processor 316, the RX processor 370, and the controller/processor 375 may be configured to perform aspects in connection with the component 199 of FIG. 1.

Figure 4:
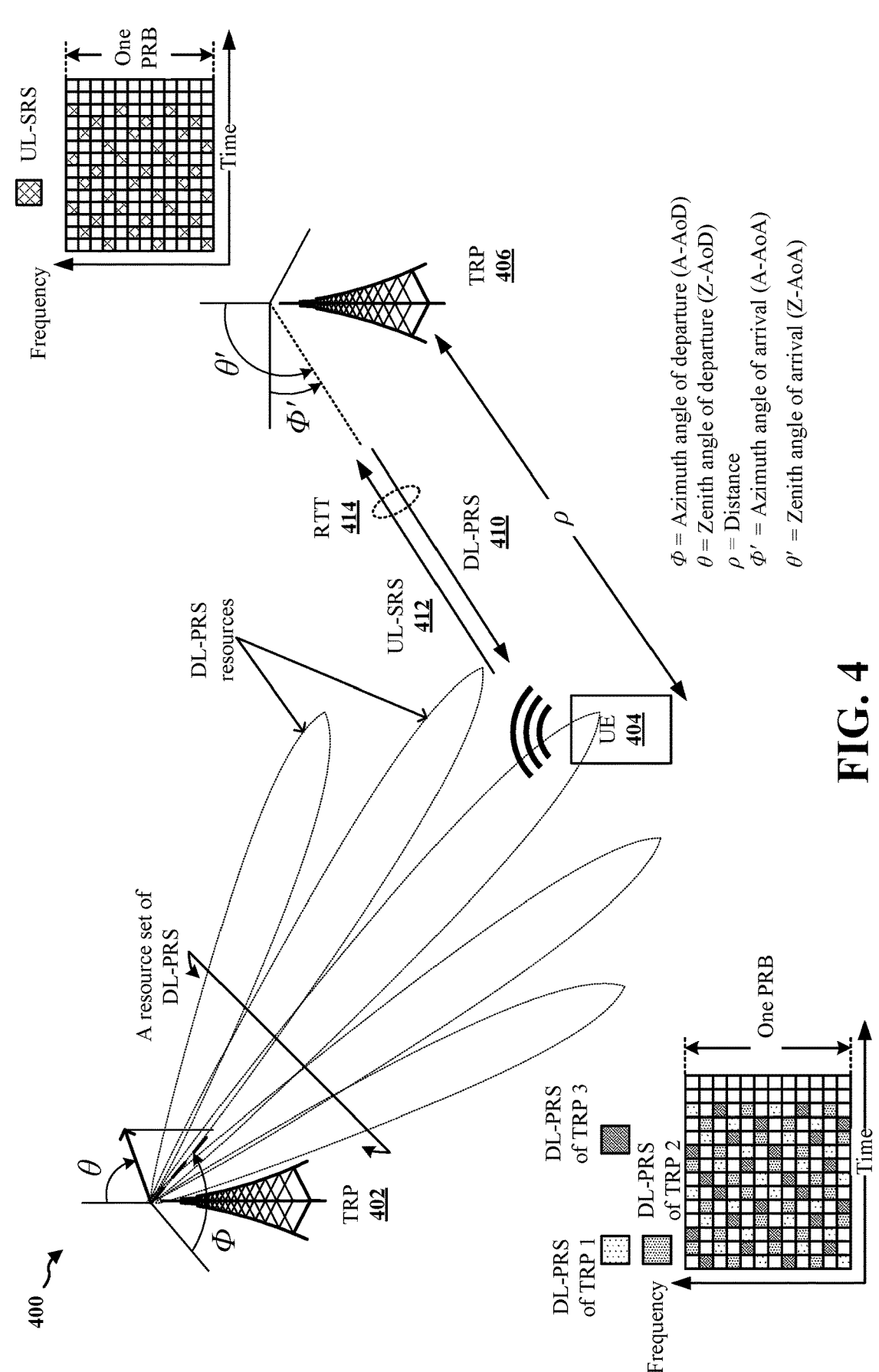
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_RX}-T_{PRS\_TX}|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

In addition to network-based UE positioning technologies, a wireless device (e.g., a UE, an access point (AP), etc.) may also be configured to include sensing capabilities, where the wireless device may be able to sense (e.g., detect and/or track) one or more objects or target entities of an area or in an environment based on radio frequencies. An environment may refer to a particular geographical area or place, especially as affected by human activity, or the circumstances, objects, or conditions by which one is surrounded. For example, a wireless device may include a radar capability (which may be referred to as "RF sensing" and/or "cellular-based RF sensing), where the wireless device may transmit reference signals (e.g., radar reference signals (RRSs)) and measure the reference signals reflected from one or more objects (e.g., structures, walls, living objects, and/or things in an environment, etc.). Based on the measurement, the wireless device may determine or estimate a distance between the wireless device and the one or more objects and/or obtain environmental information associated with its surrounding. In another example, a first wireless device may receive signals transmitted from a second wireless device, where the first wireless device may determine or estimate a distance between the first wireless device and the second wireless device based on the received signals. For example, a tracking device (e.g., a Bluetooth tracker, an item tracker, an asset tracking device, etc.) may be configured to regularly transmit signals (e.g., beacon signals) or small amounts of data to a receiving device, such that the receiving device may be able to monitor the location or the relative distance of the tracking device. As such, a user may be able to track the location of an item (e.g., a car key, a wallet, a remote control, etc.) by attaching the tracking device to the item. For purposes of the present disclosure, a device/apparatus that is capable of performing sensing (e.g., transmitting and/or receiving signals for detecting at least one object or for estimating the distance between the device and the at least one object) may be referred to as a "sensing device," a "sensing node," or a "sensing entity." For example, a sensing device may be a UE, an AP device (e.g., a Wi-Fi router), a base station, a component of the base station, a TRP, a device capable of performing radar functions, etc. Furthermore, a target entity may be any object (e.g., a person, a vehicle, a UE, etc.) for which a positioning or sensing session is performed, for example, to determine a location thereof, a velocity thereof, a heading thereof, a physiological characteristic thereof, etc. In addition, a device/apparatus that is capable of transmitting signals to a sensing device for the sensing device to determine the location or the relative distance of the device/apparatus may be referred to as a "tracking device," a "tracker," or a "tag."

For purposes of the present disclosure, a positioning session may be referred to the transmitting, the receiving, and the measuring of reference signals for the purposes of determining a positioning result or state (e.g., a location, a heading, a velocity, etc.) of a target entity. An RF sensing session may be referred to the transmitting, the receiving, and the measuring of reference signals for the purposes of determining a sensing result or state of an environment in which the target entity is included (e.g., a change in the environment), at least one physiological characteristic of a target entity, a location of the target entity, a velocity of the target entity, a heading of the target entity, etc.

Wireless communication networks and/or wireless devices may operate as sensing nodes (e.g., a node at which a sensing measurement operation may be performed, such as a UE, a base station, a TRP, etc.) and/or as sensing entities (e.g., a network entity by which sensing configurations are provided and sensing computations may be performed for wireless device tracking, such as a base station, a LMF, etc.). Specific sensing waveforms like RADAR waveforms may be utilized for communications and/or radio frequency (RF) sensing by sensing nodes and/or sensing entities. For instance, a RF sensing operation against a sensing target may be performed by a sensing node via a sensing waveform, and sensing measurement results for the sensing operation against the sensing target may be provided to a sensing entity via RSs. In some scenarios, such as Doppler measurements and virtual multiple-input and multiple-output (MIMO) array processing, phase-coherent RSs may improve, or even enable, RF sensing operations. However, maintaining phase coherency for RS transmissions, such as in a PRS or a SRS, may be affected by hardware configurations/capabilities, beam switching operations, data servicing in cellular systems, and/or the like, which in turn may impact sensing operation performance. As noted above, sensing environments with sensing targets that move at relatively low speeds (e.g., no more than 2-3 m/s) may utilize larger windows of time (e.g., 10-20 ms, 2 frames, etc.) for sensing operations to achieve a desired sensing performance, but maintaining coherent transmission over larger windows of time for sensing operations may be difficult or unachievable, which may result in impacted sensing performance. That is, sensing over a long window of time may not yield consistent or viable sensing measurement results as such operations over longer time windows may not guarantee transmission of coherent signals for such a period of time.

The described aspects provide for multi-hypothesis measurement configuration in RF sensing for sensing measurements that enable wireless devices, e.g., sensing nodes, and base stations/LMFs, e.g., sensing entities, to improve and maintain sensing measurement performance and efficiency through configuration and utilization of multiple sensing hypotheses. For instance, aspects herein provide for a sensing node that may be configured to receive, from a sensing entity, a sensing configuration that may indicate a total number of sensing hypotheses and a first sensing hypothesis and a second sensing hypothesis that is different from the first sensing hypothesis. The sensing node may be configured to measure a first set of sensing measurement data (e.g., data obtained from performing sensing measurements on a signal) associated with the first sensing hypothesis and a second set of sensing measurement data associated with the second sensing hypothesis, and to transmit, for the sensing entity, at least one of: (1) the first set of sensing measurement data and the second set of sensing measurement data, or (2) an indication of the first sensing hypothesis and the second sensing hypothesis. A sensing entity may be configured to receive, from a sensing node, a capability indication of the sensing node that may indicate a capability of the sensing node associated with multiple hypothesis measurement and reporting. The sensing entity may be configured to transmit, for the sensing node, a sensing configuration (e.g., that may be based on the capability indication of the sensing node and may indicate a total number of sensing hypotheses and at least a first sensing hypothesis and a second sensing hypothesis that is different from the first sensing hypothesis), and to receive, from the sensing node, at least one of: (1) a first set of sensing measurement data associated with the first sensing hypothesis and a second set of sensing measurement data associated with the second sensing hypothesis, or (2) an indication of the first sensing hypothesis and the second sensing hypothesis.

Accordingly, aspects described herein improve and maintain sensing measurement performance and efficiency. For example, a sensing entity may track the most optimal operating scenarios for sensing operations to improve sensing operation performance and efficiency based on configurations for multi-hypothesis sensing measurements and reporting. As an example, a sensing node may be configured with a first and a second sensing hypothesis: the first sensing hypothesis may indicate a portion or subset of sensing occasions for a sensing resource set, while the second sensing hypothesis may indicate the full set of the sensing occasions for the sensing resource set. Configurations may also utilize multi-hypothesis sensing measurements and reporting to implement dynamic/adapted sensing measurements for a sensing node based on prior sensing performance, events, conditions, and/or the like. As an example, the sensing entity may implement any number of range, angle, and/or Doppler sensing measurements for a sensing node with respect to a first TRP, while restricting the sensing node to a single type of sensing measurement for a second TRP. Further, utilizing multiple hypotheses for sensing measurements may provide flexibility to a sensing entity for selecting sensing measurements in performing its sensing computations. As examples, a sensing entity may obtain/ have side information indicative of whether a phase discontinuity may have occurred, and thus may use the first sensing hypothesis for sensing computations. The sensing entity may be enabled to perform more conservative computations and utilize the first sensing hypothesis in some cases. Moreover, even if the sensing entity does not receive an indication of phase discontinuity, the sensing entity may run an outlier rejection algorithm and determine that utilizing the second sensing hypothesis may lead to an outlier, which may indicate that an associated TRP has lost phase continuity or may indicate that the associated TRP does not guarantee phase coherence over a long window. If the latter observation by the sensing entity holds true for many sensing sessions, the sensing entity may avoid using the associate TRP for Doppler measurements or may adjust its window accordingly. In aspects, a network node and/or sensing entity may be configured to compare the sets of sensing measurement data based on each utilized sensing hypothesis. If the difference represented by the comparison is greater than, or greater than or equal to, a threshold, this may indicate that a second hypothesis may not be reliable, and/or may indicate that each hypothesis measurement is not reliable. Additionally, aspects are applicable to 5G NR and may also be extended to 5G Enhanced and 6G applications.

While various aspects may be described in the context of phase coherency in sensing and of positioning resources for descriptive and illustrative purposes, aspects are not so limited and may be applicable to other types of resources and operations, as would be understood by persons of skill in the relevant art(s) having the benefit of this disclosure.

Figure 5:
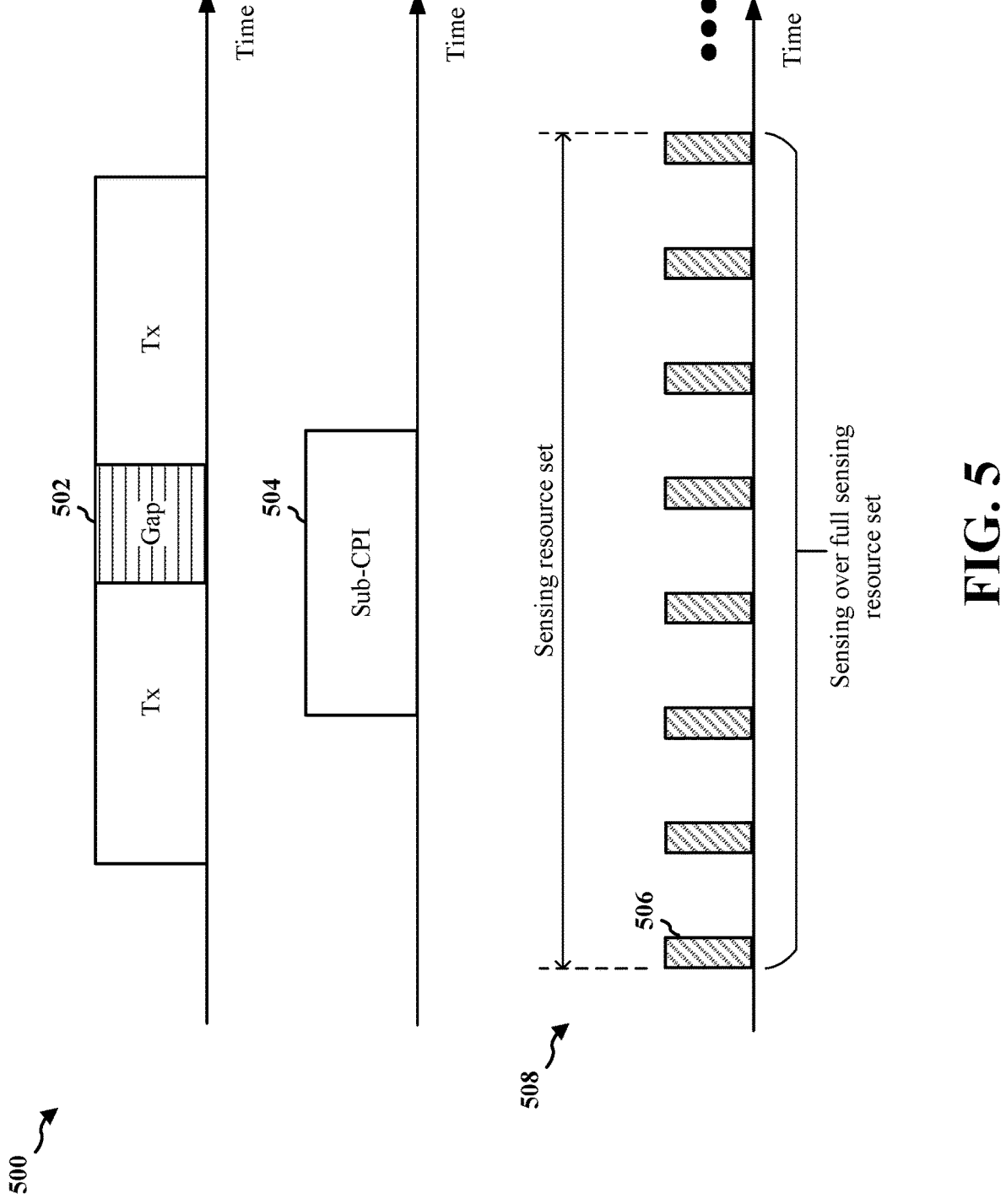
FIG. 5 is a diagram illustrating an example sensing operation and sensing measurement transmissions, in accordance with various aspects of the present disclosure.

FIG. 5 is a diagram 500 illustrating an example sensing operation and sensing measurement transmissions, in accordance with various aspects of the present disclosure. As noted above, maintaining phase coherency for RS transmissions, such as in a PRS or a SRS, may be affected by hardware configurations/capabilities, beam switching operations, data servicing in cellular systems, and/or the like, which in turn may impact sensing operation performance.

In diagram 500, a sensing node may be configured to transmit a coherent RS with sensing measurement data based on sensing measurements in a transmission gap 502. Utilizing the transmission gap 502 may enable the sensing node to transmit coherent RSs without interruptions/interference as the sensing node is not expected to perform other operations during the transmission gap 502. In another example, a sensing node may be configured avoid phase coherence discontinuity for RS transmissions by transmitting sensing measurement data in a sub-coherent processing interval (CPI) 504. The sub-CPI interval 504 may be indicated by a sensing entity and may enable a sensing node, based on prior signaling, for example, to transmit in locations where phase coherency discontinuities have not happened.

In diagram 500, a sensing operation 508 is also shown. The sensing operation 508 is illustrated as including at least one sensing occasion 506. The number of the sensing occasion 506 shown may represent a full sensing resource set over which a sensing operation may be performed by a sensing node to obtain/measure sensing measurement data.

Figure 6:
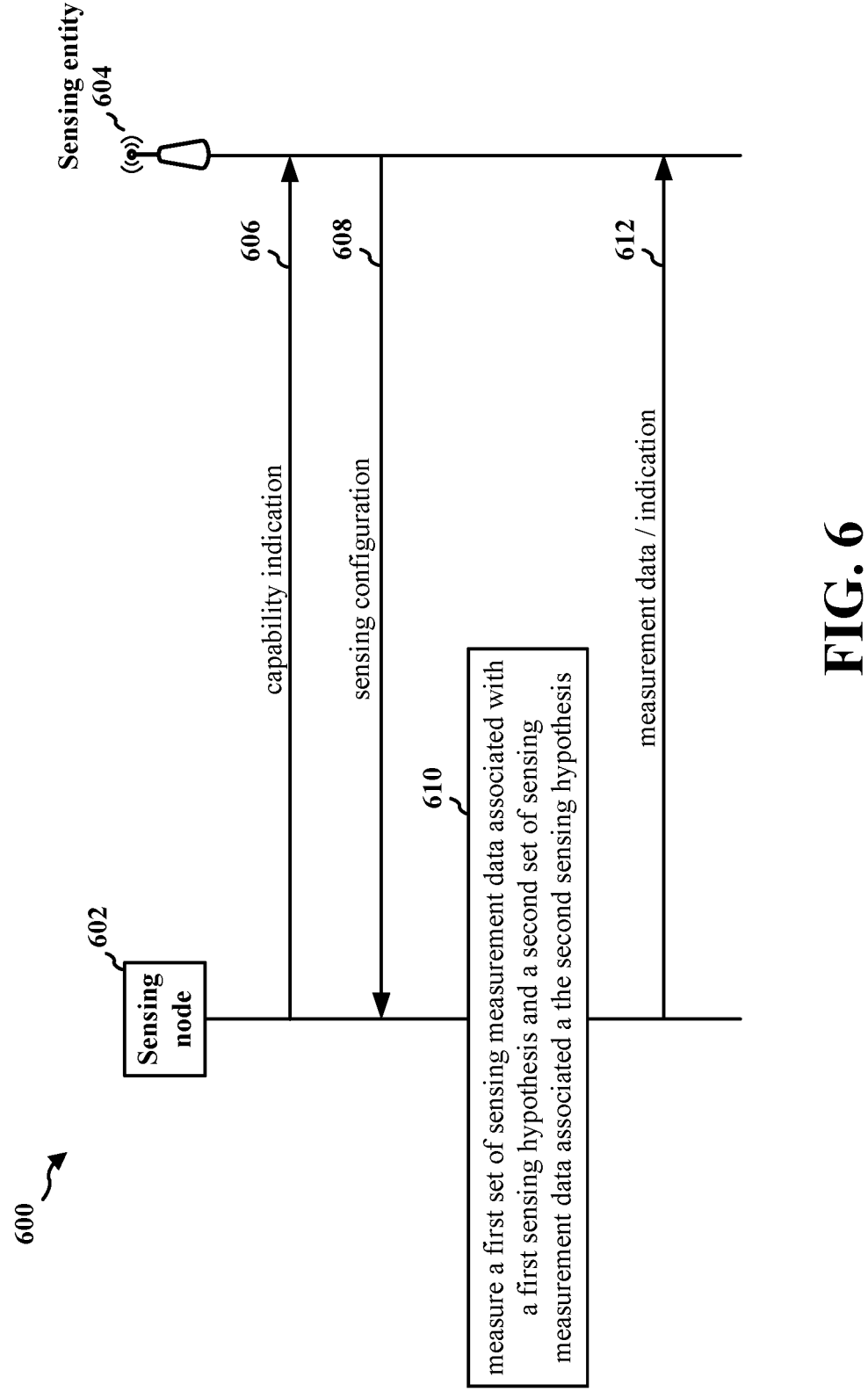
FIG. 6 is a call flow diagram for wireless communications, in accordance with various aspects of the present disclosure.

FIG. 6 is a call flow diagram 600 for wireless communications, in various aspects. Call flow diagram 600 illustrates multi-hypothesis measurement configuration in RF sensing for sensing measurements by a sensing node (e.g., a sensing node 602, such as a UE, a base station, a sidelink (SL) UE, a TRP, a roadside unit (RSU), a positioning reference unit (PRU), etc.) that may communicate with and/or performing sensing operations with/without a sensing entity (e.g., a sensing entity 604, such as a base station, a gNB, or other type of base station or network node, a UE, a LMF, etc., by way of example, as shown). Aspects described for the sensing entity 604 may be performed by the sensing entity in aggregated form and/or by one or more components of the sensing entity 604 in disaggregated form. Additionally, or alternatively, the aspects may be performed by the sensing node 602 autonomously, in addition to, and/or in lieu of, operations of the sensing entity 604.

In the illustrated aspect, the sensing node 602 may be configured to provide, for the sensing entity 604, a capability indication 606 of the sensing node 602. The capability indication 606 of the sensing node 602 may indicate a capability of the sensing node associated with multiple hypothesis measurement and reporting. For example, the capability indication 606 may indicate capabilities to operate under multiple hypotheses per sensing occasion, including: a number of sensing hypotheses supported by the sensing node 602, a buffer capability of the sensing node 602, a processing capability of the sensing node 602, a related sensing capability of the sensing node 602, and/or the like, in aspects.

The capability indication 606 may be based on a solicited request, e.g., from the sensing entity 604, or may be unsolicited/requested, e.g., provided/transmitted to the sensing entity 604 without a request. That is, the sensing node 602 may be configured to provide the capability indication 606 in response to a capability request or without/before a capability request. In aspects, the sensing entity 604 may be configured to request the sensing node 602 to indicate its capability to run multiple hypothesis measurement and reporting. In such aspects, the sensing node 602 may be configured to indicate its support to run multiple hypothesis via the capability indication 606. The capability indication 606 may also indicate how many hypotheses can be supported by the sensing node 602 and/or any related sensing capabilities, along with buffer/processing capabilities of the sensing node 602.

The sensing node 602 may be configured to receive, from the sensing entity 604, a sensing configuration 608. The sensing configuration 608 may be based on the capability indication 606. The sensing configuration 608 may indicate a total number of sensing hypotheses and at least a first sensing hypothesis and a second sensing hypothesis that is different from the first sensing hypothesis. In aspects, a sensing hypothesis may be an indication/configuration of a set or subset of sensing resources for which sensing is performed. For example, the sensing entity 604 may be configured to transmit/provide, for the sensing node 602, the sensing configuration 608 that indicates the number of sensing hypotheses, including the hypotheses themselves, for obtaining sensing measurement data for sensing operations. In aspects, for the total number of sensing hypotheses, each sensing hypothesis configuration in the sensing configuration 608 may specify a set of sensing measurements to be performed by the sensing node 602 and the corresponding reference signals (e.g., as a set, as a set of different signals, etc.) by which the set of sensing measurements are to be reported by the sensing node 602.

The sensing configuration 608 may indicate, from the total number of sensing hypotheses, a first sensing hypothesis that corresponds to a subset of sensing occasions of a sensing resource set and/or a second sensing hypothesis that corresponds to a full set of the sensing occasions in the sensing resource set. In aspects, a sensing resource set may be one or more instances or occasions of a resource in a references signal. The sensing configuration 608 may also indicate the sensing measurements as a subset of a range(s), an angle(s), a Doppler measurement(s), and/or the like, in aspects, and the sensing configuration may further indicate at least one of a same transmission occasion (e.g., at least a portion of resource of a transmission signal by which data/information may be transmitted) for reporting/transmitting sets of sensing measurement data or a first transmission occasion for a first set of sensing measurement data and a second transmission occasion for a second set of sensing measurement data. In aspects, the sensing configuration 608 may indicate a set of corresponding reference signals respectively associated with each of the total number of sensing hypotheses and transmission occasions for reporting, as described herein, and one or more of the reference signals in the set of corresponding reference signals may be different from other signals in the set of corresponding reference signals. In aspects, at least one of the first set of sensing measurement data or the second set of sensing measurement data may be associated with at least one corresponding reference signal and at least one of a range, an angle, or a Doppler measurement, based on the sensing configuration 608.

The sensing node 602 may be configured to measure (at 610) a first set of sensing measurement data associated with the first sensing hypothesis and a second set of sensing measurement data associated with the second sensing hypothesis. For instance, the sensing node 602 may perform sensing operations for measurements according to the configured sensing hypotheses in the sensing configuration 608. The sets of sensing measurement data obtained via the sensing operations measured (at 610) may include one or more of the indicated sensing measurements of a subset of a range(s), an angle(s), a Doppler measurement(s), and/or the like, from sensing configuration 608. In aspects, the measurement (at 610) may include sensing measurements associated with one or more TRPs, based on the sensing configuration 608. In aspects, the sensing node 602 may be configured to measure (at 610) a first set of sensing measurement data associated with a first sensing hypothesis in a subset of sensing occasions of a sensing resource set and a second set of sensing measurement data associated with a second sensing hypothesis in the full set of the sensing occasions of the sensing resource set.

The sensing node 602 may be configured to transmit, for the sensing entity 604, measurement data/indication 612. For example, the sensing node 602 may be configured to transmit, for the sensing entity 604 and as the measurement data/indication 612, at least one of: (1) the first set of sensing measurement data and the second set of sensing measurement data, or (2) an indication of the first sensing hypothesis and the second sensing hypothesis. The first set of sensing measurement data and the second set of sensing measurement data of the measurement data/indication 612 may include a subset of a range(s), an angle(s), a Doppler measurement(s), and/or the like, as indicated in sensing configuration 608. The indication of the first sensing hypothesis and the second sensing hypothesis may indicate at least one of the first sensing hypothesis or the second sensing hypothesis that was utilized for to measure (e.g., at 610) the first set or the second set of sensing measurement data. For instance, in aspects for which the sensing node 602 or a network node (e.g., a base station) activates a sensing hypothesis instead of the sensing entity 604, the sensing node 602 may be configured to transmit the utilized sensing hypothesis for the sensing entity 604 as part of the measurement data/indication 612 so that the sensing entity 604 is aware of the utilized sensing hypothesis(es).

In aspects, at least one of the first set of sensing measurement data and the second set of sensing measurement data or the indication of the first sensing hypothesis and the second sensing hypothesis of the measurement data/indication 612 may also include information associated with at least one of a measurement characteristic, an outlier rejection, or a measurement efficacy for one or more of the first set of sensing measurement data associated with the first sensing hypothesis and the second set of sensing measurement data associated with the second sensing hypothesis.

In some aspects, transmitting the first set of sensing measurement data and the second set of sensing measurement data of the measurement data/indication 612 in the same transmission occasion includes transmitting in the same transmission occasion on a first reference signal of the set of corresponding reference signals, e.g., as configured via sensing configuration 608. In some aspects, transmitting the first set of sensing measurement data (e.g., the measurement data/indication 612) in the first transmission occasion is performed on a first reference signal of the set of corresponding reference signals, and transmitting the second set of sensing measurement data (the measurement data/indication 612) in the second transmission occasion is performed on a second reference signal of the set of corresponding reference signals.

Referring back again to the sensing configuration 608, the measure (at 610) of the first set and the second set of sensing measurements by the sensing node 602, and the measurement data/indication 612, the first set of sensing measurement data and the second set of sensing measurement data, and/or the indication of the first sensing hypothesis and the second sensing hypothesis (e.g., the measurement data/indication 612) may also include in aspects, information associated with a measurement characteristic, an outlier rejection, and/or a measurement efficacy for one or more of the first set of sensing measurement data associated with the first sensing hypothesis and the second set of sensing measurement data associated with the second sensing hypothesis. That is, while aspects herein provide for network-based solutions, multi-hypothesis measurements for sensing computations also applies to UE-based solutions. Thus, in aspects for a UE-based sensing session, a sensing node may configure a UE for multi-hypothesis measurements, and the UE may report to the sensing entity which sensing hypothesis generated better results.

Accordingly, the sensing node 602 may be configured to transmit, for the sensing entity 604, information associated with the measurement characteristic, the outlier rejection, and/or the measurement efficacy based on the measure (at 610), described above. Aspects herein provide that the sensing node 602 may be configured to receive, e.g., from the sensing entity 604, an adjusted sensing configuration, which may be a further aspect of the sensing configuration 608 in call flow diagram 600 of FIG. 6. The adjusted sensing configuration may be associated with the indication of the first sensing hypothesis and the second sensing hypothesis, as similarly described above for the sensing configuration 608, and the adjusted sensing configuration may indicate at least one of an adjusted total number of sensing hypotheses, an adjusted first sensing hypothesis, or an adjusted second sensing hypothesis. In aspects, the adjusted sensing configuration may be provided to the sensing node 602 from the sensing entity 604 based on the information associated with the measurement characteristic, the outlier rejection, and/or the measurement efficacy.

The sensing node 602 may thus be enabled/configured to measure (e.g., as similarly described for 610) a third set of sensing measurement data and/or a fourth set of sensing measurement data associated with the adjusted total number of sensing hypotheses, the adjusted first sensing hypothesis, and/or the adjusted second sensing hypothesis, as similarly described for the measure (at 610) in call flow diagram 600. The sensing node 602 may be configured to then transmit, for the sensing entity 604, the third set of sensing measurement data and the fourth set of sensing measurement data, as similarly described for transmitting the measurement data/indication 612.

An example of when a UE-based sensing session may be applied (e.g., where the sensing node 602 may be a UE), a scenario is described here for a UE (e.g., a car) with access to a velocity sensor. By comparing a velocity estimation from each of two configured hypotheses to the ground truth velocity obtained from the velocity sensor, the UE may be configured to determine which of the two configured hypothesis performed better. Such an indication may be reported to a sensing entity. Based on the indication/information from the UE, the sensing entity may configure adjusted hypotheses and/or measurements for other UEs in subsequent sensing sessions (e.g., by excluding Doppler measurements from a certain TRP). As another example, a UE may be configured to execute an outlier rejection algorithm and determine one of the hypotheses leads to an outlier. This outlier may be reported to the network entity for further adjusted configurations.

Figure 7:
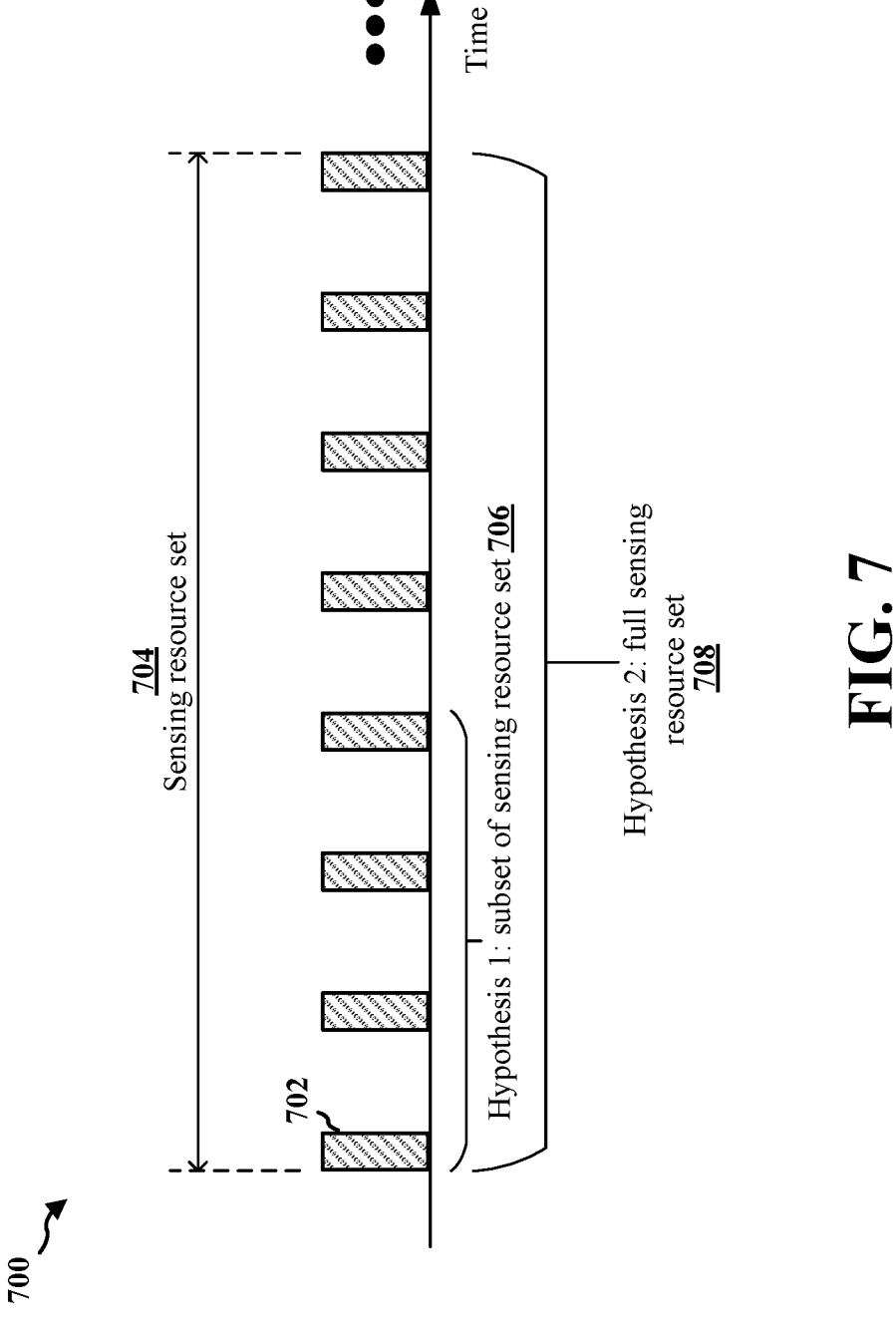
FIG. 7 is a diagram illustrating an example multi-hypothesis configuration for sensing operations, in accordance with various aspects of the present disclosure.

FIG. 7 is a diagram 700 illustrating an example multi-hypothesis configuration for sensing operations, in various aspects. In aspects herein, a sensing hypothesis may correspond to a type of sensing measurement that may be configured with certain reference signals. The illustrated aspect in diagram 700 includes at least one sensing occasion 702 (e.g., a resource of a signal for which sensing is performed). The number of the sensing occasion 702 shown may represent a full sensing resource set 704 over which a sensing operation may be performed for a sensing session by a sensing node to obtain/measure sets of sensing measurement data. In aspects herein for multi-hypothesis measurement configuration in RF sensing for sensing measurements, by way of example, a first sensing hypothesis 706 and a second sensing hypothesis 708 may be utilized in the obtaining the sensing measurements.

The first sensing hypothesis 706 and the second sensing hypothesis 708 may include different numbers of the sensing occasion 702. For instance, the first sensing hypothesis 706 may be a subset of the full set of the sensing occasion 702 in the sensing resource set 704. As one example and as shown, the first sensing hypothesis 706 may include half, or approximately half, of the number of the sensing occasion 702 in the sensing resource set 704. In other examples, other numbers of the sensing occasion 702 in the sensing resource set 704 may be utilized for the first sensing hypothesis 706. For the second sensing hypothesis 708, the full set of the number of the sensing occasion 702 in the sensing resource set 704 may be utilized, in aspects, although it is contemplated herein that other numbers of the sensing occasion 702 in the sensing resource set 704 may be utilized for the second sensing hypothesis 708.

The first sensing hypothesis 706 and the second sensing hypothesis 708 may be aspects of the sensing hypotheses described above with respect to FIG. 6, and elsewhere herein, such as in FIG. 7. For instance, and with reference back to FIG. 6 and call flow diagram 600, the sensing node 602 and/or the sensing entity 604 may be configured to perform sensing computations based on sets of sensing measurement data that is measured according to the first sensing hypothesis 706 and/or the second sensing hypothesis 708.

As one example, a sensing entity (e.g., sensing entity 604) may generate a Doppler map based on the first half of the sensing occasions 702 from the sensing resource set 704, such as is illustrated for the first sensing hypothesis 706. On the other hand, a sensing entity (e.g., sensing entity 604) may generate a Doppler map based on the full set of the sensing occasions 702 of the sensing resource set 704, such as is illustrated for the second sensing hypothesis 708. As another example, a sensing entity (e.g., sensing entity 604) may be configured to generate a range map based on coherent processing across the sensing resource set 704, and/or may be configured to generate a range map based on non-coherent processing across the sensing resource set 704, in various aspects.

Figure 8:
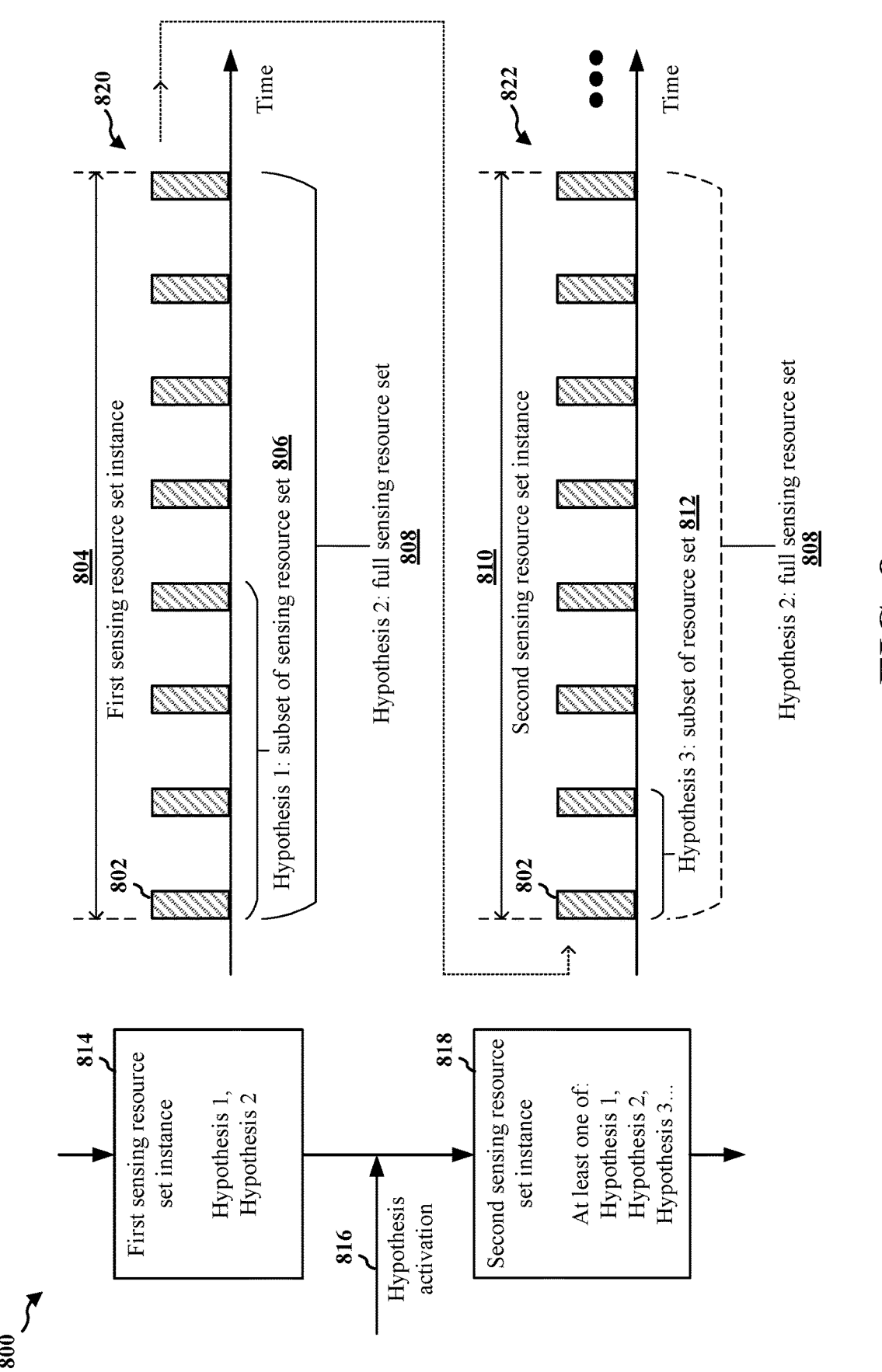
FIG. 8 is a diagram illustrating an example hypothesis activation for sensing operations, in accordance with various aspects of the present disclosure.

FIG. 8 is a diagram 800 illustrating an example hypothesis activation for sensing operations, in various aspects. Diagram 800 may be a further and/or continued aspect of diagram 700 in FIG. 7. The illustrated aspect in diagram 800 includes at least one sensing occasion 802 for a sensing session that includes a first portion 820 and a second portion 822. The number of the sensing occasion 802 shown may represent a full first sensing resource set 804 and a full second sensing resource set 810 over which a sensing operation(s) may be performed for a sensing session by a sensing node to obtain/measure sets of sensing measurement data. In aspects herein for multi-hypothesis measurement configuration in RF sensing for sensing measurements, by way of example, a first sensing hypothesis 806, a second sensing hypothesis 808, and a third sensing hypothesis 812 may be utilized in the obtaining the sensing measurements.

The first sensing hypothesis 806, the second sensing hypothesis 808, and the third sensing hypothesis 812 may include different numbers of the sensing occasion 802. For instance, the first sensing hypothesis 806 may be a subset of the full set of the number of the sensing occasion 802 in the first sensing resource set 804. As one example and as shown, the first sensing hypothesis 806 may include half, or approximately half, of the number of the sensing occasion 802 in the first sensing resource set 804. In other examples, other numbers of the sensing occasion 802 in the first sensing resource set 804 may be utilized for the first sensing hypothesis 806. For the second sensing hypothesis 808, the full set of the number of the sensing occasion 802 in the first sensing resource set 804/the second sensing resource set 810 may be utilized, in aspects, although it is contemplated herein that other numbers of the sensing occasion 802 in the first sensing resource set 804/the second sensing resource set 810 may be utilized for the second sensing hypothesis 808. The third sensing hypothesis 812 may, by way of example, also be a subset of the full set of the number of the sensing occasion 802 in the second sensing resource set 810. As one example and as shown, the third sensing hypothesis 812 may include less than half, or approximately one fourth, of the number of the sensing occasion 802 in the second sensing resource set 810. In other examples, other numbers of the sensing occasion 802 in the second sensing resource set 810 may be utilized for the third sensing hypothesis 812.

The first sensing hypothesis 806, the second sensing hypothesis 808, and the third sensing hypothesis 812 may be aspects of sensing hypotheses described above with respect to FIG. 6, and elsewhere herein, such as in FIG. 7. For instance, and with reference back to FIG. 6 and call flow diagram 600, the sensing node 602 and/or the sensing entity 604 may be configured to perform sensing computations based on sets of sensing measurement data that is measured according to the first sensing hypothesis 806, the second sensing hypothesis 808, and/or the third sensing hypothesis 812.

In the first portion 820 of the sensing operation illustrated in diagram 800, a sensing node may be configured to measure (at 814), for ones of sensing occasion 802, sets of sensing measurement data for the first sensing resource set 804 utilizing the first sensing hypothesis 806 and the second sensing hypothesis 808. According to aspects, these sets of sensing measurement data may be transmitted/provided for a sensing entity. The sensing node may be configured to then receive a hypothesis activation 816, e.g., form sensing entity or a network node. In aspects, a hypothesis activation may be an indication/configuration to activate and utilize one or more specific hypotheses for sensing. The provision/reception of the hypothesis activation 816 may be based on the sets of sensing measurement data and/or on additional information included therewith (e.g., a measurement characteristic, an outlier rejection, a measurement efficacy for one or more of the sets of sensing measurement data, loss of coherence, and/or the like, as described herein). In aspects, the hypothesis activation 816 may include an indication of one or more sensing hypotheses to be utilized by a sensing node. In the illustrated aspect, the hypothesis activation 816 may include an indication of the third sensing hypothesis 812 to be utilized by the sensing node in the second portion 822 of the illustrated sensing session.

The sensing node may thus be configured to measure (at 818) based on the hypothesis activation 816, for ones of sensing occasion 802, sets of sensing measurement data for the second sensing resource set 810 utilizing the third sensing hypothesis 812 and the second sensing hypothesis 808. According to aspects, these sets of sensing measurement data may be transmitted/provided for a sensing entity. Some aspects may also provide for the third sensing hypothesis 812 to be utilized in the second portion 822, without utilizing the second sensing hypothesis 808, based on the hypothesis activation 816.

In aspects, provision/reception of the hypothesis activation 816 may occur during a sensing session, as illustrated, or may occur prior to a sensing session (e.g., in a case where the measure (at 814) does not take place but the first sensing hypothesis 806 and the second sensing hypothesis 808 are configured by a sensing configuration, as described herein). Additionally, the hypothesis activation 816 may activate one or more sensing hypotheses, in aspects, and may be utilized to improve performance, accuracy, efficiency, and/or the like, for sensing measurement operations, node operations generally, etc. For instance, with respect to energy savings on the sensing node, the sensing entity may request the sensing node to perform sensing measurements on a subset of measurements with a negligible performance loss by activating the corresponding sensing hypothesis, e.g., the sensing hypothesis 812, reducing the sensing and associated processing/transmission power. An example of this is illustrated in diagram 800 by activating the third sensing hypothesis 812 instead of the first sensing hypothesis 806 (with or without the second sensing hypothesis 808). As another example, based on multi-hypothesis measurements analysis, the sensing entity may estimate that Doppler measurements from one TRP are not valid (e.g., its transmissions are not phase-coherent). The sensing entity may deactivate Doppler measurements from that TRP by activating the corresponding hypothesis.

It may also be noted that the sensing node may obtain side information about Doppler estimates through other sources, such as a velocity sensor on a UE whose output is shared with the sensing entity. Thus, the sensing entity may be configured to utilize such side information to validate the Doppler measurements from a certain TRP. Additionally, the activation of a subset of sensing hypotheses may occur multiple times within a sensing session. As one example, in a scenario for a periodic sensing session, the sensing node may be configured to adjust the utilized sensing hypotheses, e.g., as best improves sensing operations.

Figure 9:
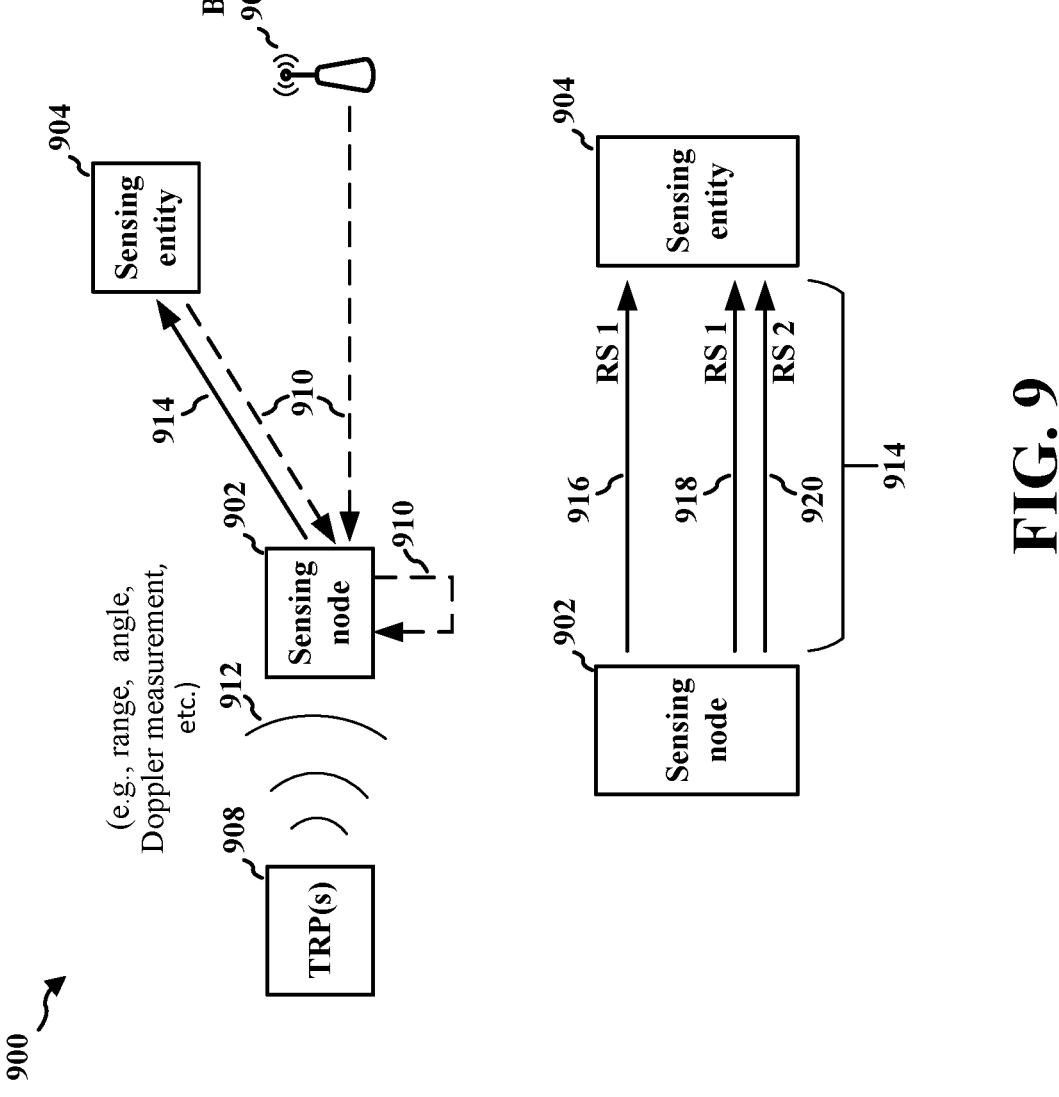
FIG. 9 is a diagram illustrating an example hypothesis activation and reporting for sensing operations, in accordance with various aspects of the present disclosure.

FIG. 9 is a diagram 900 illustrating an example hypothesis activation and reporting for sensing operations, in various aspects. Diagram 900 includes a sensing node 902, a sensing entity 904, a network node (e.g., a base station 906), and one or more TRPs 908 (which may be a sensing target(s), in aspects).

In aspects, as described above, hypothesis activations may be utilized in sensing operations to specifically activate one or more sensing hypothesis. Diagram 900 shows a hypothesis activation 910, which may be initiated by the sensing node 902 itself, by the sensing entity 904 for the sensing node 902, and/or by the base station 906 (e.g., the network node) for the sensing node 902. The hypothesis activation 910 may be provided/transmitted, received, obtained, implemented, etc., subsequent to receiving a sensing configuration, including before sensing sessions and/or during sensing sessions. The hypothesis activation 910 may indicate at least one sensing hypothesis from a total number of sensing hypotheses for performing measurements in sensing operations.

In aspects, the sensing entity 904 may be a LMF, and the hypothesis activation 910 may be associated with a coherency condition of the sensing node 902. In some aspects, the hypothesis activation 910 may be received by the sensing node 902, as transmitted/provided from the base station 906 (e.g., from a network node), via at least one of RRC signaling, a medium access control (MAC) control element (MAC-CE), or DCI. In cases where the sensing entity 904 may be a network entity, such as an LMF, communications between the sensing entity 904 and the sensing node 902 may be via proper signaling such as LTE positioning protocol (LPP), which may be a higher layer signaling. The base station 906, e.g., a network node, may be configured to dynamically activate a subset of sensing hypotheses via the hypothesis activation 910 based on specific conditions. As one example, the base station 906 may be aware of a beam switch in between sensing reference signal transmissions, which may invalidate the phase coherence property of the sensing reference signals. Based on that knowledge, the base station 906 may be configured to activate a subset of sensing hypothesis, via the hypothesis activation 910, to be measured by the sensing node 902 and reported to the sensing entity 904.

In some aspects, the sensing node 902 may be a SL UE, the sensing entity 904 may be a UE, and the hypothesis activation 910 may be associated with a coherency condition of the sensing node 902. The hypothesis activation 910 may be received by the sensing node 902, as transmitted/provided from the sensing entity 904, via a sidelink channel by at least one of direct communication (PC5) RRC signaling, a PC5 MAC-CE, SL control information (SCI) stage 1, or SCI stage 2. As one example, a UE, acting as the sensing entity 904, may be configured, via the sidelink channel, to configure a participating SL UE, acting as the sensing node 902, with multiple sensing hypotheses from which the hypothesis activation 910 triggers/selects at least one sensing hypothesis. The SL UE may then perform the multi-hypothesis measurements utilizing the triggered/selected sensing hypothesis(es) and report resulting sensing measurement data and the utilized sensing hypothesis(es) back to the UE.

In some aspects, activation of hypothesis measurements via the hypothesis activation 910, and corresponding reporting, may be based on one or more events. That is, aspects herein provide for the sensing node 902 to trigger the hypothesis activation 910, as noted above. Once the configured event(s) is triggered, one or more sensing hypotheses may be autonomously utilized by the sensing node 902 for performing sensing measurements, to generate sensing measurement data, which may be subsequently reported by the sensing node 902 to the sensing entity 904. As one example of a triggering event, the sensing node 902, e.g., a UE, may experience a mobility event and/or cell switching. In such cases, the sensing node 902 may move between a first area and a second area or switch from a first cell to a second cell. For instance, within the first area, the sensing node may perform sensing measurements based on a first sensing hypothesis and/or a second sensing hypothesis. Based on a mobility event experienced by the sensing node 902 (e.g., moving to the second area), the sensing node 902 may trigger the hypothesis activation 910 such that in the second area, the sensing node may perform sensing measurements based on a third sensing hypothesis and/or a fourth sensing hypothesis.

As described for aspects herein, a sensing node (e.g., the sensing node 902) may perform sensing measurements by measuring sets of sensing measurement data 914 associated with sensing hypotheses. In the illustrated example, the sensing node 902 may perform such sensing measurements based on signaling 912 from the one or more TRPs 908. The sensing node 902 may report (e.g., transmit/provide) the sensing measurements for each hypothesis, as the sets of sensing measurement data 914, to the sensing entity 904.

In aspects, the sets of sensing measurement data 914 may be reported by the sensing node 902 to the sensing entity 904 in a same reporting occasion 916 of a RS (e.g., RS 1), while in other aspects each set of the sets of sensing measurement data 914 may be configured with its own reporting occasion, e.g., a reporting occasion 918 and a reporting occasion 920, in a corresponding RS (e.g., RS 1 and RS 2, respectively). In aspects, the sets of sensing measurement data 914 may include and/or be accompanied by an indication of the sensing hypothesis(es) utilized by the sensing node 902. In some aspects, each sensing hypothesis may be reported in the same reporting occasion of a RS (e.g., the same reporting occasion 916 in RS 1), while in other aspects each sensing hypothesis may be configured with its own reporting occasion in a corresponding RS, e.g., the reporting occasion 918 and the reporting occasion 920, in RS 1 and RS 2, respectively. In some aspects, a first transmission occasion may be different from a second transmission occasion for the reporting above, e.g., the reporting occasion 918 may be different than the reporting occasion 920.

FIG. 10 is a flowchart 1000 of a method of wireless communication, in various aspects. The method may be performed by a sensing node (e.g., the UE 104, 404; the sensing node 602, 902; the TRP 402, 406, 908; the apparatus 1404). In some aspects, the method may include aspects described in connection with the communication flow in FIG. 6 and/or aspects described in FIGS. and 7-9. The method provides for multi-hypothesis measurement configuration in RF sensing for sensing measurements that enable wireless devices, e.g., sensing nodes, and base stations/LMFs, e.g., sensing entities, to improve and maintain sensing measurement performance and efficiency through configuration and utilization of multiple sensing hypotheses.

At 1002, a sensing node receives, from a sensing entity, a sensing configuration, the sensing configuration indicating a total number of sensing hypotheses and at least a first sensing hypothesis and a second sensing hypothesis that is different from the first sensing hypothesis. As an example, the reception may be performed, at least in part, by the component 198. FIGS. 6, 7, 8, 9 illustrate an example of the sensing node 602 receiving such a sensing configuration from a sensing entity (e.g., the sensing entity 604).

The sensing node 602 may be configured to provide, for the sensing entity 604, a capability indication 606 of the sensing node 602. The capability indication 606 of the sensing node 602 may indicate a capability of the sensing node associated with multiple hypothesis measurement and reporting. For example, the capability indication 606 may indicate capabilities to operate under multiple hypotheses (e.g., 706, 708 in FIG. 7; 806, 808, 812 in FIG. 8) per sensing occasion (e.g., 702 in FIG. 7; 802 in FIG. 8), including: a number of sensing hypotheses (e.g., 706, 708 in FIG. 7; 806, 808, 812 in FIG. 8) supported by the sensing node 602, a buffer capability of the sensing node 602, a processing capability of the sensing node 602, a related sensing capability of the sensing node 602, and/or the like, in aspects. The capability indication 606 may be based on a solicited request, e.g., from the sensing entity 604, or may be unsolicited/requested, e.g., provided/transmitted to the sensing entity 604 without a request. That is, the sensing node 602 may be configured to provide the capability indication 606 in response to a capability request or without/before a capability request. In aspects, the sensing entity 604 may be configured to request the sensing node 602 to indicate its capability to run multiple hypothesis measurement and reporting. In such aspects, the sensing node 602 may be configured to indicate its support to run multiple hypothesis via the capability indication 606. The capability indication 606 may also indicate how many hypotheses can be supported by the sensing node 602 and/or any related sensing capabilities, along with buffer/processing capabilities of the sensing node 602.

The sensing node 602 may be configured to receive, from the sensing entity 604, a sensing configuration 608. The sensing configuration 608 may be based on the capability indication 606. The sensing configuration 608 may indicate a total number of sensing hypotheses (e.g., 706, 708 in FIG. 7; 806, 808, 812 in FIG. 8) and at least a first sensing hypothesis (e.g., 706 in FIG. 7; 806 in FIG. 8) and a second sensing hypothesis (e.g., 708 in FIG. 7; 808 in FIG. 8) that is different from the first sensing hypothesis (e.g., 706 in FIG. 7; 806 in FIG. 8). For example, the sensing entity 604 may be configured to transmit/provide, for the sensing node 602, the sensing configuration 608 that indicates the number of sensing hypotheses (e.g., 706, 708 in FIG. 7; 806, 808, 812 in FIG. 8), including the hypotheses themselves, for obtaining sensing measurement data for sensing operations (e.g., at 610). In aspects, for the total number of sensing hypotheses (e.g., 706, 708 in FIG. 7; 806, 808, 812 in FIG. 8), each sensing hypothesis configuration in the sensing configuration 608 may specify a set of sensing measurements to be performed (e.g., at 610) by the sensing node 602 and the corresponding reference signals (e.g., as a set, as a set of different signals, etc.) (e.g., RS 1/RS 2 for 916, 918, 920 in FIG. 9) by which the set of sensing measurements (e.g., at 610) are to be reported by the sensing node 602. The sensing configuration 608 may indicate, from the total number of sensing hypotheses (e.g., 706, 708 in FIG. 7; 806, 808, 812 in FIG. 8), a first sensing hypothesis (e.g., 706 in FIG. 7; 806 in FIG. 8) that corresponds to a subset of sensing occasions (e.g., 702 in FIG. 7; 802 in FIG. 8) of a sensing resource set (e.g., 704 in FIG. 7; 804, 810 in FIG. 8) and/or a second sensing hypothesis (e.g., 708 in FIG. 7; 808 in FIG. 8) that corresponds to a full set of the sensing occasions (e.g., 702 in FIG. 7; 802 in FIG. 8) in the sensing resource set (e.g., 704 in FIG. 7; 804, 810 in FIG. 8). The sensing configuration 608 may also indicate the sensing measurements (e.g., at 610) as a subset of a range(s), an angle(s), a Doppler measurement(s), and/or the like (e.g., from 912 in FIG. 9), in aspects, and the sensing configuration may further indicate at least one of a same transmission occasion (e.g., 612 in FIG. 6; 916 in FIG. 9) for reporting/transmitting sets of sensing measurement data (e.g., 612 in FIG. 6; 916, 918, 920 in FIG. 9) or a first transmission occasion (e.g., 612 in FIG. 6; 918 in FIG. 9) for a first set of sensing measurement data (e.g., 612 in FIG. 6; 914, 916, 918 in FIG. 9) and a second transmission occasion (e.g., 612 in FIG. 6; 920 in FIG. 9) for a second set of sensing measurement data (e.g., 612 in FIG. 6; 914, 916, 920 in FIG. 9). In aspects, the sensing configuration 608 may indicate a set of corresponding reference signals (e.g., RS 1/RS 2 for 916, 918, 920 in FIG. 9) respectively associated with each of the total number of sensing hypotheses (e.g., 706, 708 in FIG. 7; 806, 808, 812 in FIG. 8) and transmission occasions (e.g., 612 in FIG. 6; 916, 918, 920 in FIG. 9) for reporting, as described herein, and one or more of the reference signals in the set of corresponding reference signals (e.g., RS 1/RS 2 for 916, 918, 920 in FIG. 9) may be different from other signals in the set of corresponding reference signals (e.g., RS 1/RS 2 for 916, 918, 920 in FIG. 9). In aspects, at least one of the first set of sensing measurement data (e.g., 612 in FIG. 6; 914, 916, 918 in FIG. 9) or the second set of sensing measurement data (e.g., 612 in FIG. 6; 914, 916, 920 in FIG. 9) may be associated with at least one corresponding reference signal (e.g., RS 1/RS 2 for 916, 918, 920 in FIG. 9) and at least one of a range, an angle, or a Doppler measurement (e.g., from 912 in FIG. 9), based on the sensing configuration 608.

At 1004, a sensing node measures a first set of sensing measurement data associated with the first sensing hypothesis and a second set of sensing measurement data associated with the second sensing hypothesis. As an example, the measurement may be performed, at least in part, by the component 198. FIGS. 6, 7, 8, 9 illustrate an example of the sensing node 602 measuring in such a manner.

The sensing node 602 may be configured to measure (at 610) a first set of sensing measurement data (e.g., 612 in FIG. 6; 914, 916, 918 in FIG. 9) associated with the first sensing hypothesis (e.g., 706 in FIG. 7; 806 in FIG. 8) and a second set of sensing measurement data (e.g., 612 in FIG. 6; 914, 916, 920 in FIG. 9) associated with the second sensing hypothesis (e.g., 708 in FIG. 7; 808 in FIG. 8). For instance, the sensing node 602 may perform sensing operations for measurements (at 610) according to the configured sensing hypotheses (e.g., 706, 708 in FIG. 7; 806, 808, 812 in FIG. 8) in the sensing configuration 608. The sets of sensing measurement data obtained via the sensing operations measured (at 610) may include one or more of the indicated sensing measurements of a subset of a range(s), an angle(s), a Doppler (e.g., from 912 in FIG. 9) measurement(s), and/or the like, from sensing configuration 608. In aspects, the measurement (at 610) may include sensing measurements associated with one or more TRPs (e.g., 908 in FIG. 9), based on the sensing configuration 608. In aspects, the sensing node 602 may be configured to measure (at 610) a first set of sensing measurement data (e.g., 612 in FIG. 6; 914, 916, 918 in FIG. 9) associated with a first sensing hypothesis (e.g., 706 in FIG. 7; 806 in FIG. 8) in a subset of sensing occasions (e.g., 702 in FIG. 7; 802 in FIG. 8) of a sensing resource set (e.g., 704 in FIG. 7; 804, 810 in FIG. 8) and a second set of sensing measurement data (e.g., 612 in FIG. 6; 914, 916, 920 in FIG. 9) associated with a second sensing hypothesis (e.g., 708 in FIG. 7; 808 in FIG. 8) in the full set of the sensing occasions (e.g., 702 in FIG. 7; 802 in FIG. 8) of the sensing resource set (e.g., 704 in FIG. 7; 804, 810 in FIG. 8).

The measure (at 610) of the first set and the second set of sensing measurements by the sensing node 602, and the measurement data/indication 612 (e.g., 914, 916, 918, 920 in FIG. 9), the first set of sensing measurement data (e.g., 914, 916, 918 in FIG. 9) and the second set of sensing measurement data (e.g., 914, 916, 920 in FIG. 9), and/or the indication (e.g., 914, 916, 918, 920 in FIG. 9) of the first sensing hypothesis (e.g., 706 in FIG. 7; 806 in FIG. 8) and the second sensing hypothesis (e.g., 708 in FIG. 7; 808 in FIG. 8) (e.g., the measurement data/indication 612) may also include in aspects, information associated with a measurement characteristic, an outlier rejection, and/or a measurement efficacy for one or more of the first set of sensing measurement data (e.g., 914, 916, 918 in FIG. 9) associated with the first sensing hypothesis (e.g., 706 in FIG. 7; 806 in FIG. 8) and the second set of sensing measurement data (e.g., 914, 916, 920 in FIG. 9) associated with the second sensing hypothesis (e.g., 708 in FIG. 7; 808 in FIG. 8). That is, while aspects herein provide for network-based solutions, multi-hypothesis measurements for sensing computations also applies to UE-based solutions. Thus, in aspects for a UE-based sensing session, a sensing node (e.g., 602 in FIG. 6; 902 in FIG. 9) may configure a UE for multi-hypothesis measurements, and the UE may report to the sensing entity (e.g., 604 in FIG. 6; 904 in FIG. 9) which sensing hypothesis (e.g., 706, 708 in FIG. 7; 806, 808 in FIG. 8) generated better results.

At 1006, a sensing node transmits, for the sensing entity, at least one of: (1) the first set of sensing measurement data and the second set of sensing measurement data, or (2) an indication of the first sensing hypothesis and the second sensing hypothesis. As an example, the transmission may be performed, at least in part, by the component 198. FIGS. 6, 7, 8, 9 illustrate an example of the sensing node 602 transmitting sets of sensing measurement data and/or an indication for a sensing entity (e.g., the sensing entity 604).

The sensing node 602 may be configured to transmit, for the sensing entity 604, measurement data/indication 612 (e.g., 914, 916, 918, 920 in FIG. 9). For example, the sensing node 602 may be configured to transmit, for the sensing entity 604 and as the measurement data/indication 612 (e.g., 914, 916, 918, 920 in FIG. 9), at least one of: (1) the first set of sensing measurement data and the second set of sensing measurement data (e.g., 914, 916, 918, 920 in FIG. 9), or (2) an indication of the first sensing hypothesis (e.g., 706 in FIG. 7; 806 in FIG. 8) and the second sensing hypothesis (e.g., 708 in FIG. 7; 808 in FIG. 8). The first set of sensing measurement data (e.g., 914, 916, 918 in FIG. 9) and the second set of sensing measurement data (e.g., 914, 916, 920 in FIG. 9) of the measurement data/indication 612 (e.g., 914, 916, 918, 920 in FIG. 9) may include a subset of a range(s), an angle(s), a Doppler measurement(s), and/or the like (e.g., from 912 in FIG. 9), as indicated in sensing configuration 608. The indication of the first sensing hypothesis (e.g., 706 in FIG. 7; 806 in FIG. 8) and the second sensing hypothesis (e.g., 708 in FIG. 7; 808 in FIG. 8) may indicate at least one of the first sensing hypothesis (e.g., 706 in FIG. 7; 806 in FIG. 8) or the second sensing hypothesis (e.g., 708 in FIG. 7; 808 in FIG. 8) that was utilized for to measure (e.g., at 610) the first set or the second set of sensing measurement data (e.g., 914, 916, 918, 920 in FIG. 9). For instance, in aspects for which the sensing node 602 or a network node (e.g., the base station 906 in FIG. 9) activates a sensing hypothesis (e.g., 706, 708 in FIG. 7; 806, 808 in FIG. 8) instead of the sensing entity 604, the sensing node 602 may be configured to transmit the utilized sensing hypothesis (e.g., 706, 708 in FIG. 7; 806, 808 in FIG. 8) for the sensing entity 604 as part of the measurement data/indication 612 (e.g., 914, 916, 918, 920 in FIG. 9) so that the sensing entity 604 is aware of the utilized sensing hypothesis(es) (e.g., 706, 708 in FIG. 7; 806, 808 in FIG. 8).

In aspects, at least one of the first set of sensing measurement data (e.g., 914, 916, 918 in FIG. 9) and the second set of sensing measurement data (e.g., 914, 916, 920 in FIG. 9) or the indication (e.g., 914, 916, 918, 920 in FIG. 9) of the first sensing hypothesis (e.g., 706 in FIG. 7; 806 in FIG. 8) and the second sensing hypothesis (e.g., 708 in FIG. 7; 808 in FIG. 8) of the measurement data/indication 612 may also include information associated with at least one of a measurement characteristic, an outlier rejection, or a measurement efficacy for one or more of the first set of sensing measurement data (e.g., 914, 916, 918 in FIG. 9) associated with the first sensing hypothesis (e.g., 706 in FIG. 7; 806 in FIG. 8) and the second set of sensing measurement data (e.g., 914, 916, 920 in FIG. 9) associated with the second sensing hypothesis (e.g., 708 in FIG. 7; 808 in FIG. 8).

In some aspects, transmitting the first set of sensing measurement data (e.g., 914, 916, 918 in FIG. 9) and the second set of sensing measurement data (e.g., 914, 916, 920 in FIG. 9) of the measurement data/indication 612 in the same transmission occasion includes transmitting in the same transmission occasion on a first reference signal (e.g., 916 on RS 1 in FIG. 9) of the set of corresponding reference signals (e.g., RS 1, RS 2, in FIG. 9), e.g., as configured via sensing configuration 608. In some aspects, transmitting the first set of sensing measurement data (e.g., 914, 916, 918 in FIG. 9) (e.g., the measurement data/indication 612) in the first transmission occasion (e.g., 918 in FIG. 9) is performed on a first reference signal (e.g., on RS 1 in FIG. 9) of the set of corresponding reference signals (e.g., RS 1, RS 2, in FIG. 9), and transmitting the second set of sensing measurement data (e.g., 914, 916, 920 in FIG. 9) (the measurement data/indication 612) in the second transmission occasion (e.g., 920 in FIG. 9) is performed on a second reference signal (e.g., on RS 2 in FIG. 9) of the set of corresponding reference signals (e.g., RS 1, RS 2, in FIG. 9).

The sensing node 602 may be configured to transmit, for the sensing entity 604, information associated with the measurement characteristic, the outlier rejection, and/or the measurement efficacy based on the measure (at 610), described above. Aspects herein provide that the sensing node 602 may be configured to receive, e.g., from the sensing entity 604, an adjusted sensing configuration, which may be a further aspect of the sensing configuration 608 in call flow diagram 600 of FIG. 6. The adjusted sensing configuration may be associated with the indication of the first sensing hypothesis (e.g., 706 in FIG. 7; 806 in FIG. 8) and the second sensing hypothesis (e.g., 708 in FIG. 7; 808 in FIG. 8), as similarly described above for the sensing configuration 608, and the adjusted sensing configuration may indicate at least one of an adjusted total number of sensing hypotheses, an adjusted first sensing hypothesis, or an adjusted second sensing hypothesis (e.g., 810 in FIG. 8). In aspects, the adjusted sensing configuration may be provided to the sensing node 602 from the sensing entity 604 based on the information associated with the measurement characteristic, the outlier rejection, and/or the measurement efficacy.

The sensing node 602 may thus be enabled/configured to measure (e.g., as similarly described for 610) a third set of sensing measurement data and/or a fourth set of sensing measurement data (e.g., as similar to 914, 916, 918, 920 in FIG. 9) associated with the adjusted total number of sensing hypotheses, the adjusted first sensing hypothesis, and/or the adjusted second sensing hypothesis (e.g., 810 in FIG. 8), as similarly described for the measure (at 610) in call flow diagram 600. The sensing node 602 may be configured to then transmit, for the sensing entity 604, the third set of sensing measurement data and the fourth set of sensing measurement data (e.g., as similar to 914, 916, 918, 920 in FIG. 9), as similarly described for transmitting the measurement data/indication 612 (e.g., as similar to 914, 916, 918, 920 in FIG. 9).

Figure 11:
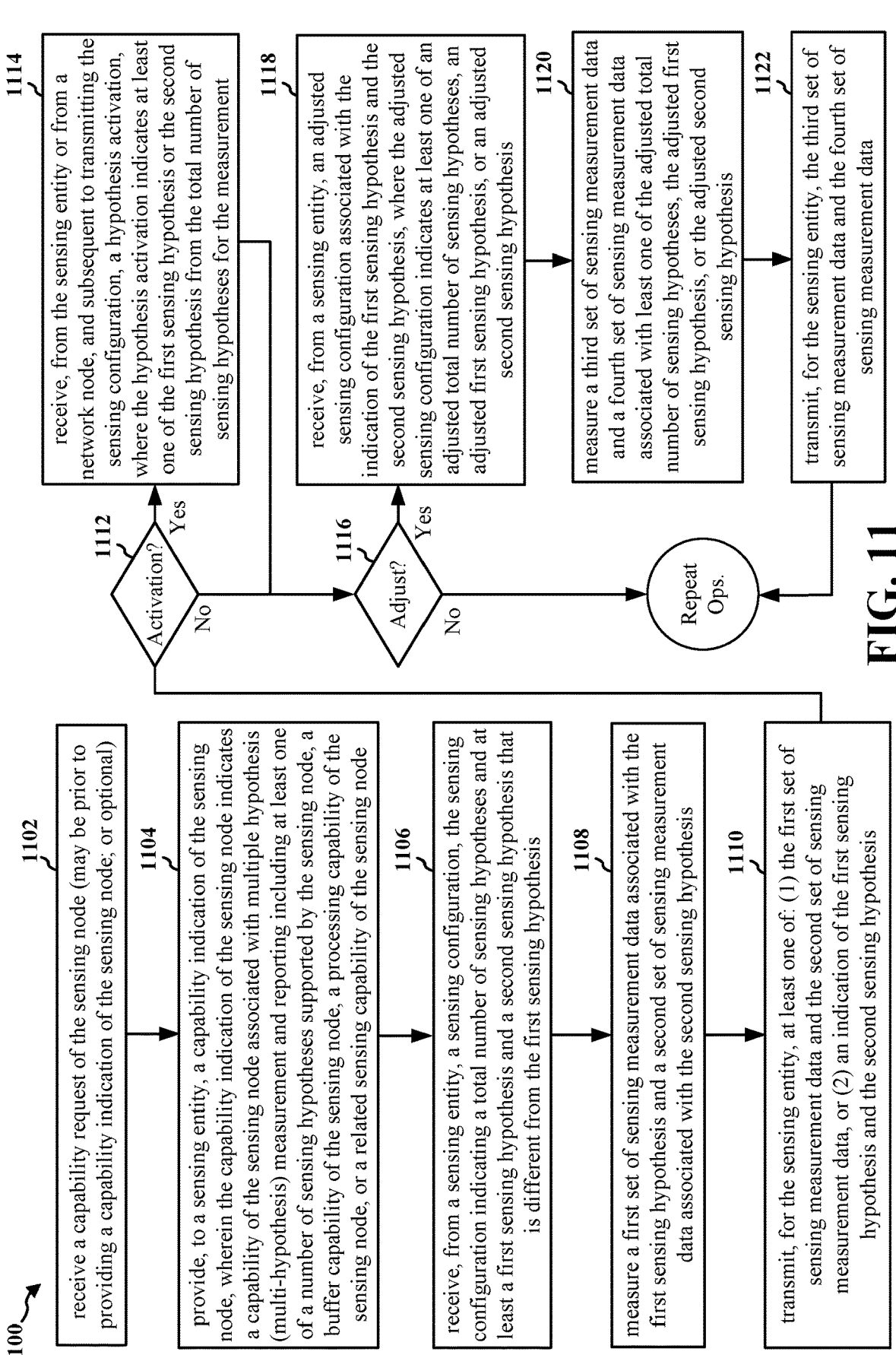
FIG. 11 is a flowchart of a method of wireless communication, in accordance with various aspects of the present disclosure.

FIG. 11 is a flowchart 1100 of a method of wireless communication, in various aspects. The method may be performed by a sensing node (e.g., the UE 104, 404; the sensing node 602, 902; the TRP 402, 406, 908; the apparatus 1404). In some aspects, the method may include aspects described in connection with the communication flow in FIGS. 6, 9 and/or aspects described in FIGS. 7, 8. The method provides for multi-hypothesis measurement configuration in RF sensing for sensing measurements that enable wireless devices, e.g., sensing nodes, and base stations/LMFs, e.g., sensing entities, to improve and maintain sensing measurement performance and efficiency through configuration and utilization of multiple sensing hypotheses.

At 1102, a sensing node receives a capability request of the sensing node. As an example, the reception may be performed, at least in part, by the component 198. FIGS. 6, 7, 8, 9 illustrate an example of the sensing node 602 receiving such a capability request from a sensing entity (e.g., the sensing entity 604).

The sensing node 602 may be configured to receive, from the sensing entity 604, a capability request for a sensing capability(ies) of the sensing node 602. In aspects, the sensing node 602 may receive the capability request associated with multiple hypothesis measurement and reporting as transmitted/provided by the sensing entity 604. The capability request may indicate that the sensing node 602 provide/transmit to sensing entity 604 at least one of capabilities to operate under multiple hypotheses (e.g., 706, 708 in FIG. 7; 806, 808, 812 in FIG. 8) per sensing occasion (e.g., 702 in FIG. 7; 802 in FIG. 8), including (without limitation): a number of sensing hypotheses (e.g., 706, 708 in FIG. 7; 806, 808, 812 in FIG. 8) supported by the sensing node 602, a buffer capability of the sensing node 602, a processing capability of the sensing node 602, a related sensing capability of the sensing node 602, and/or the like. In some aspects, the provision/reception of the capability request may be optional (e.g., the sensing node 902 may provide its sensing capabilities autonomously without or before receiving the capability request from the sensing entity 904).

At 1104, a sensing node provides, to the sensing entity, a capability indication of the sensing node, where the capability indication of the sensing node indicates a capability of the sensing node associated with multiple hypothesis (multi-hypothesis) measurement and reporting including at least one of a number of sensing hypotheses supported by the sensing node, a buffer capability of the sensing node, a processing capability of the sensing node, or a related sensing capability of the sensing node. As an example, the provision may be performed, at least in part, by the component 198. FIGS. 6, 7, 8, 9 illustrate an example of the sensing node 602 transmitting/providing such a capability indication from a sensing entity (e.g., the sensing entity 604).

The sensing node 602 may be configured to provide, for the sensing entity 604, a capability indication 606 of the sensing node 602. The capability indication 606 of the sensing node 602 may indicate a capability of the sensing node associated with multiple hypothesis measurement and reporting. For example, the capability indication 606 may indicate capabilities to operate under multiple hypotheses (e.g., 706, 708 in FIG. 7; 806, 808, 812 in FIG. 8) per sensing occasion (e.g., 702 in FIG. 7; 802 in FIG. 8), including: a number of sensing hypotheses (e.g., 706, 708 in FIG. 7; 806, 808, 812 in FIG. 8) supported by the sensing node 602, a buffer capability of the sensing node 602, a processing capability of the sensing node 602, a related sensing capability of the sensing node 602, and/or the like, in aspects. The capability indication 606 may be based on a solicited request, e.g., from the sensing entity 604, or may be unsolicited/requested, e.g., provided/transmitted to the sensing entity 604 without a request. That is, the sensing node 602 may be configured to provide the capability indication 606 in response to a capability request or without/before a capability request. In aspects, the sensing entity 604 may be configured to request the sensing node 602 to indicate its capability to run multiple hypothesis measurement and reporting. In such aspects, the sensing node 602 may be configured to indicate its support to run multiple hypothesis via the capability indication 606. The capability indication 606 may also indicate how many hypotheses can be supported by the sensing node 602 and/or any related sensing capabilities, along with buffer/processing capabilities of the sensing node 602.

At 1106, a sensing node receives, from a sensing entity, a sensing configuration, the sensing configuration indicating a total number of sensing hypotheses and at least a first sensing hypothesis and a second sensing hypothesis that is different from the first sensing hypothesis. As an example, the reception may be performed, at least in part, by the component 198. FIGS. 6, 7, 8, 9 illustrate an example of the sensing node 602 receiving such a sensing configuration from a sensing entity (e.g., the sensing entity 604).

The sensing node 602 may be configured to receive, from the sensing entity 604, a sensing configuration 608. The sensing configuration 608 may indicate a total number of sensing hypotheses (e.g., 706, 708 in FIG. 7; 806, 808, 812 in FIG. 8) and at least a first sensing hypothesis (e.g., 706 in FIG. 7; 806 in FIG. 8) and a second sensing hypothesis (e.g., 708 in FIG. 7; 808 in FIG. 8) that is different from the first sensing hypothesis (e.g., 706 in FIG. 7; 806 in FIG. 8). For example, the sensing entity 604 may be configured to transmit/provide, for the sensing node 602, the sensing configuration 608 that indicates the number of sensing hypotheses (e.g., 706, 708 in FIG. 7; 806, 808, 812 in FIG. 8), including the hypotheses themselves, for obtaining sensing measurement data for sensing operations (e.g., at 610). In aspects, for the total number of sensing hypotheses (e.g., 706, 708 in FIG. 7; 806, 808, 812 in FIG. 8), each sensing hypothesis configuration in the sensing configuration 608 may specify a set of sensing measurements to be performed (e.g., at 610) by the sensing node 602 and the corresponding reference signals (e.g., as a set, as a set of different signals, etc.) (e.g., RS 1/RS 2 for 916, 918, 920 in FIG. 9) by which the set of sensing measurements (e.g., at 610) are to be reported by the sensing node 602. The sensing configuration 608 may indicate, from the total number of sensing hypotheses (e.g., 706, 708 in FIG. 7; 806, 808, 812 in FIG. 8), a first sensing hypothesis (e.g., 706 in FIG. 7; 806 in FIG. 8) that corresponds to a subset of sensing occasions (e.g., 702 in FIG. 7; 802 in FIG. 8) of a sensing resource set (e.g., 704 in FIG. 7; 804, 810 in FIG. 8) and/or a second sensing hypothesis (e.g., 708 in FIG. 7; 808 in FIG. 8) that corresponds to a full set of the sensing occasions (e.g., 702 in FIG. 7; 802 in FIG. 8) in the sensing resource set (e.g., 704 in FIG. 7; 804, 810 in FIG. 8). The sensing configuration 608 may also indicate the sensing measurements (e.g., at 610) as a subset of a range(s), an angle(s), a Doppler measurement(s), and/or the like (e.g., from 912 in FIG. 9), in aspects, and the sensing configuration may further indicate at least one of a same transmission occasion (e.g., 612 in FIG. 6; 916 in FIG. 9) for reporting/transmitting sets of sensing measurement data (e.g., 612 in FIG. 6; 916, 918, 920 in FIG. 9) or a first transmission occasion (e.g., 612 in FIG. 6; 918 in FIG. 9) for a first set of sensing measurement data (e.g., 612 in FIG. 6; 914, 916, 918 in FIG. 9) and a second transmission occasion (e.g., 612 in FIG. 6; 920 in FIG. 9) for a second set of sensing measurement data (e.g., 612 in FIG. 6; 914, 916, 920 in FIG. 9). In aspects, the sensing configuration 608 may indicate a set of corresponding reference signals (e.g., RS 1/RS 2 for 916, 918, 920 in FIG. 9) respectively associated with each of the total number of sensing hypotheses (e.g., 706, 708 in FIG. 7; 806, 808, 812 in FIG. 8) and transmission occasions (e.g., 612 in FIG. 6; 916, 918, 920 in FIG. 9) for reporting, as described herein, and one or more of the reference signals in the set of corresponding reference signals (e.g., RS 1/RS 2 for 916, 918, 920 in FIG. 9) may be different from other signals in the set of corresponding reference signals (e.g., RS 1/RS 2 for 916, 918, 920 in FIG. 9). In aspects, at least one of the first set of sensing measurement data (e.g., 612 in FIG. 6; 914, 916, 918 in FIG. 9) or the second set of sensing measurement data (e.g., 612 in FIG. 6; 914, 916, 920 in FIG. 9) may be associated with at least one corresponding reference signal (e.g., RS 1/RS 2 for 916, 918, 920 in FIG. 9) and at least one of a range, an angle, or a Doppler measurement (e.g., from 912 in FIG. 9), based on the sensing configuration 608.

At 1108, a sensing node measures a first set of sensing measurement data associated with the first sensing hypothesis and a second set of sensing measurement data associated with the second sensing hypothesis. As an example, the measurement may be performed, at least in part, by the component 198. FIGS. 6, 7, 8, 9 illustrate an example of the sensing node 602 measuring in such a manner.

The sensing node 602 may be configured to measure (at 610) a first set of sensing measurement data (e.g., 612 in FIG. 6; 914, 916, 918 in FIG. 9) associated with the first sensing hypothesis (e.g., 706 in FIG. 7; 806 in FIG. 8) and a second set of sensing measurement data (e.g., 612 in FIG. 6; 914, 916, 920 in FIG. 9) associated with the second sensing hypothesis (e.g., 708 in FIG. 7; 808 in FIG. 8). For instance, the sensing node 602 may perform sensing operations for measurements (at 610) according to the configured sensing hypotheses (e.g., 706, 708 in FIG. 7; 806, 808, 812 in FIG. 8) in the sensing configuration 608. The sets of sensing measurement data obtained via the sensing operations measured (at 610) may include one or more of the indicated sensing measurements of a subset of a range(s), an angle(s), a Doppler (e.g., from 912 in FIG. 9) measurement(s), and/or the like, from sensing configuration 608. In aspects, the measurement (at 610) may include sensing measurements associated with one or more TRPs (e.g., 908 in FIG. 9), based on the sensing configuration 608. In aspects, the sensing node 602 may be configured to measure (at 610) a first set of sensing measurement data (e.g., 612 in FIG. 6; 914, 916, 918 in FIG. 9) associated with a first sensing hypothesis (e.g., 706 in FIG. 7; 806 in FIG. 8) in a subset of sensing occasions (e.g., 702 in FIG. 7; 802 in FIG. 8) of a sensing resource set (e.g., 704 in FIG. 7; 804, 810 in FIG. 8) and a second set of sensing measurement data (e.g., 612 in FIG. 6; 914, 916, 920 in FIG. 9) associated with a second sensing hypothesis (e.g., 708 in FIG. 7; 808 in FIG. 8) in the full set of the sensing occasions (e.g., 702 in FIG. 7; 802 in FIG. 8) of the sensing resource set (e.g., 704 in FIG. 7; 804, 810 in FIG. 8).

The measure (at 610) of the first set and the second set of sensing measurements by the sensing node 602, and the measurement data/indication 612 (e.g., 914, 916, 918, 920 in FIG. 9), the first set of sensing measurement data (e.g., 914, 916, 918 in FIG. 9) and the second set of sensing measurement data (e.g., 914, 916, 920 in FIG. 9), and/or the indication (e.g., 914, 916, 918, 920 in FIG. 9) of the first sensing hypothesis (e.g., 706 in FIG. 7; 806 in FIG. 8) and the second sensing hypothesis (e.g., 708 in FIG. 7; 808 in FIG. 8) (e.g., the measurement data/indication 612) may also include in aspects, information associated with a measurement characteristic, an outlier rejection, and/or a measurement efficacy for one or more of the first set of sensing measurement data (e.g., 914, 916, 918 in FIG. 9) associated with the first sensing hypothesis (e.g., 706 in FIG. 7; 806 in FIG. 8) and the second set of sensing measurement data (e.g., 914, 916, 920 in FIG. 9) associated with the second sensing hypothesis (e.g., 708 in FIG. 7; 808 in FIG. 8). That is, while aspects herein provide for network-based solutions, multi-hypothesis measurements for sensing computations also applies to UE-based solutions. Thus, in aspects for a UE-based sensing session, a sensing node (e.g., 602 in FIG. 6; 902 in FIG. 9) may configure a UE for multi-hypothesis measurements, and the UE may report to the sensing entity (e.g., 604 in FIG. 6; 904 in FIG. 9) which sensing hypothesis (e.g., 706, 708 in FIG. 7; 806, 808 in FIG. 8) generated better results. In aspects, the measure (at 610) may be a part of a sensing session (e.g., as in 700 in FIG. 7; 800 in FIG. 8) that includes at least a full set of sensing occasions (e.g., 702 in FIG. 7; 802 in FIG. 8) of a sensing resource set (e.g., 704 in FIG. 7; 804, 810 in FIG. 8).

At 1110, a sensing node transmits, for the sensing entity, at least one of: (1) the first set of sensing measurement data and the second set of sensing measurement data, or (2) an indication of the first sensing hypothesis and the second sensing hypothesis. As an example, the transmission may be performed, at least in part, by the component 198. FIGS. 6, 7, 8, 9 illustrate an example of the sensing node 602 transmitting sets of sensing measurement data and/or an indication for a sensing entity (e.g., the sensing entity 604).

The sensing node 602 may be configured to transmit, for the sensing entity 604, measurement data/indication 612 (e.g., 914, 916, 918, 920 in FIG. 9). For example, the sensing node 602 may be configured to transmit, for the sensing entity 604 and as the measurement data/indication 612 (e.g., 914, 916, 918, 920 in FIG. 9), at least one of: (1) the first set of sensing measurement data and the second set of sensing measurement data (e.g., 914, 916, 918, 920 in FIG. 9), or (2) an indication of the first sensing hypothesis (e.g., 706 in FIG. 7; 806 in FIG. 8) and the second sensing hypothesis (e.g., 708 in FIG. 7; 808 in FIG. 8). The first set of sensing measurement data (e.g., 914, 916, 918 in FIG. 9) and the second set of sensing measurement data (e.g., 914, 916, 920 in FIG. 9) of the measurement data/indication 612 (e.g., 914, 916, 918, 920 in FIG. 9) may include a subset of a range(s), an angle(s), a Doppler measurement(s), and/or the like (e.g., from 912 in FIG. 9), as indicated in sensing configuration 608. The indication of the first sensing hypothesis (e.g., 706 in FIG. 7; 806 in FIG. 8) and the second sensing hypothesis (e.g., 708 in FIG. 7; 808 in FIG. 8) may indicate at least one of the first sensing hypothesis (e.g., 706 in FIG. 7; 806 in FIG. 8) or the second sensing hypothesis (e.g., 708 in FIG. 7; 808 in FIG. 8) that was utilized for to measure (e.g., at 610) the first set or the second set of sensing measurement data (e.g., 914, 916, 918, 920 in FIG. 9). For instance, in aspects for which the sensing node 602 or a network node (e.g., the base station 906 in FIG. 9) activates a sensing hypothesis (e.g., 706, 708 in FIG. 7; 806, 808 in FIG. 8) instead of the sensing entity 604, the sensing node 602 may be configured to transmit the utilized sensing hypothesis (e.g., 706, 708 in FIG. 7; 806, 808 in FIG. 8) for the sensing entity 604 as part of the measurement data/indication 612 (e.g., 914, 916, 918, 920 in FIG. 9) so that the sensing entity 604 is aware of the utilized sensing hypothesis(es) (e.g., 706, 708 in FIG. 7; 806, 808 in FIG. 8).

In aspects, at least one of the first set of sensing measurement data (e.g., 914, 916, 918 in FIG. 9) and the second set of sensing measurement data (e.g., 914, 916, 920 in FIG. 9) or the indication (e.g., 914, 916, 918, 920 in FIG. 9) of the first sensing hypothesis (e.g., 706 in FIG. 7; 806 in FIG. 8) and the second sensing hypothesis (e.g., 708 in FIG. 7; 808 in FIG. 8) of the measurement data/indication 612 may also include information associated with at least one of a measurement characteristic, an outlier rejection, or a measurement efficacy for one or more of the first set of sensing measurement data (e.g., 914, 916, 918 in FIG. 9) associated with the first sensing hypothesis (e.g., 706 in FIG. 7; 806 in FIG. 8) and the second set of sensing measurement data (e.g., 914, 916, 920 in FIG. 9) associated with the second sensing hypothesis (e.g., 708 in FIG. 7; 808 in FIG. 8).

In some aspects, transmitting the first set of sensing measurement data (e.g., 914, 916, 918 in FIG. 9) and the second set of sensing measurement data (e.g., 914, 916, 920 in FIG. 9) of the measurement data/indication 612 in the same transmission occasion includes transmitting in the same transmission occasion on a first reference signal (e.g., 916 on RS 1 in FIG. 9) of the set of corresponding reference signals (e.g., RS 1, RS 2, in FIG. 9), e.g., as configured via sensing configuration 608. In some aspects, transmitting the first set of sensing measurement data (e.g., 914, 916, 918 in FIG. 9) (e.g., the measurement data/indication 612) in the first transmission occasion (e.g., 918 in FIG. 9) is performed on a first reference signal (e.g., on RS 1 in FIG. 9) of the set of corresponding reference signals (e.g., RS 1, RS 2, in FIG. 9), and transmitting the second set of sensing measurement data (e.g., 914, 916, 920 in FIG. 9) (the measurement data/indication 612) in the second transmission occasion (e.g., 920 in FIG. 9) is performed on a second reference signal (e.g., on RS 2 in FIG. 9) of the set of corresponding reference signals (e.g., RS 1, RS 2, in FIG. 9).

At 1112, it may be determined if a hypothesis activation is utilized. As an example, the determination may be performed, at least in part, by the component 198. If so, flowchart 1100 may continue to 1114; if not, flowchart 1100 may continue to 1116.

At 1114, the sensing node receives, from the sensing entity or from a network node, and subsequent to transmitting the sensing configuration, a hypothesis activation, where the hypothesis activation indicates at least one of the first sensing hypothesis or the second sensing hypothesis from the total number of sensing hypotheses for the measurement. As an example, the reception may be performed, at least in part, by the component 198. FIGS. 6, 7, 8, 9 illustrate an example of the sensing node 902 (e.g., a further aspect of the sensing node 602 in FIG. 6) receiving a hypothesis activation from a sensing entity (e.g., the sensing entity 904 which may be a further aspect of the sensing entity 604 in FIG. 6).

In aspects, as described above, hypothesis activations (e.g., 816 in FIG. 8; 910 in FIG. 9) may be utilized in sensing operations to specifically activate one or more sensing hypothesis (e.g., 706, 708 in FIG. 7; 806, 808, 812 in FIG. 8). With reference to diagram 900 in FIG. 9, a hypothesis activation 910 (e.g., 816 in FIG. 8), which may be initiated by the sensing node 902 itself, by the sensing entity 904 for the sensing node 902, and/or by the base station 906 (e.g., the network node) for the sensing node 902. The hypothesis activation 910 (e.g., 816 in FIG. 8) may be provided/transmitted, received, obtained, implemented, etc., subsequent to receiving a sensing configuration (e.g., 608 in FIG. 6), including before sensing sessions and/or during sensing sessions. The hypothesis activation 910 (e.g., 816 in FIG. 8) may indicate at least one sensing hypothesis from a total number of sensing hypotheses (e.g., 706, 708 in FIG. 7; 806, 808, 812 in FIG. 8) for performing sensing measurements (e.g., at 610) in sensing operations.

In aspects, the sensing entity 904 may be a LMF, and the hypothesis activation 910 (e.g., 816 in FIG. 8) may be associated with a coherency condition of the sensing node 902. In some aspects, the hypothesis activation 910 (e.g., 816 in FIG. 8) may be received by the sensing node 902, as transmitted/provided from the base station 906 (e.g., from a network node), via at least one of RRC signaling, a medium access control (MAC) control element (MAC-CE), or DCI.

In cases where the sensing entity 904 may be a network entity, such as an LMF, communications between the sensing entity 904 and the sensing node 902 may be via proper signaling such as LTE positioning protocol (LPP), which may be a higher layer signaling. The base station 906, e.g., a network node, may be configured to dynamically activate a subset of sensing hypotheses (e.g., of 706, 708 in FIG. 7; of 806, 808, 812 in FIG. 8) via the hypothesis activation 910 (e.g., 816 in FIG. 8) based on specific conditions. As one example, the base station 906 may be aware of a beam switch in between sensing reference signal (e.g., for RS 1, RS 2 in FIG. 9) transmissions, which may invalidate the phase coherence property of the sensing reference signals (e.g., for RS 1, RS 2 in FIG. 9). Based on that knowledge, the base station 906 may be configured to activate a subset of sensing hypothesis (e.g., of 706, 708 in FIG. 7; of 806, 808, 812 in FIG. 8), via the hypothesis activation 910 (e.g., 816 in FIG. 8), to be measured by the sensing node 902 and reported to the sensing entity 904. As illustrated in FIG. 8, the third sensing hypothesis 812 may be activated.

In some aspects, the sensing node 902 may be a SL UE, the sensing entity 904 may be a UE, and the hypothesis activation 910 (e.g., 816 in FIG. 8) may be associated with a coherency condition of the sensing node 902. The hypothesis activation 910 (e.g., 816 in FIG. 8) may be received by the sensing node 902, as transmitted/provided from the sensing entity 904, via a sidelink channel by at least one of direct communication (PC5) RRC signaling, a PC5 MAC-CE, SL control information (SCI) stage 1, or SCI stage 2. As one example, a UE, acting as the sensing entity 904, may be configured, via the sidelink channel, to configure a participating SL UE, acting as the sensing node 902, with multiple sensing hypotheses (e.g., 706, 708 in FIG. 7; 806, 808, 812 in FIG. 8) from which the hypothesis activation 910 (e.g., 816 in FIG. 8) triggers/selects at least one sensing hypothesis (e.g., 706, 708 in FIG. 7; 806, 808, 812 in FIG. 8). The SL UE may then perform the multi-hypothesis measurements (e.g., at 610) utilizing the triggered/selected sensing hypothesis(es) (e.g., 706, 708 in FIG. 7; 806, 808, 812 in FIG. 8) and report resulting sensing measurement data (e.g., sets thereof: 612 in FIG. 6; 914, 916, 918, 920 in FIG. 9) and the utilized sensing hypothesis(es) (e.g., 706, 708 in FIG. 7; 806, 808, 812 in FIG. 8) back to the UE.

In some aspects, activation of hypothesis measurements via the hypothesis activation 910 (e.g., 816 in FIG. 8), and corresponding reporting, may be based on one or more events. That is, aspects herein provide for the sensing node 902 to trigger the hypothesis activation 910 (e.g., 816 in FIG. 8), as noted above. Once the configured event(s) is triggered, one or more sensing hypotheses (e.g., 706, 708 in FIG. 7; 806, 808, 812 in FIG. 8) may be autonomously utilized by the sensing node 902 for performing sensing measurements, to generate sensing measurement data (e.g., at 610) (e.g., sets thereof: 612 in FIG. 6; 914, 916, 918, 920 in FIG. 9), which may be subsequently reported by the sensing node 902 to the sensing entity 904. As one example of a triggering event, the sensing node 902, e.g., a UE, may experience a mobility event and/or cell switching. In such cases, the sensing node 902 may move between a first area and a second area or switch from a first cell to a second cell. For instance, within the first area, the sensing node may perform sensing measurements based on a first sensing hypothesis (e.g., 706 in FIG. 7; 806 in FIG. 8) and/or a second sensing hypothesis (e.g., 708 in FIG. 7; 812 in FIG. 8). Based on a mobility event experienced by the sensing node 902 (e.g., moving to the second area), the sensing node 902 may trigger the hypothesis activation 910 (e.g., 816 in FIG. 8) such that in the second area, the sensing node may perform sensing measurements based on a third sensing hypothesis and/or a fourth sensing hypothesis (e.g., 706, 708 in FIG. 7; 806, 808, 812 in FIG. 8).

From 1114, flowchart 1100 may continue to 1116.

At 1116, it may be determined if an adjusted sensing configuration is utilized. As an example, the determination may be performed, at least in part, by the component 198. If so, flowchart 1100 may continue to 1118; if not, flowchart 1100 may continue to repeat operations thereof.

At 1118, a sensing node receives, from a sensing entity, an adjusted sensing configuration associated with the indication of the first sensing hypothesis and the second sensing hypothesis, where the adjusted sensing configuration indicates at least one of an adjusted total number of sensing hypotheses, an adjusted first sensing hypothesis, or an adjusted second sensing hypothesis. As an example, the reception may be performed, at least in part, by the component 198. FIGS. 6, 7, 8, 9 illustrate an example of the sensing node 602 receiving an adjusted sensing configuration from a sensing entity (e.g., the sensing entity 604).

As described for aspects herein, and with reference to FIG. 6 and call flow diagram 600, the sensing node 602 may be configured to transmit, for the sensing entity 604, information associated with the measurement characteristic, the outlier rejection, and/or the measurement efficacy based on the measure (at 610), which may be included with the transmitted sets of sensing measurement data (e.g., 914, 916, 920 in FIG. 9). Aspects herein provide that the sensing node 602 may be configured to receive, e.g., from the sensing entity 604, an adjusted sensing configuration, which may be a further aspect of the sensing configuration 608 in call flow diagram 600 of FIG. 6. In aspects, the adjusted sensing configuration may be associated with the indication of the first sensing hypothesis (e.g., 706 in FIG. 7; 806 in FIG. 8) and the second sensing hypothesis (e.g., 708 in FIG. 7; 808 in FIG. 8), as similarly described above for the sensing configuration 608, and the adjusted sensing configuration may indicate at least one of an adjusted total number of sensing hypotheses, an adjusted first sensing hypothesis, or an adjusted second sensing hypothesis (e.g., 810 in FIG. 8). In aspects, the adjusted sensing configuration may be provided to the sensing node 602 from the sensing entity 604 based on the information associated with the measurement characteristic, the outlier rejection, and/or the measurement efficacy.

At 1120, the sensing node 602 measures a third set of sensing measurement data and a fourth set of sensing measurement data associated with least one of the adjusted total number of sensing hypotheses, the adjusted first sensing hypothesis, or the adjusted second sensing hypothesis. As an example, the measure may be performed, at least in part, by the component 198. FIGS. 6, 7, 8, 9 illustrate an example of the sensing node 602 measuring sensing measurement data.

For example, based on the adjusted sensing configuration described herein, the sensing node 602 may thus be enabled/configured to measure (e.g., as similarly described for 610) a third set of sensing measurement data and/or a fourth set of sensing measurement data (e.g., as similar to 914, 916, 918, 920 in FIG. 9) associated with the adjusted total number of sensing hypotheses, the adjusted first sensing hypothesis, and/or the adjusted second sensing hypothesis (e.g., 810 in FIG. 8), as similarly described for the measure (at 610) in call flow diagram 600.

At 1122, the sensing node transmits, for the sensing entity, the third set of sensing measurement data and the fourth set of sensing measurement data. As an example, the transmission may be performed, at least in part, by the component 198. FIGS. 6, 7, 8, 9 illustrate an example of the sensing node 602 transmitting sets of sensing measurement data (and/or an indication) for a sensing entity (e.g., the sensing entity 604).

The sensing node 602 may be configured to transmit, for the sensing entity 604, the third set of sensing measurement data and the fourth set of sensing measurement data (e.g., as similar to 914, 916, 918, 920 in FIG. 9), as similarly described for transmitting the measurement data/indication 612 (e.g., as similar to 914, 916, 918, 920 in FIG. 9). In aspects, such a transmission may be based on the adjusted sensing configuration in 1120. From 1122, flowchart 1100 may continue to repeat operations thereof.

In some aspects, performing determinations at 1112 and/or 1116 may be optional, and that performing determinations at 1112 and/or 1116 may be reversed in order (e.g., performing the determination at 1116 prior to 1112), or at least partially concurrently in some aspects.

FIG. 12 is a flowchart 1200 of a method of wireless communication, in various aspects. The method may be performed by a sensing entity, such as an LMF or a base station (e.g., the base station 102; the LMF 166; the sensing entity 604, 904; the network entity 1502, 1602)). In some aspects, the method may include aspects described in connection with the communication flow in FIG. 6 and/or aspects described in FIGS. 7-9. The method provides for multi-hypothesis measurement configuration in RF sensing for sensing measurements that enable wireless devices, e.g., sensing nodes, and base stations/LMFs, e.g., sensing entities, to improve and maintain sensing measurement performance and efficiency through configuration and utilization of multiple sensing hypotheses.

At 1202, a sensing entity receives, from a sensing node, a capability indication of the sensing node, where the capability indication of the sensing node indicates a capability of the sensing node associated with multiple hypothesis (multi-hypothesis) measurement and reporting. As an example, the reception may be performed, at least in part, by the component 199. FIGS. 6-9 illustrate an example of the sensing entity 604 receiving a capability indication of the sensing node from the sensing node (e.g., sensing node 602).

The sensing node 602 may be configured to provide, for reception by the sensing entity 604, a capability indication 606 of the sensing node 602. The capability indication 606 of the sensing node 602 may indicate a capability of the sensing node associated with multiple hypothesis measurement and reporting. For example, the capability indication 606 may indicate capabilities to operate under multiple hypotheses (e.g., 706, 708 in FIG. 7; 806, 808, 812 in FIG. 8) per sensing occasion (e.g., 702 in FIG. 7; 802 in FIG. 8), including: a number of sensing hypotheses (e.g., 706, 708 in FIG. 7; 806, 808, 812 in FIG. 8) supported by the sensing node 602, a buffer capability of the sensing node 602, a processing capability of the sensing node 602, a related sensing capability of the sensing node 602, and/or the like, in aspects. The capability indication 606 may be based on a solicited request, e.g., from the sensing entity 604, or may be unsolicited/requested, e.g., provided/transmitted to the sensing entity 604 without a request. That is, the sensing node 602 may be configured to provide the capability indication 606 in response to a capability request or without/before a capability request. In aspects, the sensing entity 604 may be configured to request the sensing node 602 to indicate its capability to run multiple hypothesis measurement and reporting. In such aspects, the sensing node 602 may be configured to indicate its support to run multiple hypothesis via the capability indication 606. The capability indication 606 may also indicate how many hypotheses can be supported by the sensing node 602 and/or any related sensing capabilities, along with buffer/processing capabilities of the sensing node 602.

At 1204, the sensing entity transmits, for the sensing node, a sensing configuration, where the sensing configuration is based on the capability indication of the sensing node and indicates a total number of sensing hypotheses and at least a first sensing hypothesis and a second sensing hypothesis that is different from the first sensing hypothesis. As an example, the transmission may be performed, at least in part, by the component 199. FIGS. 6-9 illustrate an example of the sensing entity 604 transmitting/providing a sensing configuration for a sensing node (e.g., sensing node 602).

The sensing entity 604 may be configured to provide/transmit to the sensing node 602 a sensing configuration 608. The sensing configuration 608 may indicate a total number of sensing hypotheses (e.g., 706, 708 in FIG. 7; 806, 808, 812 in FIG. 8) and at least a first sensing hypothesis (e.g., 706 in FIG. 7; 806 in FIG. 8) and a second sensing hypothesis (e.g., 708 in FIG. 7; 808 in FIG. 8) that is different from the first sensing hypothesis (e.g., 706 in FIG. 7; 806 in FIG. 8). For example, the sensing entity 604 may be configured to transmit/provide, for the sensing node 602, the sensing configuration 608 that indicates the number of sensing hypotheses (e.g., 706, 708 in FIG. 7; 806, 808, 812 in FIG. 8), including the hypotheses themselves, for obtaining sensing measurement data for sensing operations (e.g., at 610). In aspects, for the total number of sensing hypotheses (e.g., 706, 708 in FIG. 7; 806, 808, 812 in FIG. 8), each sensing hypothesis configuration in the sensing configuration 608 may specify a set of sensing measurements to be performed (e.g., at 610) by the sensing node 602 and the corresponding reference signals (e.g., as a set, as a set of different signals, etc.) (e.g., RS 1/RS 2 for 916, 918, 920 in FIG. 9) by which the set of sensing measurements (e.g., at 610) are to be reported by the sensing node 602. The sensing configuration 608 may indicate, from the total number of sensing hypotheses (e.g., 706, 708 in FIG. 7; 806, 808, 812 in FIG. 8), a first sensing hypothesis (e.g., 706 in FIG. 7; 806 in FIG. 8) that corresponds to a subset of sensing occasions (e.g., 702 in FIG. 7; 802 in FIG. 8) of a sensing resource set (e.g., 704 in FIG. 7; 804, 810 in FIG. 8) and/or a second sensing hypothesis (e.g., 708 in FIG. 7; 808 in FIG. 8) that corresponds to a full set of the sensing occasions (e.g., 702 in FIG. 7; 802 in FIG. 8) in the sensing resource set (e.g., 704 in FIG. 7; 804, 810 in FIG. 8). The sensing configuration 608 may also indicate the sensing measurements (e.g., at 610) as a subset of a range(s), an angle(s), a Doppler measurement(s), and/or the like (e.g., from 912 in FIG. 9), in aspects, and the sensing configuration may further indicate at least one of a same transmission occasion (e.g., 612 in FIG. 6; 916 in FIG. 9) for reporting/transmitting sets of sensing measurement data (e.g., 612 in FIG. 6; 916, 918, 920 in FIG. 9) or a first transmission occasion (e.g., 612 in FIG. 6; 918 in FIG. 9) for a first set of sensing measurement data (e.g., 612 in FIG. 6; 914, 916, 918 in FIG. 9) and a second transmission occasion (e.g., 612 in FIG. 6; 920 in FIG. 9) for a second set of sensing measurement data (e.g., 612 in FIG. 6; 914, 916, 920 in FIG. 9). In aspects, the sensing configuration 608 may indicate a set of corresponding reference signals (e.g., RS 1/RS 2 for 916, 918, 920 in FIG. 9) respectively associated with each of the total number of sensing hypotheses (e.g., 706, 708 in FIG. 7; 806, 808, 812 in FIG. 8) and transmission occasions (e.g., 612 in FIG. 6; 916, 918, 920 in FIG. 9) for reporting, as described herein, and one or more of the reference signals in the set of corresponding reference signals (e.g., RS 1/RS 2 for 916, 918, 920 in FIG. 9) may be different from other signals in the set of corresponding reference signals (e.g., RS 1/RS 2 for 916, 918, 920 in FIG. 9). In aspects, at least one of the first set of sensing measurement data (e.g., 612 in FIG. 6; 914, 916, 918 in FIG. 9) or the second set of sensing measurement data (e.g., 612 in FIG. 6; 914, 916, 920 in FIG. 9) may be associated with at least one corresponding reference signal (e.g., RS 1/RS 2 for 916, 918, 920 in FIG. 9) and at least one of a range, an angle, or a Doppler measurement (e.g., from 912 in FIG. 9), based on the sensing configuration 608.

Based on the sensing configuration 608, the sensing node 602 may be configured to measure (at 610) a first set of sensing measurement data (e.g., 612 in FIG. 6; 914, 916, 918 in FIG. 9) associated with the first sensing hypothesis (e.g., 706 in FIG. 7; 806 in FIG. 8) and a second set of sensing measurement data (e.g., 612 in FIG. 6; 914, 916, 920 in FIG. 9) associated with the second sensing hypothesis (e.g., 708 in FIG. 7; 808 in FIG. 8), as described herein.

For instance, the sensing node 602 may perform sensing operations for measurements (at 610) according to the configured sensing hypotheses (e.g., 706, 708 in FIG. 7; 806, 808, 812 in FIG. 8) in the sensing configuration 608. The sets of sensing measurement data obtained via the sensing operations measured (at 610) may include one or more of the indicated sensing measurements of a subset of a range(s), an angle(s), a Doppler (e.g., from 912 in FIG. 9) measurement(s), and/or the like, from sensing configuration 608. In aspects, the measurement (at 610) may include sensing measurements associated with one or more TRPs (e.g., 908 in FIG. 9), based on the sensing configuration 608. In aspects, the sensing node 602 may be configured to measure (at 610) a third set of sensing measurement data (e.g., 612 in FIG. 6; 914, 916, 918 in FIG. 9) associated with a third sensing hypothesis (e.g., 706 in FIG. 7; 806 in FIG. 8) in a subset of sensing occasions (e.g., 702 in FIG. 7; 802 in FIG. 8) of a sensing resource set (e.g., 704 in FIG. 7; 804, 810 in FIG. 8) and a fourth set of sensing measurement data (e.g., 612 in FIG. 6; 914, 916, 920 in FIG. 9) associated with a fourth sensing hypothesis (e.g., 708 in FIG. 7; 808 in FIG. 8) in the full set of the sensing occasions (e.g., 702 in FIG. 7; 802 in FIG. 8) of the sensing resource set (e.g., 704 in FIG. 7; 804, 810 in FIG. 8).

The measure (at 610) of the sets of sensing measurements by the sensing node 602, and the measurement data/indication 612 (e.g., 914, 916, 918, 920 in FIG. 9), and/or an indication (e.g., 914, 916, 918, 920 in FIG. 9) of the third sensing hypothesis (e.g., 706 in FIG. 7; 806 in FIG. 8) and/or the fourth sensing hypothesis (e.g., 708 in FIG. 7; 808 in FIG. 8) (e.g., the measurement data/indication 612) may also include in aspects, further information associated with a measurement characteristic, an outlier rejection, and/or a measurement efficacy for one or more of third set of sensing measurement data (e.g., 914, 916, 918 in FIG. 9) and/or the fourth set of sensing measurement data (e.g., 914, 916, 920 in FIG. 9).

At 1206, a sensing entity receives, from the sensing node, at least one of: (1) a first set of sensing measurement data associated with the first sensing hypothesis and a second set of sensing measurement data associated with the second sensing hypothesis, or (2) an indication of the first sensing hypothesis and the second sensing hypothesis. As an example, the reception may be performed, at least in part, by the component 199. FIGS. 6-9 illustrate an example of the sensing entity 604 receiving sets of sensing measurement data and/or an indication from a sensing node (e.g., the sensing node 602).

The sensing entity 604 may be configured to receive, from the sensing node 602, measurement data/indication 612 (e.g., 914, 916, 918, 920 in FIG. 9). For example, the sensing node 602 may be configured to transmit, and the sensing entity 604 may be configured to receive, as the measurement data/indication 612 (e.g., 914, 916, 918, 920 in FIG. 9), at least one of: (1) the first set of sensing measurement data and the second set of sensing measurement data (e.g., 914, 916, 918, 920 in FIG. 9), or (2) an indication of the first sensing hypothesis (e.g., 706 in FIG. 7; 806 in FIG. 8) and the second sensing hypothesis (e.g., 708 in FIG. 7; 808 in FIG. 8). The first set of sensing measurement data (e.g., 914, 916, 918 in FIG. 9) and the second set of sensing measurement data (e.g., 914, 916, 920 in FIG. 9) of the measurement data/indication 612 (e.g., 914, 916, 918, 920 in FIG. 9) may include a subset of a range(s), an angle(s), a Doppler measurement(s), and/or the like (e.g., from 912 in FIG. 9), as indicated in sensing configuration 608. The indication of the first sensing hypothesis (e.g., 706 in FIG. 7; 806 in FIG. 8) and the second sensing hypothesis (e.g., 708 in FIG. 7; 808 in FIG. 8) may indicate at least one of the first sensing hypothesis (e.g., 706 in FIG. 7; 806 in FIG. 8) or the second sensing hypothesis (e.g., 708 in FIG. 7; 808 in FIG. 8) that was utilized for to measure (e.g., at 610) the first set or the second set of sensing measurement data (e.g., 914, 916, 918, 920 in FIG. 9). For instance, in aspects for which the sensing node 602 or a network node (e.g., the base station 906 in FIG. 9) activates a sensing hypothesis (e.g., 706, 708 in FIG. 7; 806, 808 in FIG. 8) instead of the sensing entity 604, the sensing node 602 may be configured to transmit, and the sensing entity 604 may be configured to receive, the utilized sensing hypothesis (e.g., 706, 708 in FIG. 7; 806, 808 in FIG. 8) as part of the measurement data/indication 612 (e.g., 914, 916, 918, 920 in FIG. 9) so that the sensing entity 604 is aware of the utilized sensing hypothesis(es) (e.g., 706, 708 in FIG. 7; 806, 808 in FIG. 8).

In aspects, at least one of the first set of sensing measurement data (e.g., 914, 916, 918 in FIG. 9) and the second set of sensing measurement data (e.g., 914, 916, 920 in FIG. 9) or the indication (e.g., 914, 916, 918, 920 in FIG. 9) of the first sensing hypothesis (e.g., 706 in FIG. 7; 806 in FIG. 8) and the second sensing hypothesis (e.g., 708 in FIG. 7; 808 in FIG. 8) of the measurement data/indication 612 may also include information associated with at least one of a measurement characteristic, an outlier rejection, or a measurement efficacy for one or more of the first set of sensing measurement data (e.g., 914, 916, 918 in FIG. 9) associated with the first sensing hypothesis (e.g., 706 in FIG. 7; 806 in FIG. 8) and the second set of sensing measurement data (e.g., 914, 916, 920 in FIG. 9) associated with the second sensing hypothesis (e.g., 708 in FIG. 7; 808 in FIG. 8).

In some aspects, receiving, by the sensing entity 604, the first set of sensing measurement data (e.g., 914, 916, 918 in FIG. 9) and the second set of sensing measurement data (e.g., 914, 916, 920 in FIG. 9) of the measurement data/indication 612 in the same transmission occasion includes receiving in the same transmission occasion on a first reference signal (e.g., 916 on RS 1 in FIG. 9) of the set of corresponding reference signals (e.g., RS 1, RS 2, in FIG. 9), e.g., as configured via sensing configuration 608. In some aspects, receiving the first set of sensing measurement data (e.g., 914, 916, 918 in FIG. 9) (e.g., the measurement data/indication 612) in the first transmission occasion (e.g.,

918 in FIG. 9) is performed on a first reference signal (e.g., on RS 1 in FIG. 9) of the set of corresponding reference signals (e.g., RS 1, RS 2, in FIG. 9), and receiving the second set of sensing measurement data (e.g., 914, 916, 920 in FIG. 9) (the measurement data/indication 612) in the second transmission occasion (e.g., 920 in FIG. 9) is performed on a second reference signal (e.g., on RS 2 in FIG. 9) of the set of corresponding reference signals (e.g., RS 1, RS 2, in FIG. 9).

The sensing node 602 may be configured to transmit, and the sensing entity 604 may be configured to receive, information associated with the measurement characteristic, the outlier rejection, and/or the measurement efficacy based on the measure (at 610), described above. Aspects herein provide that the sensing node 602 may be configured to receive, e.g., as provided/transmitted by the sensing entity 604, an adjusted sensing configuration, which may be a further aspect of the sensing configuration 608 in call flow diagram 600 of FIG. 6. The adjusted sensing configuration may be associated with the indication of the first sensing hypothesis (e.g., 706 in FIG. 7; 806 in FIG. 8) and the second sensing hypothesis (e.g., 708 in FIG. 7; 808 in FIG. 8), as similarly described above for the sensing configuration 608, and the adjusted sensing configuration may indicate at least one of an adjusted total number of sensing hypotheses, an adjusted first sensing hypothesis, or an adjusted second sensing hypothesis (e.g., 810 in FIG. 8). In aspects, the adjusted sensing configuration may be provided to the sensing node 602 from the sensing entity 604 based on the information associated with the measurement characteristic, the outlier rejection, and/or the measurement efficacy.

The sensing node 602 may thus be enabled/configured by the sensing entity 604 to measure (e.g., as similarly described for 610) a third set of sensing measurement data and/or a fourth set of sensing measurement data (e.g., as similar to 914, 916, 918, 920 in FIG. 9) associated with the adjusted total number of sensing hypotheses, the adjusted first sensing hypothesis, and/or the adjusted second sensing hypothesis (e.g., 810 in FIG. 8), as similarly described for the measure (at 610) in call flow diagram 600. The sensing node 602 may be configured to then transmit, and the sensing entity 604 may be configured to receive, the third set of sensing measurement data and the fourth set of sensing measurement data (e.g., as similar to 914, 916, 918, 920 in FIG. 9), as similarly described for transmitting the measurement data/indication 612 (e.g., as similar to 914, 916, 918, 920 in FIG. 9).

FIG. 13 is a flowchart 1300 of a method of wireless communication, in various aspects. The method may be performed by a sensing entity, such as an LMF or a base station (e.g., the base station 102; the LMF 166; the sensing entity 604, 904; the network entity 1502, _1302)). In some aspects, the method may include aspects described in connection with the communication flow in FIGS. 6, 9 and/or aspects described in FIGS. 7, 8. The method provides for multi-hypothesis measurement configuration in RF sensing for sensing measurements that enable wireless devices, e.g., sensing nodes, and base stations/LMFs, e.g., sensing entities, to improve and maintain sensing measurement performance and efficiency through configuration and utilization of multiple sensing hypotheses.

At 1302, a sensing entity transmits a capability request of the sensing node prior to receiving a capability indication of the sensing node. As an example, the transmission may be performed, at least in part, by the component 199. FIGS. 6-9 illustrate an example of the sensing entity 604 transmitting/providing such a capability request for the sensing node (e.g., the sensing node 602).

The sensing entity 604 may be configured to provide/transmit, and the sensing node 602 may be configured to receive, a capability request for a sensing capability(ies) of the sensing node 602. In aspects, the sensing node 602 may receive the capability request associated with multiple hypothesis measurement and reporting as transmitted/provided by the sensing entity 604. The capability request may indicate that the sensing node 602 provide/transmit to sensing entity 604 at least one of capabilities to operate under multiple hypotheses (e.g., 706, 708 in FIG. 7; 806, 808, 812 in FIG. 8) per sensing occasion (e.g., 702 in FIG. 7; 802 in FIG. 8), including (without limitation): a number of sensing hypotheses (e.g., 706, 708 in FIG. 7; 806, 808, 812 in FIG. 8) supported by the sensing node 602, a buffer capability of the sensing node 602, a processing capability of the sensing node 602, a related sensing capability of the sensing node 602, and/or the like. In some aspects, the provision/reception of the capability request may be optional (e.g., the sensing node 902 may provide its sensing capabilities autonomously without or before receiving the capability request from the sensing entity 904).

At 1304, the sensing entity receives, from the sensing node, the capability indication of the sensing node, where the capability indication of the sensing node indicates a capability of the sensing node associated with multiple hypothesis (multi-hypothesis) measurement and reporting. As an example, the reception may be performed, at least in part, by the component 199. FIGS. 6-9 illustrate an example of the sensing entity 604 receiving such a capability indication of the sensing node (e.g., from/of the sensing node 602).

The sensing node 602 may be configured to provide, and the sensing entity 604 may be configured to receive, a capability indication 606 of the sensing node 602. The capability indication 606 of the sensing node 602 may indicate a capability of the sensing node associated with multiple hypothesis measurement and reporting. For example, the capability indication 606 may indicate capabilities to operate under multiple hypotheses (e.g., 706, 708 in FIG. 7; 806, 808, 812 in FIG. 8) per sensing occasion (e.g., 702 in FIG. 7; 802 in FIG. 8), including: a number of sensing hypotheses (e.g., 706, 708 in FIG. 7; 806, 808, 812 in FIG. 8) supported by the sensing node 602, a buffer capability of the sensing node 602, a processing capability of the sensing node 602, a related sensing capability of the sensing node 602, and/or the like, in aspects. The capability indication 606 may be based on a solicited request, e.g., from the sensing entity 604 at 1102, or may be unsolicited/requested, e.g., provided/transmitted to the sensing entity 604 without a request. That is, the sensing node 602 may be configured to provide the capability indication 606 in response to a capability request or without/before a capability request. In aspects, the sensing entity 604 may be configured to request the sensing node 602 to indicate its capability to run multiple hypothesis measurement and reporting. In such aspects, the sensing node 602 may be configured to indicate its support to run multiple hypothesis via the capability indication 606. The capability indication 606 may also indicate how many hypotheses can be supported by the sensing node 602 and/or any related sensing capabilities, along with buffer/processing capabilities of the sensing node 602.

At 1306, a sensing entity transmits, for the sensing node, a sensing configuration, where the sensing configuration is based on the capability indication of the sensing node and indicates a total number of sensing hypotheses and at least a first sensing hypothesis and a second sensing hypothesis that is different from the first sensing hypothesis. As an example, the transmission may be performed, at least in part, by the component 199. FIGS. 6-9 illustrate an example of the sensing entity 604 transmitting/providing such a sensing configuration for a sensing node (e.g., the sensing node 602).

The sensing entity 604 may be configured to transmit, for the sensing node 602, a sensing configuration 608. The sensing configuration 608 may be based on the capability indication 606. The sensing configuration 608 may indicate a total number of sensing hypotheses (e.g., 706, 708 in FIG. 7; 806, 808, 812 in FIG. 8) and at least a first sensing hypothesis (e.g., 706 in FIG. 7; 806 in FIG. 8) and a second sensing hypothesis (e.g., 708 in FIG. 7; 808 in FIG. 8) that is different from the first sensing hypothesis (e.g., 706 in FIG. 7; 806 in FIG. 8). For example, the sensing entity 604 may be configured to transmit/provide, for the sensing node 602, the sensing configuration 608 that indicates the number of sensing hypotheses (e.g., 706, 708 in FIG. 7; 806, 808, 812 in FIG. 8), including the hypotheses themselves, for obtaining sensing measurement data for sensing operations (e.g., at 610). In aspects, for the total number of sensing hypotheses (e.g., 706, 708 in FIG. 7; 806, 808, 812 in FIG. 8), each sensing hypothesis configuration in the sensing configuration 608 may specify a set of sensing measurements to be performed (e.g., at 610) by the sensing node 602 and the corresponding reference signals (e.g., as a set, as a set of different signals, etc.) (e.g., RS 1/RS 2 for 916, 918, 920 in FIG. 9) by which the set of sensing measurements (e.g., at 610) are to be reported by the sensing node 602. The sensing configuration 608 may indicate, from the total number of sensing hypotheses (e.g., 706, 708 in FIG. 7; 806, 808, 812 in FIG. 8), a first sensing hypothesis (e.g., 706 in FIG. 7; 806 in FIG. 8) that corresponds to a subset of sensing occasions (e.g., 702 in FIG. 7; 802 in FIG. 8) of a sensing resource set (e.g., 704 in FIG. 7; 804, 810 in FIG. 8) and/or a second sensing hypothesis (e.g., 708 in FIG. 7; 808 in FIG. 8) that corresponds to a full set of the sensing occasions (e.g., 702 in FIG. 7; 802 in FIG. 8) in the sensing resource set (e.g., 704 in FIG. 7; 804, 810 in FIG. 8). The sensing configuration 608 may also indicate the sensing measurements (e.g., at 610) as a subset of a range(s), an angle(s), a Doppler measurement(s), and/or the like (e.g., from 912 in FIG. 9), in aspects, and the sensing configuration may further indicate at least one of a same transmission occasion (e.g., 612 in FIG. 6; 916 in FIG. 9) for reporting/transmitting sets of sensing measurement data (e.g., 612 in FIG. 6; 916, 918, 920 in FIG. 9) or a first transmission occasion (e.g., 612 in FIG. 6; 918 in FIG. 9) for a first set of sensing measurement data (e.g., 612 in FIG. 6; 914, 916, 918 in FIG. 9) and a second transmission occasion (e.g., 612 in FIG. 6; 920 in FIG. 9) for a second set of sensing measurement data (e.g., 612 in FIG. 6; 914, 916, 920 in FIG. 9). In aspects, the sensing configuration 608 may indicate a set of corresponding reference signals (e.g., RS 1/RS 2 for 916, 918, 920 in FIG. 9) respectively associated with each of the total number of sensing hypotheses (e.g., 706, 708 in FIG. 7; 806, 808, 812 in FIG. 8) and transmission occasions (e.g., 612 in FIG. 6; 916, 918, 920 in FIG. 9) for reporting, as described herein, and one or more of the reference signals in the set of corresponding reference signals (e.g., RS 1/RS 2 for 916, 918, 920 in FIG. 9) may be different from other signals in the set of corresponding reference signals (e.g., RS 1/RS 2 for 916, 918, 920 in FIG. 9). In aspects, at least one of the first set of sensing measurement data (e.g., 612 in FIG. 6; 914,

916, 918 in FIG. 9) or the second set of sensing measurement data (e.g., 612 in FIG. 6; 914, 916, 920 in FIG. 9) may be associated with at least one corresponding reference signal (e.g., RS 1/RS 2 for 916, 918, 920 in FIG. 9) and at least one of a range, an angle, or a Doppler measurement (e.g., from 912 in FIG. 9), based on the sensing configuration 608.

At 1308, the sensing entity receives, from the sensing node, at least one of: (1) a first set of sensing measurement data associated with the first sensing hypothesis and a second set of sensing measurement data associated with the second sensing hypothesis, or (2) an indication of the first sensing hypothesis and the second sensing hypothesis. As an example, the reception may be performed, at least in part, by the component 199. FIGS. 6-9 illustrate an example of the sensing entity 604 receiving such sensing measurement data/indication from a sensing node (e.g., sensing node 602).

The sensing entity 604 may be configured to receive, from the sensing node 602, measurement data/indication 612 (e.g., 914, 916, 918, 920 in FIG. 9). For example, the sensing node 602 may be configured to transmit, for the sensing entity 604 and as the measurement data/indication 612 (e.g., 914, 916, 918, 920 in FIG. 9), at least one of: (1) the first set of sensing measurement data and the second set of sensing measurement data (e.g., 914, 916, 918, 920 in FIG. 9), or (2) an indication of the first sensing hypothesis (e.g., 706 in FIG. 7; 806 in FIG. 8) and the second sensing hypothesis (e.g., 708 in FIG. 7; 808 in FIG. 8). The first set of sensing measurement data (e.g., 914, 916, 918 in FIG. 9) and the second set of sensing measurement data (e.g., 914, 916, 920 in FIG. 9) of the measurement data/indication 612 (e.g., 914, 916, 918, 920 in FIG. 9) may include a subset of a range(s), an angle(s), a Doppler measurement(s), and/or the like (e.g., from 912 in FIG. 9), as indicated in sensing configuration 608. The indication of the first sensing hypothesis (e.g., 706 in FIG. 7; 806 in FIG. 8) and the second sensing hypothesis (e.g., 708 in FIG. 7; 808 in FIG. 8) may indicate at least one of the first sensing hypothesis (e.g., 706 in FIG. 7; 806 in FIG. 8) or the second sensing hypothesis (e.g., 708 in FIG. 7; 808 in FIG. 8) that was utilized for to measure (e.g., at 610) the first set or the second set of sensing measurement data (e.g., 914, 916, 918, 920 in FIG. 9). For instance, in aspects for which the sensing node 602 or a network node (e.g., the base station 906 in FIG. 9) activates a sensing hypothesis (e.g., 706, 708 in FIG. 7; 806, 808 in FIG. 8) instead of the sensing entity 604, the sensing node 602 may be configured to transmit the utilized sensing hypothesis (e.g., 706, 708 in FIG. 7; 806, 808 in FIG. 8) for the sensing entity 604 as part of the measurement data/indication 612 (e.g., 914, 916, 918, 920 in FIG. 9) so that the sensing entity 604 is aware of the utilized sensing hypothesis(es) (e.g., 706, 708 in FIG. 7; 806, 808 in FIG. 8).

In aspects, at least one of the first set of sensing measurement data (e.g., 914, 916, 918 in FIG. 9) and the second set of sensing measurement data (e.g., 914, 916, 920 in FIG. 9) or the indication (e.g., 914, 916, 918, 920 in FIG. 9) of the first sensing hypothesis (e.g., 706 in FIG. 7; 806 in FIG. 8) and the second sensing hypothesis (e.g., 708 in FIG. 7; 808 in FIG. 8) of the measurement data/indication 612 may also include information associated with at least one of a measurement characteristic, an outlier rejection, or a measurement efficacy for one or more of the first set of sensing measurement data (e.g., 914, 916, 918 in FIG. 9) associated with the first sensing hypothesis (e.g., 706 in FIG. 7; 806 in FIG. 8) and the second set of sensing measurement data (e.g., 914, 916, 920 in FIG. 9) associated with the second sensing hypothesis (e.g., 708 in FIG. 7; 808 in FIG. 8).

In some aspects, receiving the first set of sensing measurement data (e.g., 914, 916, 918 in FIG. 9) and the second set of sensing measurement data (e.g., 914, 916, 920 in FIG. 9) of the measurement data/indication 612 in the same transmission occasion includes receiving in the same transmission occasion on a first reference signal (e.g., 916 on RS 1 in FIG. 9) of the set of corresponding reference signals (e.g., RS 1, RS 2, in FIG. 9), e.g., as configured via sensing configuration 608. In some aspects, receiving the first set of sensing measurement data (e.g., 914, 916, 918 in FIG. 9) (e.g., the measurement data/indication 612) in the first transmission occasion (e.g., 918 in FIG. 9) is performed on a first reference signal (e.g., on RS 1 in FIG. 9) of the set of corresponding reference signals (e.g., RS 1, RS 2, in FIG. 9), and receiving the second set of sensing measurement data (e.g., 914, 916, 920 in FIG. 9) (the measurement data/indication 612) in the second transmission occasion (e.g., 920 in FIG. 9) is performed on a second reference signal (e.g., on RS 2 in FIG. 9) of the set of corresponding reference signals (e.g., RS 1, RS 2, in FIG. 9).

As described herein, with reference to the sets of sensing measurement data received by the sensing entity 604 at 1308, the sensing node 602 may be configured to measure (at 610) a first set of sensing measurement data (e.g., 612 in FIG. 6; 914, 916, 918 in FIG. 9) associated with the first sensing hypothesis (e.g., 706 in FIG. 7; 806 in FIG. 8) and a second set of sensing measurement data (e.g., 612 in FIG. 6; 914, 916, 920 in FIG. 9) associated with the second sensing hypothesis (e.g., 708 in FIG. 7; 808 in FIG. 8). For instance, the sensing node 602 may perform sensing operations for measurements (at 610) according to the configured sensing hypotheses (e.g., 706, 708 in FIG. 7; 806, 808, 812 in FIG. 8) in the sensing configuration 608. The sets of sensing measurement data obtained via the sensing operations measured (at 610) may include one or more of the indicated sensing measurements of a subset of a range(s), an angle(s), a Doppler (e.g., from 912 in FIG. 9) measurement(s), and/or the like, from sensing configuration 608. In aspects, the measurement (at 610) may include sensing measurements associated with one or more TRPs (e.g., 908 in FIG. 9), based on the sensing configuration 608. In aspects, the sensing node 602 may be configured to measure (at 610) a first set of sensing measurement data (e.g., 612 in FIG. 6; 914, 916, 918 in FIG. 9) associated with a first sensing hypothesis (e.g., 706 in FIG. 7; 806 in FIG. 8) in a subset of sensing occasions (e.g., 702 in FIG. 7; 802 in FIG. 8) of a sensing resource set (e.g., 704 in FIG. 7; 804, 810 in FIG. 8) and a second set of sensing measurement data (e.g., 612 in FIG. 6; 914, 916, 920 in FIG. 9) associated with a second sensing hypothesis (e.g., 708 in FIG. 7; 808 in FIG. 8) in the full set of the sensing occasions (e.g., 702 in FIG. 7; 802 in FIG. 8) of the sensing resource set (e.g., 704 in FIG. 7; 804, 810 in FIG. 8). The measure (at 610) of the first set and the second set of sensing measurements by the sensing node 602, and the measurement data/indication 612 (e.g., 914, 916, 918, 920 in FIG. 9), the first set of sensing measurement data (e.g., 914, 916, 918 in FIG. 9) and the second set of sensing measurement data (e.g., 914, 916, 920 in FIG. 9), and/or the indication (e.g., 914, 916, 918, 920 in FIG. 9) of the first sensing hypothesis (e.g., 706 in FIG. 7; 806 in FIG. 8) and the second sensing hypothesis (e.g., 708 in FIG. 7; 808 in FIG. 8) (e.g., the measurement data/indication 612) may also include in aspects, information associated with a measurement characteristic, an outlier rejection, and/or a measurement efficacy for one or more of the first set of sensing measurement data (e.g., 914, 916, 918 in FIG. 9) associated with the first sensing hypothesis (e.g., 706 in FIG. 7; 806 in FIG. 8) and the second set of sensing measurement data (e.g., 914, 916, 920 in FIG. 9) associated with the second sensing hypothesis (e.g., 708 in FIG. 7; 808 in FIG. 8). That is, while aspects herein provide for network-based solutions, multi-hypothesis measurements for sensing computations also applies to UE-based solutions. Thus, in aspects for a UE-based sensing session, a sensing node (e.g., 602 in FIG. 6; 902 in FIG. 9) may configure a UE for multi-hypothesis measurements, and the UE may report to the sensing entity (e.g., 604 in FIG. 6; 904 in FIG. 9) which sensing hypothesis (e.g., 706, 708 in FIG. 7; 806, 808 in FIG. 8) generated better results. In aspects, the measure (at 610) may be a part of a sensing session (e.g., as in 700 in FIG. 7; 800 in FIG. 8) that includes at least a full set of sensing occasions (e.g., 702 in FIG. 7; 802 in FIG. 8) of a sensing resource set (e.g., 704 in FIG. 7; 804, 810 in FIG. 8).

At 1310, it may be determined if a hypothesis activation is utilized. As an example, the reception may be performed, at least in part, by the component 199. If so, flowchart 1300 may continue to 1312; if not, flowchart 1300 may continue to 1314.

At 1312, the sensing entity transmits, for the sensing node and subsequent to transmitting the sensing configuration, a hypothesis activation, where the hypothesis activation indicates at least one of the first sensing hypothesis or the second sensing hypothesis from the total number of sensing hypotheses for the measurement. As an example, the transmission may be performed, at least in part, by the component 199. FIGS. 6, 7, 8, 9 illustrate an example of the sensing entity 904 (e.g., a further aspect of the sensing entity 604 in FIG. 6) transmitting/providing a hypothesis activation for a sensing node (e.g., the sensing node 902 which may be a further aspect of the sensing node 602 in FIG. 6).

In aspects, as described above, hypothesis activations (e.g., 816 in FIG. 8; 910 in FIG. 9) may be utilized in sensing operations to specifically activate one or more sensing hypothesis (e.g., 706, 708 in FIG. 7; 806, 808, 812 in FIG. 8). With reference to diagram 900 in FIG. 9, a hypothesis activation 910 (e.g., 816 in FIG. 8), [which] may be initiated by the sensing node 902 itself, by the sensing entity 904 for the sensing node 902, and/or by the base station 906 (e.g., the network node) for the sensing node 902. The hypothesis activation 910 (e.g., 816 in FIG. 8) may be provided/transmitted, received, obtained, implemented, etc., subsequent to receiving a sensing configuration (e.g., 608 in FIG. 6), including before sensing sessions and/or during sensing sessions. The hypothesis activation 910 (e.g., 816 in FIG. 8) may indicate at least one sensing hypothesis from a total number of sensing hypotheses (e.g., 706, 708 in FIG. 7; 806, 808, 812 in FIG. 8) for performing sensing measurements (e.g., at 610) in sensing operations.

In aspects, the sensing entity 904 may be a LMF, and the hypothesis activation 910 (e.g., 816 in FIG. 8) may be associated with a coherency condition of the sensing node 902. In some aspects, the hypothesis activation 910 (e.g., 816 in FIG. 8) may be received by the sensing node 902, as transmitted/provided from the base station 906 (e.g., from a network node), via at least one of RRC signaling, a medium access control (MAC) control element (MAC-CE), or DCI. In cases where the sensing entity 904 may be a network entity, such as an LMF, communications between the sensing entity 904 and the sensing node 902 may be via proper signaling such as LTE positioning protocol (LPP), which may be a higher layer signaling. The base station 906, e.g., a network node, may be configured to dynamically activate a subset of sensing hypotheses (e.g., of 706, 708 in FIG. 7; of 806, 808, 812 in FIG. 8) via the hypothesis activation 910

(e.g., 816 in FIG. 8) based on specific conditions. As one example, the base station 906 may be aware of a beam switch in between sensing reference signal (e.g., for RS 1, RS 2 in FIG. 9) transmissions, which may invalidate the phase coherence property of the sensing reference signals (e.g., for RS 1, RS 2 in FIG. 9). Based on that knowledge, the base station 906 may be configured to activate a subset of sensing hypothesis (e.g., of 706, 708 in FIG. 7; of 806, 808, 812 in FIG. 8), via the hypothesis activation 910 (e.g., 816 in FIG. 8), to be measured by the sensing node 902 and reported to the sensing entity 904. As illustrated in FIG. 8, the third sensing hypothesis 812 may be activated.

In some aspects, the sensing node 902 may be a SL UE, the sensing entity 904 may be a UE, and the hypothesis activation 910 (e.g., 816 in FIG. 8) may be associated with a coherency condition of the sensing node 902. The hypothesis activation 910 (e.g., 816 in FIG. 8) may be received by the sensing node 902, as transmitted/provided from the sensing entity 904, via a sidelink channel by at least one of direct communication (PC5) RRC signaling, a PC5 MAC-CE, SL control information (SCI) stage 1, or SCI stage 2. As one example, a UE, acting as the sensing entity 904, may be configured, via the sidelink channel, to configure a participating SL UE, acting as the sensing node 902, with multiple sensing hypotheses (e.g., 706, 708 in FIG. 7; 806, 808, 812 in FIG. 8) from which the hypothesis activation 910 (e.g., 816 in FIG. 8) triggers/selects at least one sensing hypothesis (e.g., 706, 708 in FIG. 7; 806, 808, 812 in FIG. 8). The SL UE may then perform the multi-hypothesis measurements (e.g., at 610) utilizing the triggered/selected sensing hypothesis(es) (e.g., 706, 708 in FIG. 7; 806, 808, 812 in FIG. 8) and report resulting sensing measurement data (e.g., sets thereof: 612 in FIG. 6; 914, 916, 918, 920 in FIG. 9) and the utilized sensing hypothesis(es) (e.g., 706, 708 in FIG. 7; 806, 808, 812 in FIG. 8) back to the UE.

In some aspects, activation of hypothesis measurements via the hypothesis activation 910 (e.g., 816 in FIG. 8), and corresponding reporting, may be based on one or more events. That is, aspects herein provide for the sensing node 902 to trigger the hypothesis activation 910 (e.g., 816 in FIG. 8), as noted above. Once the configured event(s) is triggered, one or more sensing hypotheses (e.g., 706, 708 in FIG. 7; 806, 808, 812 in FIG. 8) may be autonomously utilized by the sensing node 902 for performing sensing measurements, to generate sensing measurement data (e.g., at 610) (e.g., sets thereof: 612 in FIG. 6; 914, 916, 918, 920 in FIG. 9), which may be subsequently reported by the sensing node 902 to the sensing entity 904. As one example of a triggering event, the sensing node 902, e.g., a UE, may experience a mobility event and/or cell switching. In such cases, the sensing node 902 may move between a first area and a second area or switch from a first cell to a second cell. For instance, within the first area, the sensing node may perform sensing measurements based on a first sensing hypothesis (e.g., 706 in FIG. 7; 806 in FIG. 8) and/or a second sensing hypothesis (e.g., 708 in FIG. 7; 812 in FIG. 8). Based on a mobility event experienced by the sensing node 902 (e.g., moving to the second area), the sensing node 902 may trigger the hypothesis activation 910 (e.g., 816 in FIG. 8) such that in the second area, the sensing node may perform sensing measurements based on a third sensing hypothesis and/or a fourth sensing hypothesis (e.g., 706, 708 in FIG. 7; 806, 808, 812 in FIG. 8).

From 1312, flowchart 1100 may continue to 1314.

At 1314, it may be determined if an adjusted sensing configuration is utilized. As an example, the determination may be performed, at least in part, by the component 199. If so, flowchart 1300 may continue to 1316; if not, flowchart 1300 may continue to repeat operations thereof.

At 1316, the sensing entity transmits, for the sensing node, an adjusted sensing configuration associated with the indication of the first sensing hypothesis and the second sensing hypothesis, where the adjusted sensing configuration indicates at least one of an adjusted total number of sensing hypotheses, an adjusted first sensing hypothesis, or an adjusted second sensing hypothesis. As an example, the transmission/provision may be performed, at least in part, by the component 199. FIGS. 6, 7, 8, 9 illustrate an example of the sensing entity 604 receiving an adjusted sensing configuration from a sensing node (e.g., the sensing node 602).

As described for aspects herein, and with reference to FIG. 6 and call flow diagram 600, the sensing node 602 may be configured to transmit, and the sensing entity 604 may be configured to receive, information associated with the measurement characteristic, the outlier rejection, and/or the measurement efficacy based on the measure (at 610), which may be included with the transmitted/received sets of sensing measurement data (e.g., 914, 916, 920 in FIG. 9). Aspects herein provide that the sensing node 602 may be configured to receive, e.g., transmitted/provided from the sensing entity 604, an adjusted sensing configuration, which may be a further aspect of the sensing configuration 608 in call flow diagram 600 of FIG. 6. In aspects, the adjusted sensing configuration may be associated with the indication of the first sensing hypothesis (e.g., 706 in FIG. 7; 806 in FIG. 8) and the second sensing hypothesis (e.g., 708 in FIG. 7; 808 in FIG. 8), as similarly described above for the sensing configuration 608, and the adjusted sensing configuration may indicate at least one of an adjusted total number of sensing hypotheses, an adjusted first sensing hypothesis, or an adjusted second sensing hypothesis (e.g., 810 in FIG. 8). In aspects, the adjusted sensing configuration may be provided to the sensing node 602 from the sensing entity 604 based on the information associated with the measurement characteristic, the outlier rejection, and/or the measurement efficacy.

At 1318, the sensing entity receives, from the sensing node, a third set of sensing measurement data and a fourth set of sensing measurement data associated with at least one of the adjusted total number of sensing hypotheses, the adjusted first sensing hypothesis, or the adjusted second sensing hypothesis. As an example, the reception may be performed, at least in part, by the component 199. FIGS. 6, 7, 8, 9 illustrate an example of the sensing entity 604 receiving sets of sensing measurement data (and/or an indication) from a sensing node (e.g., the sensing node 602).

The sensing entity 604 may be configured to receive, from the sensing node 602, the third set of sensing measurement data and/or the fourth set of sensing measurement data (e.g., as similar to 914, 916, 918, 920 in FIG. 9), as similarly described for transmitting the measurement data/indication 612 (e.g., as similar to 914, 916, 918, 920 in FIG. 9). In aspects, such a reception may be based on the adjusted sensing configuration in 1316. For example, based on the adjusted sensing configuration described herein, the sensing node 602 may thus be enabled/configured to measure (e.g., as similarly described for 610) a third set of sensing measurement data and/or a fourth set of sensing measurement data (e.g., as similar to 914, 916, 918, 920 in FIG. 9) associated with the adjusted total number of sensing hypotheses, the adjusted first sensing hypothesis, and/or the adjusted second sensing hypothesis (e.g., 810 in FIG. 8), as similarly described for the measure (at 610) in call flow diagram 600. From 1318, flowchart 1300 may continue to repeat operations thereof.

In some aspects, performing determinations at 1310 and/or 1314 may be optional, and that performing determinations at 1310 and/or 1314 may be reversed in order (e.g., performing the determination at 1314 prior to 1310 or at least partially concurrently in some aspects.

Figure 14:
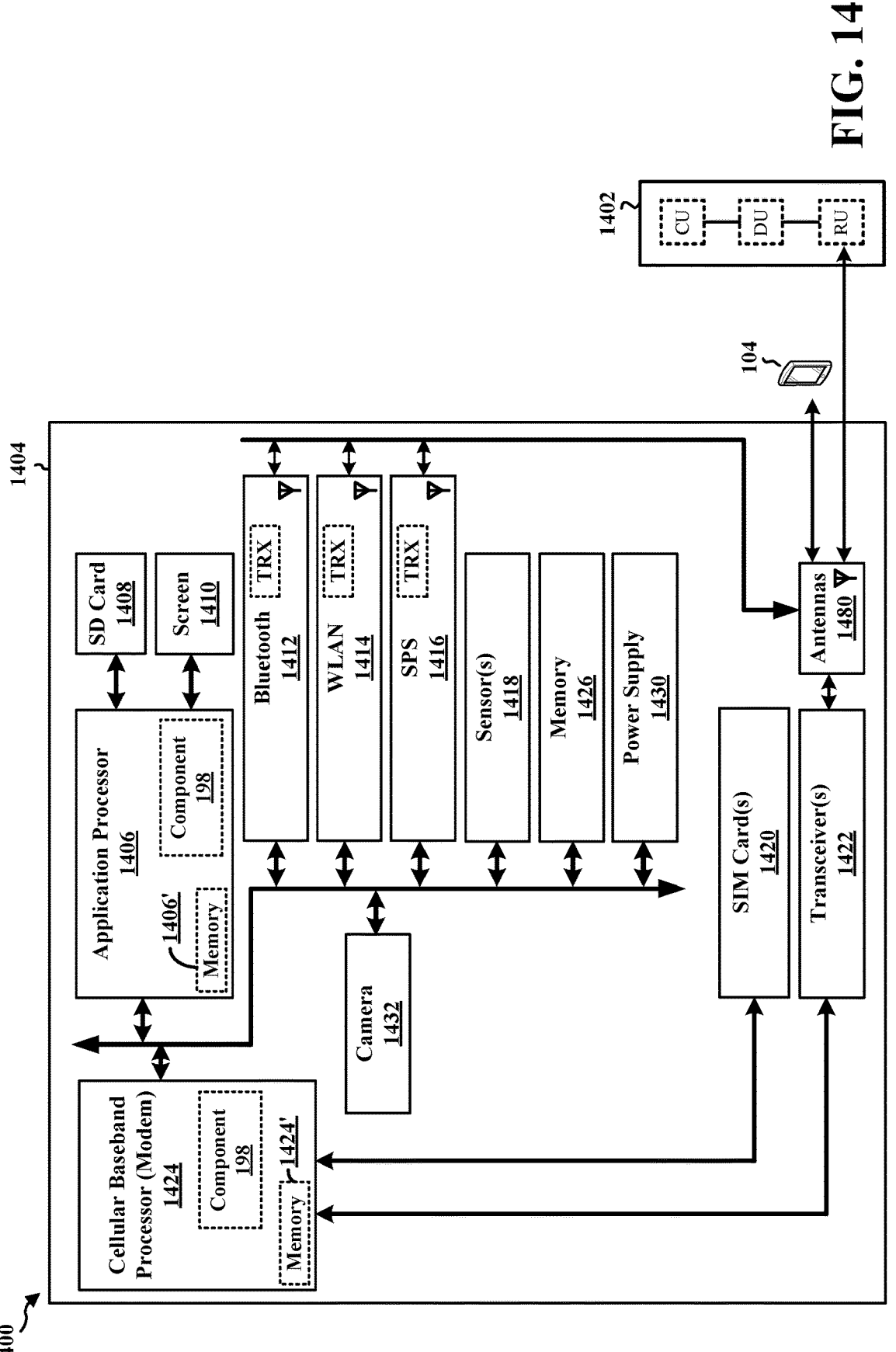
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include a cellular baseband processor 1424 (also referred to as a modem) coupled to one or more transceivers 1422 (e.g., cellular RF transceiver). The cellular baseband processor 1424 may include on-chip memory 1424'. In some aspects, the apparatus 1404 may further include one or more subscriber identity modules (SIM) cards 1420 and an application processor 1406 coupled to a secure digital (SD) card 1408 and a screen 1410. The application processor 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor 1424 communicates through the transceiver(s) 1422 via one or more antennas 1480 with the UE 104 and/or with an RU associated with a network entity 1402. The cellular baseband processor 1424 and the application processor 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The computer-readable medium/memory may also be used for storing data that is manipulated by the cellular baseband processor 1424/application processor 1406 when executing software. The cellular baseband processor 1424/application processor 1406 may be a component of the UE 350 and may include the memory 360 and/or at least one of the TX processor 368, the RX processor 356, and the controller/processor 359. In one configuration, the apparatus 1404 may be a processor chip (modem and/or application) and include just the cellular baseband processor 1424 and/or the application processor 1406, and in another configuration, the apparatus 1404 may be the entire UE (e.g., see UE 350 of FIG. 3) and include the additional modules of the apparatus 1404.

As discussed supra, the component 198 may be configured to receive, from a sensing entity, a sensing configuration, the sensing configuration indicating a total number of sensing hypotheses and at least a first sensing hypothesis and a second sensing hypothesis that is different from the first sensing hypothesis. The component 198 may also be configured to measure a first set of sensing measurement data associated with the first sensing hypothesis and a second set of sensing measurement data associated with the second sensing hypothesis. The component 198 may also be configured to transmit, for the sensing entity, at least one of: (1) the first set of sensing measurement data and the second set of sensing measurement data, or (2) an indication of the first sensing hypothesis and the second sensing hypothesis. The component 198 may be configured to receive, from the sensing entity, an adjusted sensing configuration associated with the indication of the first sensing hypothesis and the second sensing hypothesis, where the adjusted sensing configuration indicates at least one of an adjusted total number of sensing hypotheses, an adjusted first sensing hypothesis, or an adjusted second sensing hypothesis. The component 198 may be configured to measure a third set of sensing measurement data and a fourth set of sensing measurement data associated with least one of the adjusted total number of sensing hypotheses, the adjusted first sensing hypothesis, or the adjusted second sensing hypothesis. The component 198 may be configured to transmit, for the sensing entity, the third set of sensing measurement data and the fourth set of sensing measurement data. The component 198 may be configured to receive, from the sensing entity or from a network node and subsequent to the sensing configuration, a hypothesis activation, where the hypothesis activation indicates at least one of the first sensing hypothesis or the second sensing hypothesis from the total number of sensing hypotheses for the measurement. The component 198 may be configured to provide, to the sensing entity, a capability indication of the sensing node, where the capability indication of the sensing node indicates a capability of the sensing node associated with multiple hypothesis (multi-hypothesis) measurement and reporting including at least one of a number of sensing hypotheses supported by the sensing node, a buffer capability of the sensing node, a processing capability of the sensing node, or a related sensing capability of the sensing node. The component 198 may be configured to receive a capability request of the sensing node prior to transmission of the capability indication of the sensing node. The component 198 may be further configured to perform any of the aspects described in connection with the flowcharts in any of FIGS. 10-13, and/or any of the aspects performed by a sensing node for any of FIGS. 5-9. The component 198 may be within the cellular baseband processor 1424, the application processor 1406, or both the cellular baseband processor 1424 and the application processor 1406. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1404 may include a variety of components configured for various functions. In one configuration, the apparatus 1404, and in particular the cellular baseband processor 1424 and/or the application processor 1406, may include means for receiving, from a sensing entity, a sensing configuration, the sensing configuration indicating a total number of sensing hypotheses and at least a first sensing hypothesis and a second sensing hypothesis that is different from the first sensing hypothesis. In the configuration, the apparatus 1404, and in particular the cellular baseband processor 1424 and/or the application processor 1406, may include means for measuring a first set of sensing measurement data associated with the first sensing hypothesis and a second set of sensing measurement data associated with the second sensing hypothesis. In the configuration, the apparatus 1404, and in particular the cellular baseband processor 1424 and/or the application processor 1406, may include means for transmitting, for the sensing entity, at least one of: (1) the first set of sensing measurement data and the second set of sensing measurement data, or (2) an indication of the first sensing hypothesis and the second sensing hypothesis. In one configuration, the apparatus 1404, and in particular the cellular baseband processor 1424 and/or the application processor 1406, may include means for receiving, from the sensing entity, an adjusted sensing configuration associated with the indication of the first sensing hypothesis and the second sensing hypothesis, where the adjusted sensing configuration indicates at least one of an adjusted total number of sensing hypotheses, an adjusted first sensing hypothesis, or an adjusted second sensing hypothesis. In one configuration, the apparatus 1404, and in particular the cellular baseband processor 1424 and/or the application processor 1406, may include means for measuring a third set of sensing measurement data and a fourth set of sensing measurement data associated with least one of the adjusted total number of sensing hypotheses, the adjusted first sensing hypothesis, or the adjusted second sensing hypothesis. In one configuration, the apparatus 1404, and in particular the cellular baseband processor 1424 and/or the application processor 1406, may include means for transmitting, for the sensing entity, the third set of sensing measurement data and the fourth set of sensing measurement data. In one configuration, the apparatus 1404, and in particular the cellular baseband processor 1424 and/or the application processor 1406, may include means for receiving, from the sensing entity or from a network node and subsequent to the sensing configuration, a hypothesis activation, where the hypothesis activation indicates at least one of the first sensing hypothesis or the second sensing hypothesis from the total number of sensing hypotheses for the measurement. In one configuration, the apparatus 1404, and in particular the cellular baseband processor 1424 and/or the application processor 1406, may include means for providing, to the sensing entity, a capability indication of the sensing node, where the capability indication of the sensing node indicates a capability of the sensing node associated with multiple hypothesis (multi-hypothesis) measurement and reporting including at least one of a number of sensing hypotheses supported by the sensing node, a buffer capability of the sensing node, a processing capability of the sensing node, or a related sensing capability of the sensing node. In one configuration, the apparatus 1404, and in particular the cellular baseband processor 1424 and/or the application processor 1406, may include means for receiving a capability request of the sensing node prior to transmitting the capability indication of the sensing node. The means may be the component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
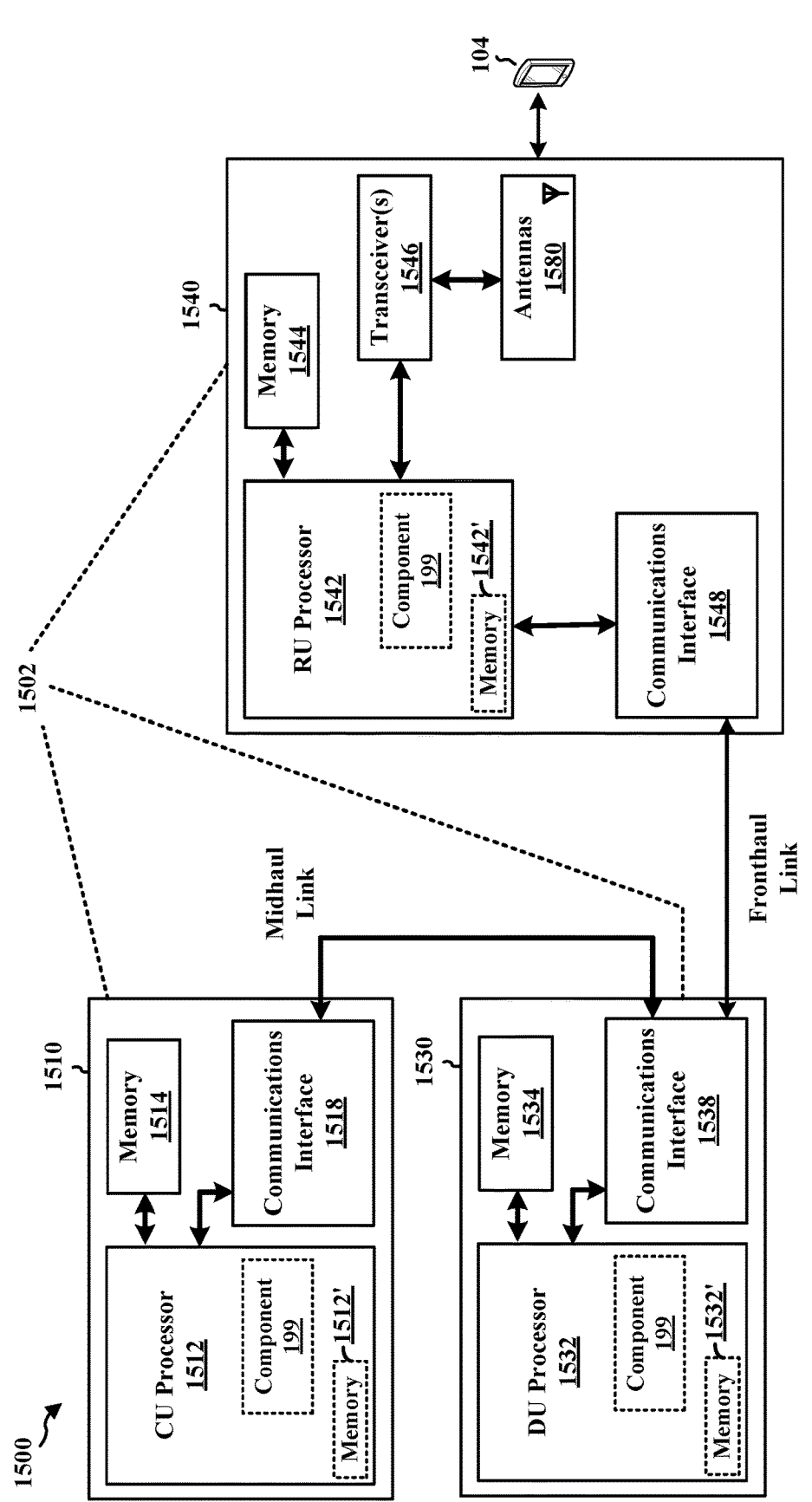
FIG. 15 is a diagram illustrating an example of a hardware implementation for an example network entity.

FIG. 15 is a diagram 1500 illustrating an example of a hardware implementation for a network entity 1502. The network entity 1502 may be a BS, a component of a BS, or may implement BS functionality. The network entity 1502 may include at least one of a CU 1510, a DU 1530, or an RU 1540. For example, depending on the layer functionality handled by the component 199, the network entity 1502 may include the CU 1510; both the CU 1510 and the DU 1530; each of the CU 1510, the DU 1530, and the RU 1540; the DU 1530; both the DU 1530 and the RU 1540; or the RU 1540. The CU 1510 may include a CU processor 1512. The CU processor 1512 may include on-chip memory 1512'. In some aspects, the CU 1510 may further include additional memory modules 1514 and a communications interface 1518. The CU 1510 communicates with the DU 1530 through a midhaul link, such as an F1 interface. The DU 1530 may include a DU processor 1532. The DU processor 1532 may include on-chip memory 1532'. In some aspects, the DU 1530 may further include additional memory modules 1534 and a communications interface 1538. The DU 1530 communicates with the RU 1540 through a fronthaul link. The RU 1540 may include an RU processor 1542. The RU processor 1542 may include on-chip memory 1542'. In some aspects, the RU 1540 may further include additional memory modules 1544, one or more transceivers 1546, antennas 1580, and a communications interface 1548. The RU 1540 communicates with the UE 104. The on-chip memory 1512', 1532', 1542' and the additional memory modules 1514, 1534, 1544 may each be considered a computer-readable medium/memory. Each computer-readable medium/memory may be non-transitory. Each of the processors 1512, 1532, 1542 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive, from a sensing node, a capability indication of the sensing node, where the capability indication of the sensing node indicates a capability of the sensing node associated with multiple hypothesis (multi-hypothesis) measurement and reporting. The component 199 may also be configured to transmit, for the sensing node, a sensing configuration, where the sensing configuration is based on the capability indication of the sensing node and indicates a total number of sensing hypotheses and at least a first sensing hypothesis and a second sensing hypothesis that is different from the first sensing hypothesis. The component 199 may also be configured to receive, from the sensing node, at least one of: (1) a first set of sensing measurement data associated with the first sensing hypothesis and a second set of sensing measurement data associated with the second sensing hypothesis, or (2) an indication of the first sensing hypothesis and the second sensing hypothesis. The component 199 may be configured to transmit, for the sensing node, an adjusted sensing configuration associated with the indication of the first sensing hypothesis and the second sensing hypothesis, where the adjusted sensing configuration indicates at least one of an adjusted total number of sensing hypotheses, an adjusted first sensing hypothesis, or an adjusted second sensing hypothesis. The component 199 may be configured to receive, from the sensing node, a third set of sensing measurement data and a fourth set of sensing measurement data associated with least one of the adjusted total number of sensing hypotheses, the adjusted first sensing hypothesis, or the adjusted second sensing hypothesis. The component 199 may be configured to transmit, for the sensing node and subsequent to transmission of the sensing configuration, a hypothesis activation, where hypothesis activation indicates at least one of the first sensing hypothesis or the second sensing hypothesis from the total number of sensing hypotheses for the measurement. The component 199 may be configured to transmit a capability request of the sensing node prior to reception of the capability indication of the sensing node. The component 199 may be further configured to perform any of the aspects described in connection with the flowcharts in any of FIGS. 10-13, and/or any of the aspects performed by a sensing entity for any of FIGS. 5-9. The component 199 may be within one or more processors of one or more of the CU 1510, DU 1530, and the RU 1540. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1502 may include a variety of components configured for various functions. In one configuration, the network entity 1502 may include means for receiving, from a sensing node, a capability indication of the sensing node, where the capability indication of the sensing node indicates a capability of the sensing node associated with multiple hypothesis (multi-hypothesis) measurement and reporting. In the configuration, the network entity 1502 may include means for transmitting, for the sensing node, a sensing configuration, where the sensing configuration is based on the capability indication of the sensing node and indicates a total number of sensing hypotheses and at least a first sensing hypothesis and a second sensing hypothesis that is different from the first sensing hypothesis. In the configuration, the network entity 1502 may include means for receiving, from the sensing node, at least one of: (1) a first set of sensing measurement data associated with the first sensing hypothesis and a second set of sensing measurement data associated with the second sensing hypothesis, or (2) an indication of the first sensing hypothesis and the second sensing hypothesis. In one configuration, the network entity 1502 may include means for transmitting, for the sensing node, an adjusted sensing configuration associated with the indication of the first sensing hypothesis and the second sensing hypothesis, where the adjusted sensing configuration indicates at least one of an adjusted total number of sensing hypotheses, an adjusted first sensing hypothesis, or an adjusted second sensing hypothesis. In one configuration, the network entity 1502 may include means for receiving, from the sensing node, a third set of sensing measurement data and a fourth set of sensing measurement data associated with least one of the adjusted total number of sensing hypotheses, the adjusted first sensing hypothesis, or the adjusted second sensing hypothesis. In one configuration, the network entity 1502 may include means for transmitting, for the sensing node and subsequent to transmitting the sensing configuration, a hypothesis activation, where the hypothesis activation indicates at least one of the first sensing hypothesis or the second sensing hypothesis from the total number of sensing hypotheses for the measurement. In one configuration, the network entity 1502 may include means for transmitting a capability request of the sensing node prior to receiving the capability indication of the sensing node. The means may be the component 199 of the network entity 1502 configured to perform the functions recited by the means. As described supra, the network entity 1502 may include the TX processor 316, the RX processor 370, and the controller/processor 375. As such, in one configuration, the means may be the TX processor 316, the RX processor 370, and/or the controller/processor 375 configured to perform the functions recited by the means.

Figure 16:
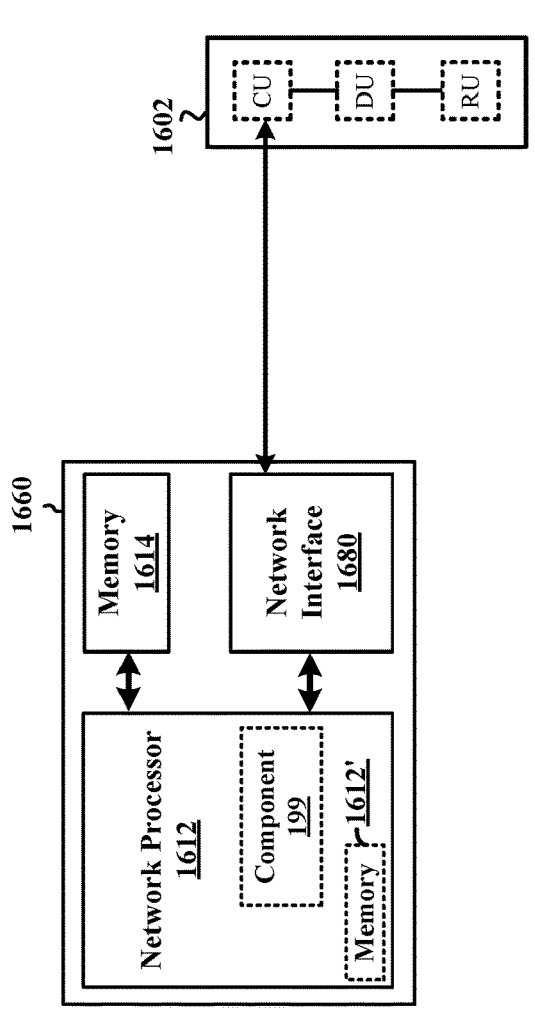
FIG. 16 is a diagram illustrating an example of a hardware implementation for an example network entity.

FIG. 16 is a diagram 1600 illustrating an example of a hardware implementation for a network entity 1660. In one example, the network entity 1660 may be within the core network 120. The network entity 1660 may include a network processor 1612. The network processor 1612 may include on-chip memory 1612'. In some aspects, the network entity 1660 may further include additional memory modules 1614. The network entity 1660 communicates via the network interface 1680 directly (e.g., backhaul link) or indirectly (e.g., through a RIC) with the CU 1602. The on-chip memory 1612' and the additional memory modules 1614 may each be considered a computer-readable medium/memory. Each computer-readable medium/memory may be non-transitory. The processor 1612 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive, from a sensing node, a capability indication of the sensing node, where the capability indication of the sensing node indicates a capability of the sensing node associated with multiple hypothesis (multi-hypothesis) measurement and reporting. The component 199 may also be configured to transmit, for the sensing node, a sensing configuration, where the sensing configuration is based on the capability indication of the sensing node and indicates a total number of sensing hypotheses and at least a first sensing hypothesis and a second sensing hypothesis that is different from the first sensing hypothesis. The component 199 may also be configured to receive, from the sensing node, at least one of: (1) a first set of sensing measurement data associated with the first sensing hypothesis and a second set of sensing measurement data associated with the second sensing hypothesis, or (2) an indication of the first sensing hypothesis and the second sensing hypothesis. The component 199 may be configured to transmit, for the sensing node, an adjusted sensing configuration associated with the indication of the first sensing hypothesis and the second sensing hypothesis, where the adjusted sensing configuration indicates at least one of an adjusted total number of sensing hypotheses, an adjusted first sensing hypothesis, or an adjusted second sensing hypothesis. The component 199 may be configured to receive, from the sensing node, a third set of sensing measurement data and a fourth set of sensing measurement data associated with least one of the adjusted total number of sensing hypotheses, the adjusted first sensing hypothesis, or the adjusted second sensing hypothesis. The component 199 may be configured to transmit, for the sensing node and subsequent to transmission of the sensing configuration, a hypothesis activation, where the hypothesis activation indicates at least one of the first sensing hypothesis or the second sensing hypothesis from the total number of sensing hypotheses for the measurement. The component 199 may be configured to transmit a capability request of the sensing node prior to reception of the capability indication of the sensing node. The component 199 may be further configured to perform any of the aspects described in connection with the flowcharts in any of FIGS. 10-13, and/or any of the aspects performed by a sensing entity for any of FIGS. 5-9. The component 199 may be within the processor 1612. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1660 may include a variety of components configured for various functions. In one configuration, the network entity 1660 may include means for receiving, from a sensing node, a capability indication of the sensing node, where the capability indication of the sensing node indicates a capability of the sensing node associated with multiple hypothesis (multi-hypothesis) measurement and reporting. In the configuration, the network entity 1660 may include means for transmitting, for the sensing node, a sensing configuration, where the sensing configuration is based on the capability indication of the sensing node and indicates a total number of sensing hypotheses and at least a first sensing hypothesis and a second sensing hypothesis that is different from the first sensing hypothesis. In the configuration, the network entity 1660 may include means for receiving, from the sensing node, at least one of: (1) a first set of sensing measurement data associated with the first sensing hypothesis and a second set of sensing measurement data associated with the second sensing hypothesis, or (2) an indication of the first sensing hypothesis and the second sensing hypothesis. In one configuration, the network entity 1660 may include means for transmitting, for the sensing node, an adjusted sensing configuration associated with the indication of the first sensing hypothesis and the second sensing hypothesis, where the adjusted sensing configuration indicates at least one of an adjusted total number of sensing hypotheses, an adjusted first sensing hypothesis, or an adjusted second sensing hypothesis. In one configuration, the network entity 1660 may include means for receiving, from the sensing node, a third set of sensing measurement data and a fourth set of sensing measurement data associated with least one of the adjusted total number of sensing hypotheses, the adjusted first sensing hypothesis, or the adjusted second sensing hypothesis. In one configuration, the network entity 1660 may include means for transmitting, for the sensing node and subsequent to transmitting the sensing configuration, a hypothesis activation, where the hypothesis activation indicates at least one of the first sensing hypothesis or the second sensing hypothesis from the total number of sensing hypotheses for the measurement. In one configuration, the network entity 1660 may include means for transmitting a capability request of the sensing node prior to reception of the capability indication of the sensing node. The means may be the component 199 of the network entity 1660 configured to perform the functions recited by the means.

A wireless communication network and/or a wireless device may utilize specific sensing waveforms, e.g., radio detection and ranging (RADAR) waveforms, for communications and/or radio frequency (RF) sensing. For instance, a RF sensing operation against a sensing target may be performed by a wireless device, e.g., a sensing node, utilizing a sensing waveform, and sensing measurement results may be provided to a sensing entity via at least one reference signal (RS). In some scenarios, such as Doppler measurements and virtual multiple-input and multiple-output (MIMO) array processing, phase-coherent RSs may improve, or even enable, RF sensing operations. However, maintaining phase coherency for RS transmissions such as in a positioning reference signal (PRS) or a sounding reference signal (SRS) may be affected by hardware configurations/capabilities, beam switching operations, data servicing in cellular systems, and/or the like, which in turn may impact sensing operation performance. As an example, sensing environments with sensing targets that move at relatively low speeds (e.g., no more than 2-3 m/s) may utilize larger windows of time (e.g., 10-20 ms, 2 frames, etc.) for sensing operations to achieve a desired sensing performance. Yet, maintaining coherent transmission over larger windows of time for sensing operations may be difficult or unachievable, which may result in impacted sensing performance.

The described aspects for sensing operations, e.g., for multi-hypothesis measurement configuration in RF sensing, enable wireless devices, e.g., sensing nodes, and base stations/LMFs, e.g., sensing entities, to improve and maintain sensing measurement performance and efficiency. In one example, a sensing node may receive, from a sensing entity, a sensing configuration. The sensing configuration may indicate a total number of sensing hypotheses and at least a first sensing hypothesis and a second sensing hypothesis that is different from the first sensing hypothesis. The sensing node may measure a first set of sensing measurement data associated with the first sensing hypothesis and a second set of sensing measurement data associated with the second sensing hypothesis. The sensing node may also transmit, for the sensing entity, at least one of: (1) the first set of sensing measurement data and the second set of sensing measurement data, or (2) an indication of the first sensing hypothesis and the second sensing hypothesis. In another example, a sensing entity may receive, from a sensing node, a capability indication of the sensing node. The capability indication of the sensing node may indicate a capability of the sensing node associated with multiple hypothesis measurement and reporting. The sensing entity may transmit, for the sensing node, a sensing configuration. The sensing configuration may be based on the capability indication of the sensing node and may indicate a total number of sensing hypotheses and at least a first sensing hypothesis and a second sensing hypothesis that is different from the first sensing hypothesis. The sensing entity may also receive, from the sensing node, at least one of: (1) a first set of sensing measurement data associated with the first sensing hypothesis and a second set of sensing measurement data associated with the second sensing hypothesis, or (2) an indication of the first sensing hypothesis and the second sensing hypothesis.

Particular aspects of the subject matter described improve and maintain sensing measurement performance and efficiency in various ways. For example, a sensing entity may track the most optimal operating scenarios for sensing operations to improve sensing operation performance and efficiency based on configurations for multi-hypothesis sensing measurements and reporting. Additionally, configurations may utilize multi-hypothesis sensing measurements and reporting to implement adapted sensing measurements for a sensing node, based on prior sensing prior sensing performance, events, conditions, and/or the like, such as implementing any number of range, angle, and/or Doppler sensing measurements for a sensing node with respect to a first TRP, while restricting the sensing node to a single type of sensing measurement for a second TRP. Further, utilizing multiple hypotheses for sensing measurements may provide flexibility to a sensing entity for selecting sensing measurements in performing its sensing computations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communications at a sensing node, including: receiving, from a sensing entity, a sensing configuration, the sensing configuration indicating a total number of sensing hypotheses and at least a first sensing hypothesis and a second sensing hypothesis that is different from the first sensing hypothesis; measuring a first set of sensing measurement data associated with the first sensing hypothesis and a second set of sensing measurement data associated with the second sensing hypothesis; and transmitting, for the sensing entity, at least one of: (1) the first set of sensing measurement data and the second set of sensing measurement data, or (2) an indication of the first sensing hypothesis and the second sensing hypothesis.

Aspect 2 is the method of aspect 1, where the sensing node is at least one of a first user equipment (UE), a sidelink (SL) UE, a transmission-reception point (TRP), a roadside unit (RSU), or a positioning reference unit (PRU), and where the sensing entity is at least one of a second UE, a network node, a network entity, or a location management function (LMF).

Aspect 3 is the method of any of aspects 1 and 2, where the first sensing hypothesis corresponds to a subset of sensing occasions of a sensing resource set and the second sensing hypothesis corresponds to a full set of the sensing occasions of the sensing resource set; and where measuring the first set of sensing measurement data associated with the first sensing hypothesis and the second set of sensing measurement data associated with the second sensing hypothesis includes measuring the first set of sensing measurement data associated with the first sensing hypothesis in the subset of the sensing occasions of the sensing resource set and the second set of sensing measurement data associated with the second sensing hypothesis in the full set of the sensing occasions of the sensing resource set.

Aspect 4 is the method of any of aspects 1 to 4, where transmitting the first set of sensing measurement data and the second set of sensing measurement data includes at least one of: transmitting the first set of sensing measurement data and the second set of sensing measurement data in a same transmission occasion; or transmitting the first set of sensing measurement data in a first transmission occasion and the second set of sensing measurement data in a second transmission occasion, where the first transmission occasion is different from the second transmission occasion.

Aspect 5 is the method of aspect 4, where the sensing configuration further indicates at least one of (i) a set of corresponding reference signals associated with each of the total number of sensing hypotheses or (ii) at least one of the same transmission occasion or the first transmission occasion and the second transmission occasion; and where transmitting the first set of sensing measurement data and the second set of sensing measurement data in the same transmission occasion includes transmitting the first set of sensing measurement data and the second set of sensing measurement data in the same transmission occasion on a first reference signal of the set of corresponding reference signals, or where transmitting the first set of sensing measurement data in the first transmission occasion and the second set of sensing measurement data in the second transmission occasion includes transmitting the first set of sensing measurement data in the first transmission occasion on the first reference signal of the set of corresponding reference signals and the second set of sensing measurement data in the second transmission occasion on a second reference signal of the set of corresponding reference signals, where the first reference signal is different from the second reference signal.

Aspect 6 is the method of any of aspects 1 to 5, where at least one of the first set of sensing measurement data or the second set of sensing measurement data is associated with at least one corresponding reference signal and at least one of a range, an angle, or a Doppler measurement.

Aspect 7 is the method of any of aspects 1 to 6, where at least one of the first set of sensing measurement data and the second set of sensing measurement data or the indication of the first sensing hypothesis and the second sensing hypothesis also includes information associated with at least one of a measurement characteristic, an outlier rejection, or a measurement efficacy for one or more of the first set of sensing measurement data associated with the first sensing hypothesis and the second set of sensing measurement data associated with the second sensing hypothesis.

Aspect 8 is the method of aspect 7, where the method further includes: receiving, from the sensing entity, an adjusted sensing configuration associated with the indication of the first sensing hypothesis and the second sensing hypothesis, where the adjusted sensing configuration indicates at least one of an adjusted total number of sensing hypotheses, an adjusted first sensing hypothesis, or an adjusted second sensing hypothesis; measuring a third set of sensing measurement data and a fourth set of sensing measurement data associated with least one of the adjusted total number of sensing hypotheses, the adjusted first sensing hypothesis, or the adjusted second sensing hypothesis; and transmitting, for the sensing entity, the third set of sensing measurement data and the fourth set of sensing measurement data.

Aspect 9 is the method of any of aspects 1 to 8, where measuring the first set of sensing measurement data associated with the first sensing hypothesis and the second set of sensing measurement data associated with the second sensing hypothesis includes a sensing session that includes at least a full set of sensing occasions of a sensing resource set; and where the method further includes: receiving, from the sensing entity or from a network node and subsequent to receiving the sensing configuration, a hypothesis activation, where the hypothesis activation indicates at least one of the first sensing hypothesis or the second sensing hypothesis from the total number of sensing hypotheses for the measurement.

Aspect 10 is the method of aspect 9, where receiving the hypothesis activation includes at least one of receiving the hypothesis activation prior to the sensing session or receiving the hypothesis activation during the sensing session and subsequent to a measurement over a prior instance of the sensing resource set.

Aspect 11 is the method of any of aspects 1 to 10, where the sensing entity is a location management function (LMF), where the hypothesis activation is associated with a coherency condition of the sensing node, and where receiving the hypothesis activation includes receiving the hypothesis activation from the network node via at least one of radio resource control (RRC) signaling, a medium access control (MAC) control element (MAC-CE), or downlink control information (DCI).

Aspect 12 is the method of any of aspects 1 to 10, where the sensing node is a sidelink (SL) user equipment (UE), where the hypothesis activation is associated with a coherency condition of the sensing node, and where receiving the hypothesis activation includes receiving the hypothesis activation from the sensing entity via a sidelink channel by at least one of direct communication (PC5) radio resource control (RRC) signaling, a PC5 medium access control (MAC) control element (MAC-CE), SL control information (SCI) stage 1, or SCI stage 2.

Aspect 13 is the method of any of aspects 1 to 10, where measuring the first set of sensing measurement data associated with the first sensing hypothesis and the second set of sensing measurement data associated with the second sensing hypothesis includes dynamically measuring the first set of sensing measurement data associated with the first sensing hypothesis and the second set of sensing measurement data associated with the second sensing hypothesis based on an activation of the first sensing hypothesis and the second sensing hypothesis by the sensing node, where the activation is associated with at least one of a mobility event of the sensing node or a cell switch of the sensing node.

Aspect 14 is the method of any of aspects 1 to 13, where the method further includes: providing, to the sensing entity, a capability indication of the sensing node, where the capability indication of the sensing node indicates a capability of the sensing node associated with multiple hypothesis (multi-hypothesis) measurement and reporting including at least one of a number of sensing hypotheses supported by the sensing node, a buffer capability of the sensing node, a processing capability of the sensing node, or a related sensing capability of the sensing node.

Aspect 15 is the method of any of aspects 1 to 14, where the method further includes: receiving a capability request of the sensing node prior to providing the capability indication of the sensing node; where providing the capability indication of the sensing node includes providing the capability indication of the sensing node in response to the capability request.

Aspect 16 is a method of wireless communications at a sensing entity, including: receiving, from a sensing node, a capability indication of the sensing node, where the capability indication of the sensing node indicates a capability of the sensing node associated with multiple hypothesis (multi-hypothesis) measurement and reporting; transmitting, for the sensing node, a sensing configuration, where the sensing configuration is based on the capability indication of the sensing node and indicates a total number of sensing hypotheses and at least a first sensing hypothesis and a second sensing hypothesis that is different from the first sensing hypothesis; and receiving, from the sensing node, at least one of: (1) a first set of sensing measurement data associated with the first sensing hypothesis and a second set of sensing measurement data associated with the second sensing hypothesis, or (2) an indication of the first sensing hypothesis and the second sensing hypothesis.

Aspect 17 is the method of aspect 16, where the sensing node is at least one of a first user equipment (UE), a sidelink (SL) UE, a transmission-reception point (TRP), a roadside unit (RSU), or a positioning reference unit (PRU), and where the sensing entity is at least one of a second UE, a network node, a network entity, or a location management function (LMF).

Aspect 18 is the method of any of aspects 16 and 17, where the first set of sensing measurement data and the first sensing hypothesis correspond to a subset of sensing occasions of a sensing resource set, and the second set of sensing measurement data and the second sensing hypothesis correspond to a full set of the sensing occasions of the sensing resource set.

Aspect 19 is the method of any of aspects 16 to 18, where receiving the first set of sensing measurement data and the second set of sensing measurement data includes at least one of: receiving the first set of sensing measurement data and the second set of sensing measurement data in a same transmission occasion; or receiving the first set of sensing measurement data in a first transmission occasion and the second set of sensing measurement data in a second transmission occasion, where the first transmission occasion is different from the second transmission occasion.

Aspect 20 is the method of aspect 19, where the sensing configuration further indicates at least one of (i) a set of corresponding reference signals associated with each of the total number of sensing hypotheses or (ii) at least one of the same transmission occasion or the first transmission occasion and the second transmission occasion; and where receiving the first set of sensing measurement data and the second set of sensing measurement data in the same transmission occasion includes receiving the first set of sensing measurement data and the second set of sensing measurement data in the same transmission occasion on a first reference signal of the set of corresponding reference signals, or where receiving the first set of sensing measurement data in the first transmission occasion and the second set of sensing measurement data in the second transmission occasion includes receiving the first set of sensing measurement data in the first transmission occasion on the first reference signal of the set of corresponding reference signals and the second set of sensing measurement data in the second transmission occasion on a second reference signal of the set of corresponding reference signals, where the first reference signal is different from the second reference signal.

Aspect 21 is the method of any of aspects 16 to 20, where at least one of the first set of sensing measurement data or the second set of sensing measurement data is associated with at least one corresponding reference signal and at least one of a range, an angle, or a Doppler measurement.

Aspect 22 is the method of any of aspects 16 to 21, where at least one of the first set of sensing measurement data and the second set of sensing measurement data or the indication of the first sensing hypothesis and the second sensing hypothesis also includes information associated with at least one of a measurement characteristic, an outlier rejection, or a measurement efficacy for one or more of the first set of sensing measurement data associated with the first sensing hypothesis and the second set of sensing measurement data associated with the second sensing hypothesis.

Aspect 23 is the method of aspect 22, the method further including: transmitting, for the sensing node, an adjusted sensing configuration associated with the indication of the first sensing hypothesis and the second sensing hypothesis, where the adjusted sensing configuration indicates at least one of an adjusted total number of sensing hypotheses, an adjusted first sensing hypothesis, or an adjusted second sensing hypothesis; and receiving, from the sensing node, a third set of sensing measurement data and a fourth set of sensing measurement data associated with least one of the adjusted total number of sensing hypotheses, the adjusted first sensing hypothesis, or the adjusted second sensing hypothesis.

Aspect 24 is the method of any of aspects 16 to 23, where the first set of sensing measurement data associated with the first sensing hypothesis and the second set of sensing measurement data associated with the second sensing hypothesis correspond to a sensing session that includes at least a full set of sensing occasions of a sensing resource set; where the method further includes: transmitting, for the sensing node and subsequent to transmitting the sensing configuration, a hypothesis activation, where the hypothesis activation indicates at least one of the first sensing hypothesis or the second sensing hypothesis from the total number of sensing hypotheses for the measurement.

Aspect 25 is the method of aspect 24, where transmitting the hypothesis activation includes at least one of transmitting the hypothesis activation prior to the sensing session or transmitting the hypothesis activation during the sensing session and based on at least one of: (1) a prior first set of sensing measurement data associated with a prior first sensing hypothesis and a second prior set of sensing measurement data associated with a second sensing hypothesis, or (2) a prior indication of a first prior sensing hypothesis and a second prior sensing hypothesis.

Aspect 26 is the method of any of aspects 16 to 25, where the sensing node is a sidelink (SL) user equipment (UE), where the hypothesis activation is associated with a coherency condition of the sensing node, and where transmitting the hypothesis activation includes transmitting the hypothesis activation for the sensing node via a sidelink channel by at least one of direct communication (PC5) radio resource control (RRC) signaling, a PC5 medium access control (MAC) control element (MAC-CE), SL control information (SCI) stage 1, or SCI stage 2.

Aspect 27 is the method of any of aspects 16 to 26, where the sensing entity is a location management function (LMF), and where the sensing configuration indicates an activation for a third sensing hypothesis from the total number of sensing hypotheses instead of the first sensing hypothesis.

Aspect 28 is the method of any of aspects 16 to 27, the method further including: transmitting a capability request of the sensing node prior to receiving the capability indication of the sensing node; where receiving the capability indication of the sensing node includes receiving the capability indication of the sensing node in response to the capability request.

Aspect 29 is an apparatus for wireless communication including means for implementing any of aspects 1 to 15.

Aspect 30 is a computer-readable medium (e.g., a non-transitory computer-readable medium) storing computer executable code, the code when executed by at least one processor causes the at least one processor to implement any of aspects 1 to 15.

Aspect 31 is an apparatus for wireless communication at a network node. The apparatus includes a memory; and at least one processor coupled to the memory and, based at least in part on information stored in the memory, the at least one processor is configured to implement any of aspects 1 to 15.

Aspect 32 is the apparatus of aspect 31, further including at least one of a transceiver or an antenna coupled to the at least one processor.

Aspect 33 is an apparatus for wireless communication including means for implementing any of aspects 16 to 28.

Aspect 34 is a computer-readable medium (e.g., a non-transitory computer-readable medium) storing computer executable code, the code when executed by at least one processor causes the at least one processor to implement any of aspects 16 to 28.

Aspect 35 is an apparatus for wireless communication at a network node. The apparatus includes a memory; and at least one processor coupled to the memory and, based at least in part on information stored in the memory, the at least one processor is configured to implement any of aspects 16 to 28.

Aspect 36 is the apparatus of aspect 35, further including at least one of a transceiver or an antenna coupled to the at least one processor.

What is claimed is:

1. An apparatus for wireless communications at a sensing node, comprising:
memory; and
at least one processor coupled to the memory and, based at least in part on information stored in the memory, the at least one processor is configured to:
receive, from a sensing entity, a sensing configuration, wherein the sensing configuration indicates a total number of sensing hypotheses and at least a first sensing hypothesis and a second sensing hypothesis that is different from the first sensing hypothesis;
measure a first set of sensing measurement data associated with the first sensing hypothesis and a second set of sensing measurement data associated with the second sensing hypothesis; and
transmit, for the sensing entity, at least one of: (1) the first set of sensing measurement data and the second set of sensing measurement data, or (2) an indication of the first sensing hypothesis and the second sensing hypothesis.

2. The apparatus of claim 1, wherein the sensing node is at least one of a first user equipment (UE), a sidelink (SL) UE, a transmission-reception point (TRP), a roadside unit (RSU), or a positioning reference unit (PRU), and wherein the sensing entity is at least one of a second UE, a network node, a network entity, or a location management function (LMF).

3. The apparatus of claim 1, wherein the first sensing hypothesis corresponds to a subset of sensing occasions of a sensing resource set and the second sensing hypothesis corresponds to a full set of the sensing occasions of the sensing resource set; and
wherein to measure the first set of sensing measurement data associated with the first sensing hypothesis and the second set of sensing measurement data associated with the second sensing hypothesis, the at least one processor is configured to measure the first set of sensing measurement data associated with the first sensing hypothesis in the subset of the sensing occasions of the sensing resource set and the second set of sensing measurement data associated with the second sensing hypothesis in the full set of the sensing occasions of the sensing resource set.

4. The apparatus of claim 1, wherein to transmit the first set of sensing measurement data and the second set of sensing measurement data, the at least one processor is configured to:
transmit the first set of sensing measurement data and the second set of sensing measurement data in a same transmission occasion; or
transmit the first set of sensing measurement data in a first transmission occasion and the second set of sensing measurement data in a second transmission occasion, wherein the first transmission occasion is different from the second transmission occasion.

5. The apparatus of claim 4, wherein the sensing configuration further indicates at least one of (i) a set of corresponding reference signals associated with each of the total number of sensing hypotheses or (ii) at least one of the same transmission occasion or the first transmission occasion and the second transmission occasion; and wherein to transmit the first set of sensing measurement data and the second set of sensing measurement data in the same transmission occasion, the at least one processor is configured to transmit the first set of sensing measurement data and the second set of sensing measurement data in the same transmission occasion on a first reference signal of the set of corresponding reference signals, or wherein to transmit the first set of sensing measurement data in the first transmission occasion and the second set of sensing measurement data in the second transmission occasion, the at least one processor is configured to transmit the first set of sensing measurement data in the first transmission occasion on the first reference signal of the set of corresponding reference signals and the second set of sensing measurement data in the second transmission occasion on a second reference signal of the set of corresponding reference signals, wherein the first reference signal is different from the second reference signal.

6. The apparatus of claim 1, wherein at least one of the first set of sensing measurement data or the second set of sensing measurement data is associated with at least one corresponding reference signal and at least one of a range, an angle, or a Doppler measurement.

7. The apparatus of claim 1, wherein at least one of the first set of sensing measurement data and the second set of sensing measurement data or the indication of the first sensing hypothesis and the second sensing hypothesis also includes information associated with at least one of a measurement characteristic, an outlier rejection, or a measurement efficacy for one or more of the first set of sensing measurement data associated with the first sensing hypothesis and the second set of sensing measurement data associated with the second sensing hypothesis.

8. The apparatus of claim 7, wherein the at least one processor is further configured to:

receive, from the sensing entity, an adjusted sensing configuration associated with the indication of the first sensing hypothesis and the second sensing hypothesis, wherein the adjusted sensing configuration indicates at least one of an adjusted total number of sensing hypotheses, an adjusted first sensing hypothesis, or an adjusted second sensing hypothesis;

measure a third set of sensing measurement data and a fourth set of sensing measurement data associated with at least one of the adjusted total number of sensing hypotheses, the adjusted first sensing hypothesis, or the adjusted second sensing hypothesis; and transmit, for the sensing entity, the third set of sensing measurement data and the fourth set of sensing measurement data.

9. The apparatus of claim 1, wherein to measure the first set of sensing measurement data associated with the first sensing hypothesis and the second set of sensing measurement data associated with the second sensing hypothesis, the at least one processor is configured to measure the first set of sensing measurement data associated with the first sensing hypothesis and the second set of sensing measurement data associated with the second sensing hypothesis in a sensing session that includes at least a full set of sensing occasions of a sensing resource set;

wherein the at least one processor is further configured to:

receive, from the sensing entity or from a network node and subsequent to reception of the sensing configuration, a hypothesis activation, wherein the hypothesis activation indicates at least one of the first sensing hypothesis or the second sensing hypothesis from the total number of sensing hypotheses for the measurement.

10. The apparatus of claim 9, wherein to receive the hypothesis activation, the at least one processor is configured to receive the hypothesis activation prior to the sensing session or receive the hypothesis activation during the sensing session and subsequent to a measurement over a prior instance of the sensing resource set.

11. The apparatus of claim 9, wherein the sensing entity is a location management function (LMF), wherein the hypothesis activation is associated with a coherency condition of the sensing node, and wherein to receive the hypothesis activation, the at least one processor is configured to receive the hypothesis activation from the network node via at least one of radio resource control (RRC) signaling, a medium access control (MAC) control element (MAC-CE), or downlink control information (DCI).

12. The apparatus of claim 9, wherein the sensing node is a sidelink (SL) user equipment (UE), wherein the hypothesis activation is associated with a coherency condition of the sensing node, and wherein to receive the hypothesis activation, the at least one processor is configured to receive the hypothesis activation from the sensing entity via a sidelink channel by at least one of direct communication (PC5) radio resource control (RRC) signaling, a PC5 medium access control (MAC) control element (MAC-CE), SL control information (SCI) stage 1, or SCI stage 2.

13. The apparatus of claim 1, wherein to measure the first set of sensing measurement data associated with the first sensing hypothesis and the second set of sensing measurement data associated with the second sensing hypothesis, the at least one processor is configured to dynamically measure the first set of sensing measurement data associated with the first sensing hypothesis and the second set of sensing measurement data associated with the second sensing hypothesis based on an activation of the first sensing hypothesis and the second sensing hypothesis by the sensing node, wherein the activation is associated with at least one of a mobility event of the sensing node or a cell switch of the sensing node.

14. The apparatus of claim 1, wherein the at least one processor is further configured to:

provide, to the sensing entity, a capability indication of the sensing node, wherein the capability indication of the sensing node indicates a capability of the sensing node associated with multiple hypothesis (multi-hypothesis) measurement and reporting including at least one of a number of sensing hypotheses supported by the sensing node, a buffer capability of the sensing node, a processing capability of the sensing node, or a related sensing capability of the sensing node.

15. The apparatus of claim 14, wherein the at least one processor is further configured to:

receive a capability request of the sensing node prior to providing the capability indication of the sensing node;

wherein to provide the capability indication of the sensing node, the at least one processor is configured to provide the capability indication of the sensing node in response to the capability request.

16. A method of wireless communications at a sensing node, comprising:

receiving, from a sensing entity, a sensing configuration, the sensing configuration indicating a total number of sensing hypotheses and at least a first sensing hypothesis and a second sensing hypothesis that is different from the first sensing hypothesis;

measuring a first set of sensing measurement data associated with the first sensing hypothesis and a second set of sensing measurement data associated with the second sensing hypothesis; and transmitting, for the sensing entity, at least one of: (1) the first set of sensing measurement data and the second set of sensing measurement data, or (2) an indication of the first sensing hypothesis and the second sensing hypothesis.

* * * * *